United States Patent
Wachi et al.

(10) Patent No.: US 7,402,201 B2
(45) Date of Patent: Jul. 22, 2008

(54) INK STOCK SOLUTION, INK COMPOSITION AND METHOD FOR PRODUCING THEM

(75) Inventors: Naotaka Wachi, Shizuoka (JP); Takashi Ozawa, Shizuoka (JP); Toshiki Fujiwara, Kanagawa (JP); Keiichi Tateishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 266 days.

(21) Appl. No.: 11/085,089

(22) Filed: Mar. 22, 2005

(65) Prior Publication Data

US 2005/0204952 A1    Sep. 22, 2005

(30) Foreign Application Priority Data

Mar. 22, 2004  (JP) ............. P.2004-082033

(51) Int. Cl.
  *C09D 11/00*   (2006.01)
  *C09D 11/02*   (2006.01)
(52) U.S. Cl. ............. 106/31.52; 106/31.46; 106/31.48; 106/31.5; 106/31.43; 106/31.58
(58) Field of Classification Search ............. 106/31.27, 106/31.46, 31.48, 31.5, 31.52, 31.58, 31.43
See application file for complete search history.

(56) References Cited

U.S. PATENT DOCUMENTS

| | | | |
|---|---|---|---|
| 7,029,523 B2 * | 4/2006 | Taguchi et al. | 106/31.46 |
| 7,083,664 B2 * | 8/2006 | Taguchi et al. | 106/31.27 |
| 7,083,668 B2 * | 8/2006 | Taguchi et al. | 106/31.46 |
| 7,115,162 B2 * | 10/2006 | Fujiwara et al. | 106/31.5 |
| 7,192,475 B2 * | 3/2007 | Takasaki et al. | 106/31.5 |
| 7,201,477 B2 * | 4/2007 | Taguchi et al. | 347/100 |
| 2005/0109236 A1 * | 5/2005 | Yabuki et al. | 106/31.27 |
| 2005/0142306 A1 * | 6/2005 | Uhlir-Tsang et al. | 428/32.34 |
| 2006/0044375 A1 * | 3/2006 | Taguchi et al. | 347/100 |
| 2006/0201382 A1 * | 9/2006 | Ozawa et al. | 106/31.27 |

FOREIGN PATENT DOCUMENTS

| | | | |
|---|---|---|---|
| EP | 1514913 | * | 3/2005 |
| JP | 2003-306623 A | | 10/2003 |
| JP | 2004-26900 A | | 1/2004 |
| JP | 2004-26901 A | | 1/2004 |
| JP | 2004-115620 A | | 4/2004 |
| WO | WO 02/083795 | * | 10/2002 |
| WO | WO 2004/029166 | * | 4/2004 |

OTHER PUBLICATIONS

English translation of JP 2004/026900, Jan. 2004.*
English translation of JP 2004/026901, Jan. 2004.*

* cited by examiner

*Primary Examiner*—Helene Klemanski
(74) *Attorney, Agent, or Firm*—Sughrue Mion, PLLC

(57) ABSTRACT

To provide an ink stock solution excellent in handleability, a method for producing the same, an ink composition using the ink stock solution, particularly suitable for an ink for inkjet recording, and a method for producing the same, the ink stock solution includes a dye and a viscosity reducing agent, wherein the ink stock solution has a solid concentration of the dye of 7% or more by weight; the method for producing the ink stock solution includes adding a dye to a water and dissolving the dye in the water, and then, adding a viscosity reducing agent to control the viscosity; the method for producing the ink stock solution includes dissolving a dye, a water and a viscosity reducing agent all together; and the ink composition includes the ink stock solution and has a viscosity of 1 to 30 mPa·s.

16 Claims, No Drawings

INK STOCK SOLUTION, INK COMPOSITION AND METHOD FOR PRODUCING THEM

FIELD OF THE INVENTION

The present invention relates to an ink stock solution, an ink composition and method for producing them.

BACKGROUND OF THE INVENTION

With the recent popularization of computers, inkjet printers have been widely used for printing letters on paper, film, cloth or the like not only at offices but also at homes.

The inkjet recording method includes a system of ejecting a liquid droplet by applying a pressure using a piezoelectric element, a system of ejecting a liquid droplet by generating a bubble in an ink by heat, a system of using an ultrasonic wave, and a system of ejecting a liquid droplet by drawing with electrostatic force. As these inks for inkjet recording, there are used an aqueous ink, an oily ink and a solid (fusion-type) ink. Of these inks, the aqueous ink becomes mainstream in terms of production, handleability, odor, safety and the like.

A coloring agent used in such an ink for inkjet recording is required to have high solubility in a solvent, the possibility of high-density recording, good color hue, excellent fastness to light, heat, air, ozone, water and chemicals, good fixing property and less blurring on an image-receiving material, excellent storability as an ink, no toxicity, high purity and availability at a low cost. However, it is very difficult to seek a coloring agent satisfying these requirements in a high level.

Various dyes and pigments for inkjet recording have been already proposed and actually used. However, a coloring agent satisfying all requirements is not yet discovered at present. It is difficult to allow conventionally well-known dyes and pigments having a Color Index (C.I.) number to achieve compatibility of color hue and fastness required for the ink for inkjet recording.

As black dyes for inkjet recording, there have hitherto been widely known a food black dye, a naphthol-based direct azo dye, an acid azo dye and the like.

Typical examples of the food black dyes include C.I. Food Black 1 and C.I. Food Black 2, and techniques for using these in black inks for inkjet recording are described in JP-A-2-36276, JP-A-2-233782, JP-A-2-233783 and the like.

Further, the acid azo dyes include C.I. Acid Black 2, 31, 52, 140 and 187, and techniques for using these in black inks for inkjet recording are described in JP-A-60-108481, JP-A-2-36277, patent JP-A-2-36278 and the like. Furthermore, the direct azo dyes include C.I. Direct Black 9, 17, 38, 51, 60, 102, 107, 122, 142, 154 and 168, and techniques for using these in black inks for inkjet recording are described in JP-A-56-139568, JP-A-61-285275, JP-A-3-106974 and the like.

The present inventors have gone ahead with studies of inks for inkjet recording in which dyes are used. However, the present inventors have found out that aqueous black inks have the problem of low image durability.

As means for improving the image durability, particularly ozone resistance, of dyes for these black inks, the present inventors have proposed to increase the oxidation potential of the dyes in JP-A-2003-306623 and JP-A-2004-115620.

Further, JP-A-2004-115620 proposes that an interaction between dye molecules is strengthened to allow an existing state of a dye on an inkjet image receiving paper to resemble that of a pigment, thereby improving the fastness of the dye. However, when the interaction between dye molecules is strengthened as described above, the viscosity of a dye solution increases in some cases.

Such an increase in viscosity provides the larger influence with an increase in dye concentration in the aqueous solution.

By the way, when an ink such as an ink for inkjet recording is produced, a dye powder is generally used. However, considering handleability, solubility and the like, it is advantageous to produce the ink from a concentrated ink, that is to say, an ink stock solution.

However, it has been revealed that, for example, when a dye having a high oxidation potential is used in the ink stock solution for inkjet recording used as a raw material for the ink for inkjet recording, the viscosity becomes extremely high, which causes a large problem with regard to handleability at the time when the ink is supplied or filtered.

Such an increase in viscosity of the ink stock solution is a common problem to yellow dyes, magenta dyes and cyan dyes as well as black dyes.

SUMMARY OF THE INVENTION

An object of the invention is to provide an ink stock solution excellent in handleability, and a method for producing the same. Another object of the invention is to provide an ink composition using the ink stock solution, particularly suitable for an ink for inkjet recording, and a method for producing the same.

The objects of the invention can be attained by the following means:

1) An ink stock solution comprising a dye and a viscosity reducing agent, wherein the ink stock solution has a solid concentration of the dye of 7% or more by weight;

2) The ink stock solution described in the above 1), wherein the dye has an oxidation potential nobler than 1.0 V versus SCE;

3) The ink stock solution described in the above 1) or 2), which is a black ink stock solution, wherein the dye comprising at least one dye having a λmax of 500 nm to 700 nm and a half-value width of 100 nm or more in an absorption spectrum of a dilute solution normalized to an absorbance of 1.0 at the λmax;

4) The ink stock solution described in any one of the above 1) to 3), wherein the dye comprises a dye represented by formula (Bk):

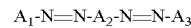

$$A_1\text{-}N\!\!=\!\!N\text{-}A_2\text{-}N\!\!=\!\!N\text{-}A_3$$

wherein $A_1$, $A_2$ and $A_3$ each independently represents an aromatic group which may be substituted or a heterocyclic group which may be substituted, $A_1$ and $A_3$ each is a univalent group, and $A_2$ is a bivalent group;

5) The ink stock solution described in any one of the above 1) to 4), which has a solid concentration of the dye of 10% or more by weight;

6) The ink stock solution described in any one of the above 1) to 5), wherein the viscosity reducing agent comprises a water-soluble organic solvent;

7) The ink stock solution described in 6), wherein the water-soluble organic solvent is an alcohol or an amide compound;

8) The ink stock solution described in any one of the above 1) to 7), wherein the viscosity reducing agent comprises a urea;

9) The ink stock solution described in any one of the above 1) to 8), which has a content of the viscosity reducing agent of 0.1 to 20% by weight;

10) The ink stock solution described in any one of the above 1) to 9), which comprises a preservative;

11) The ink stock solution described in any one of the above 1) to 10), which comprises a pH adjusting agent;

12) The ink stock solution described in any one of the above 1) to 11), which is for inkjet recording;

13) A method for producing an ink stock solution described in any one of the above 1) to 12), which comprises:
adding a dye to a water to provide a dye solution;
adding a viscosity reducing agent to the dye solution so as to control a viscosity of the dye solution;

14) A method for producing an ink stock solution described in any one of the above 1) to 12), which comprises dissolving a dye, a water and a viscosity reducing agent all together;

15) An ink composition comprising an ink stock solution described in any one of the above 1) to 12), wherein the ink composition has a viscosity of 1 to 30 mPa·s.

16) The ink composition described in the above 15), which is for inkjet recording.

17) A method for producing an ink composition described in the above 15) or 16), which comprising adjusting a dye concentration of an ink stock solution described in any one of the above 1) to 12).

The ink stock solution of the invention contains the viscosity reducing agent, so that the viscosity is kept low. Accordingly, the handleability in filtering treatment, conveyance or the like in a production process of the ink stock solution or a production process of the ink composition is improved, and at the same time, the ink composition, particularly preferably the ink for inkjet recording, having stable qualities can be produced.

Further, in the ink stock solution of the invention, the dye having a high oxidation potential can be suitably used, so that the ink stock solution is excellent in ozone resistance as well as in storage stability.

Furthermore, in the ink stock solution of the invention, a solution before pulverization in a purification process of dye synthesis can be utilized, which can contribute to cost reduction in the production of the ink composition.

DETAILED DESCRIPTION OF THE INVENTION

The ink stock solution of the invention contains a dye and a viscosity reducing agent, and the ink solution has a solid concentration of the dye of 7% or more by weight. The solid concentration of the dye is preferably from 7 to 50% by weight, and particularly preferably from 10 to 30% by weight.

The viscosity reducing agent used in the invention means one which effectively reduces the viscosity of the ink stock solution, compared to deionized water. That is to say, this means that V0<V1 is satisfied, taking the viscosity of the ink stock solution of the invention as V0, and taking as V1 the viscosity measured after the deionized water has been added in an amount equivalent to the amount of the viscosity reducing agent removed from the ink stock solution of the invention. Preferably, ΔV=V1−V0 is 10 mPa·s or more, and more preferably, 20 mPa·s or more.

The viscosity reducing agent is preferably a water-soluble organic solvent. As the water-soluble organic solvent, the solubility thereof in water at 25° C. is preferably 10 (g/100 g) or more, and more preferably 20 (g/100 g) or more.

As the water-soluble organic solvent, there is mainly used a high boiling water-miscible organic solvent having a function as a drying inhibitor, a permeation accelerator, a wetting agent or the like, preferably an alcohol or an amide compound. The alcohol is preferably a polyhydric alcohol containing two or more hydroxyl groups, because its viscosity reducing effect to the amount added is high. Examples of the alcohols include ethanol, triethylene glycol, triethylene glycol monobutyl ether, 1,2-hexanediol, 1,5-pentanediol, diethylene glycol, 1-propanol, 2-propanol, methanol, 1,6-hexanediol, 1,7-heptanediol, 1,8-octanediol and glycerol. 1,6-hexanediol, 1,7-heptanediol and 1,8-octanediol are preferred. The alcohols can be used either alone or as combination of two or more thereof.

The amide compounds include 2-pyrrolidone, N-methyl-2-pyrrolidone, dimethylformamide, dimethylacetoamnido and N-vinyl-2-pyrrolidone. The amide compounds can be used either alone or as combination of two or more thereof.

The alcohols and amid compounds as the viscosity reducing agent are not limited to the above examples.

The alcohols and amid compounds can be used as combination thereof in the ink stock solution.

A urea can be used as the viscosity reducing agent in the ink stock solution.

The amount of the viscosity reducing agent added to the ink stock solution is preferably from 0.1 to 20% by weight, more preferably from 0.1 to 10% by weight, and still more preferably from 0.2 to 6% by weight, as solid concentration.

The ink stock solution of the invention preferably comprises the dye, the viscosity reducing agent and a medium, and may contain various other ingredients described later. The concentration of ingredients other than the dye may be either high or low, compared to the ink composition, and is appropriately selected.

The medium means a solvent having the function of dissolving and/or dispersing the dye and other ingredients. These solvents generally have various functions other than the above-mentioned functions, as described above.

As the ingredients other than the dye, there are preferably contained a preservative (or an antiseptic) and the like. These ingredients are preferably adjusted so that they are not added to the ink stock solution as described in a production method of the ink composition using the ink stock solution described later, because a production process can be made simple, and the ink composition having stable qualities can be produced. However, these ingredients may be added in the production of the ink composition on request.

In the ink stock solution, the formation of insoluble matter by decomposition causes a problem in some cases. In order to prevent this, it is preferred that the preservative is added to the ink stock solution.

Various preservatives can be used in the invention.

First of all, the preservatives include heavy metal ion-containing inorganic preservatives (such as a silver ion-containing preservative) and salts. Further, various preservatives can be used as organic preservatives. Examples thereof include quaternary ammonium salts (such as tetrabutylammonium chloride, cetylpyridinium chloride and benzyltrimethylammonium chloride), phenol derivatives (such as phenol, cresol, butylphenol, xylenol and bisphenol), phenoxyether derivatives (such as phenoxyethanol), heterocyclic compounds (such as benzotriazole, PROXEL and 1,2-benzoisothiazoline-3-one), acid amides, carbamic acid and carbamate derivatives, amidines and guanidine derivatives, pyridine derivatives (such as sodium pyridinethione-1-oxide), diazines, triazines, pyrrole and imidazole derivatives, oxazoles and oxazines, thiazoles and thiadiazines, thiourea derivatives, thiosemicarbazide derivatives, dithiocarbamates, sulfides, sulfoxides, sulfones, sulfamides, antibiotic substances (such as penicillin and tetracycline), sodium dehydroacetate, sodium benzoate, ethyl p-hydroxybenzoate and salts thereof. Further, preservatives described in *Bokin Bobai Handbook* (*Handbook of Microbicides and Fungicides* (Gihodo Shuppan Co., Ltd., 1986,) and *Bokin Bobai Zai Jiten*

(*Dictionary of Microbicides and Fungicides*) (compiled by Nippon Bokin Bobai Gakkai Jiten Henshu Iinkai) can also be used.

The preservatives can be added to the ink stock solution either alone or as combination of two or more thereof.

Although various compounds such as oil-soluble compounds and water-soluble compounds can be used as these compounds, preferred are water-soluble compounds.

Above all, it is preferred that at least one preservative is a heterocyclic compound.

In the invention, when two or more preservatives are used in combination, the effect of the invention is better exhibited. Preferred examples of the combinations include a combination of the heterocyclic compound and the antibiotic substance, and a combination of the heterocyclic compound and the phenol derivative. There is no particular limitation on the content ratio at the time when two kinds of preservatives (i.e., a preservative A and a preservative B) are combined. However, the preservative A/preservative B ratio is preferably within the range of 0.01 to 100 (by weight ratio).

Although the amount of the preservative added to the ink stock solution can be used within a wide range, it is preferably from 0.001 to 10% by weight, and more preferably from 0.1 to 5% by weight.

The pH of the ink stock solutions of the invention is preferably from 3.0 to 9.0, further preferably from 5.5 to 9, and particularly preferably from 6 to 8.

Examples of a pH adjusting agent include organic bases and inorganic bases as basic adjusters and organic acids and inorganic acids as acidic adjusters.

Usable basic compounds include inorganic compounds such as sodium hydroxide, potassium hydroxide, lithium hydroxide, sodium carbonate, potassium carbonate, lithium carbonate, sodium hydrogencarbonate (sodium bicarbonate), potassium hydrogencarbonate, lithium hydrogencarbonate, sodium acetate, potassium acetate, sodium phosphate, and sodium monohydrogenphosphate, and organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine, and collidine, and alkali metal salts of organic acid such as lithium benzoate and potassium phthalate.

Usable acidic compounds include inorganic compounds such as hydrochloric acid, sulfuric acid, phosphoric acid, boric acid, sodium hydrogensulfate, potassium hydrogensulfate, potassium dihydrogenphosphate, and sodium dihydrogenphosphate and organic compounds such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolinic acid, and quinolinic acid.

When the dye is soluble in water, the ink stock solution is preferably prepared by dissolving the dye in an aqueous medium, and when the dye is soluble in oil, the ink stock solution is preferably prepared by dissolving and/or dispersing the dye in a lipophilic medium and/or an aqueous medium. The aqueous medium is a solvent mainly containing water, which contains an organic solvent such as a water-miscible organic solvent on request. This organic solvent may have the function as the viscosity reducing agent. The lipophilic medium is a medium mainly containing an organic solvent.

Although there is no particular limitation on the use of the ink stock solution of the invention, it is preferred to use for inkjet recording.

A first method for producing the ink stock solution of the invention includes adding the dye to water and dissolving the dye in water to provide a dye solution (or an aqueous solution of the dye), and then, adding the viscosity reducing agent to the dye solution to adjust the viscosity of the dye solution.

This production method of the ink stock solution includes a method of first preparing an aqueous solution of the dye (containing ingredients other than the dye on request), and then, adding the viscosity reducing a,gent to reduce the viscosity of the ink stock solution. The viscosity reducing agent may be added either while qualitatively or quantitatively measuring the viscosity of the aqueous solution of the dye in which the viscosity reducing agent is homogeneously dissolved, or in an amount previously determined. In this production method of the ink stock solution, the step of adding the viscosity reducing agent to reduce the viscosity is preferably a final step. However, concurrently with or before this step, the step of adding other ingredients or the step of filtering may be provided.

The aqueous solution of the dye is preferably prepared under heating. The heating temperature is preferably from 30 to 80° C., and more preferably from 35 to 70° C.

A second method for producing the ink stock solution of the invention includes dissolving the dye and the viscosity reducing agent together in water (i.e., dissolving the dye and the viscosity reducing agent in water in a state where they coexist). The above-mentioned step of dissolving the dye and the viscosity reducing agent together in water is the step of concurrently dissolving the viscosity reducing agent and other ingredients on request at the stage of dissolving the dye in water, and it is preferred that this step is generally used as an initial step of the preparation of the ink stock solution. This initial step is preferably a final step (when the step of filtering described later is used, before this step). However, the step of adding other ingredients may be provided after or before this step.

Also in this second method, the dye and the like may be dissolved under heating in the same manner as with the first method.

In the above-mentioned two methods for producing the ink stock solution of the invention, the water-soluble dye is used. However, it is also possible to apply the same technical idea to the oil-soluble dye.

An ink composition (i.e., an ink) of the invention contains the above-mentioned ink stock solution, and has a viscosity of 1 to 30 mPa·s.

There should not be any particular limitation on the use of the ink of the invention, and the ink of the invention can be preferably used for an ink for printing such as inkjet printing, an ink sheet in a heat-sensitive recording material, a color toner for electrophotography, a color filter used in a display such as LCD or PDP, or in an image pickup device such as CCD, and the preparation of a dying solution for dying various fibers. In particular, the ink of the invention is preferably used for an ink for inkjet printing.

The production method of the ink of the invention is characterized in that the above-mentioned ink stock solution is used.

The ink of the invention is suitably a black ink, but should not be limited thereto. It includes an ink having any color obtained by mixing with another dye or pigment.

The production method of the ink of the invention includes preparing a desired ink within the above-mentioned viscosity range by using at least the ink stock solution (hereinafter also referred to as the solution preparation step).

The solution preparation step is the step of preparing an ink having a specific viscosity and a desired use by using the ink stock solution obtained as described above, and the ink may be either a final product or an intermediate product. This solution preparation step includes at least the step of diluting the ink stock solution with a medium, preferably an aqueous medium. The ink stock solution containing the oil-soluble dye has no particular limitation on the medium used in this dilution step. However, it is preferred that the ink stock solution is dispersed in the aqueous medium by emulsification to prepare an aqueous ink. Various ingredients having required concentrations may be contained in the medium, the ingredients may be added separately to the ink stock solution, or both may be combined.

The ink produced according to the invention is more improved in dye solubility than an ink produced by a conventional method, because it has been produced by using the ink stock solution having the high dye concentration, and then, improved in ejection stability as well.

In the ink of the invention, the dye is totally contained preferably in an amount of 0.2 to 20% by weight, and more preferably in an amount of 0.5 to 15% by weight.

When the ink stock solution is prepared, it is preferred that the step of removing dust, solid matter, by filtration (filtration step) is added. A filter is used in this operation, and the filter used in this case is preferably a filter having an effective pore size of 1 µm or less, preferably 0.3 µm or less. As materials for the filter, there can be used various materials. In particular, in the case of the ink stock solution containing the water-soluble dye, a filter prepared for an aqueous solvent is preferably used. Above all, a jacket type filter made of a polymer material, which is hard to generate dust, is preferably used. As a filtration method, the solution may be forced to pass through a jacket by supplying the solution. Further, either pressure filtration or filtration under reduced pressure is utilizable.

In the invention, the viscosity reducing agent is used, so that the above-mentioned filtration treatment can be performed without resistance. However, when no viscosity reducing agent is used, the speed of the filtration treatment becomes extremely slow.

In the step of preparing the ink stock solution or the solution preparation step, as methods for dissolving the dye and the other ingredients, there can be used various methods such as dissolution by stirring, dissolution by ultrasonic irradiation and dissolution by shaking. In particular, stirring is preferably used among others. In performing the stirring, various systems known in the field of art can be used, such as flow stirring and stirring utilizing the shearing force by means of a reversal agitator or a dissolver. On the other band, a stirring method utilizing the shearing force with a bottom surface of a container, such as magnetic stirrer, can be advantageously utilized.

Then dye used the ink stock solution and the ink of the invention will be described. It is preferred, but not by way of limitation, that the dye contains at least one dye (L) having a λmax of 500 to 700 nm and a half-value width ($W\lambda_{1/2}$) of 100 nm or more, preferably from 120 to 500 nm, more preferably from 120 to 350 nm in an absorption spectrum of a dilute solution standardized (or normalized) to an absorbance of 1.0 at the λmax.

When the dye (L) can independently realize "pure black" of high image quality, that is to say, black which is not dependent on a light source for observation and difficult to emphasize any one color tone of B, G and R, it is also possible to use the dye (L) alone as a material for the ink stock solution or the ink. However, the dye (L) is generally used in combination with a dye for covering a region where the dye (L) has a low absorption. In the case of the ink using the dye (L), the dye (L) is preferably used in combination with a dye (S) having a main absorption (λmax is from 350 nm to 500 nm) in a yellow region. Further, it is also possible to use the dye (L) in combination with another dye to prepare the ink.

The dye (S) can be used in the ink stock solution. However, from the viewpoint of storage stability, it is preferred that the dye (S) is mixed to use in preparing the ink.

In the invention, such a black ink as to satisfy the following conditions is preferred, in order to satisfy 1) excellent weather resistance and/or 2) the undisputed balance of black even after color fading.

First, a black square symbol of JIS code 2223 is printed in a 48-point size by using the black ink, and the reflection density ($D_{vis}$) thereof measured by a Status A filter (visual filter) is defined as the initial density. Reflection densitometer equipped with the Status A filter include, for example, an X-Rite densitometer. When the density of "black" is measured herein, the measured value of $D_{vis}$ is used as the standard observed reflection density. The printed matter is enforcedly faded by using an ozone fading tester capable of always generating 5 ppm of ozone, and the accelerated fading rate constant ($k_{vis}$) is determined from the relational formula of $0.8=\exp(-k_{vis} \cdot t)$ according to the time (t) taken until the reflection density ($D_{vis}$) decreases to 80% of the initial reflection density value.

In the invention, the ink is prepared so as to give a rate constant ($k_{vis}$) of $5.0 \times 10^{-2}$ [hour$^{-1}$] or less, preferably $3.0 \times 10^{-2}$ [hour$^{-1}$] or less, more preferably $1.0 \times 10^{-2}$ [hour$^{-1}$] or less.

Further, the black square symbol of JIS code 2223 is printed in a 48-point size by using the black ink, and the reflection densities ($D_R$, $D_G$ and $D_B$) of three colors of C (cyan), M (magenta) and Y (yellow), which are not $D_{via}$ and are density values measured by a Status A filter, are also defined as the initial densities. $D_R$, $D_G$ and $D_B$ as used herein indicate C reflection density by a red filter, M reflection density by a green filter and Y reflection density by a blue filter, respectively. The printed matter is enforcedly faded by using an ozone fading tester capable of always generating 5 ppm of ozone according to the above-mentioned method, and the accelerated fading rate constants ($k_R$, $k_G$ and $k_B$) are determined similarly from the time taken until the reflection densities ($D_R$, $D_G$, $D_B$) decrease to 80% of the respective initial density values. When the three rate constants are determined and the ratio (R) of the maximum value to the minimum value is determined (for example, in the case where $k_R$ is the maximum value and $k_G$ is the minimum value, $R=k_G/k_G$), the ink is prepared so as to give a ratio (R) of 1.2 or less, preferably 1.1 or less, more preferably 1.05 or less.

The "printed matter obtained by printing the black square symbol of JIS code 2223 in a 48-point size" used above is an image printed in a size large enough to cover an aperture of the densitometer, in order to give a sufficiently large size for the measurement of density.

The dye used for the ink stock solutions and further the of the invention is preferably a dye having an azo group bonded to a heterocycle (hereinafter referred to as "a heterocyclic azo dye") and an associative phthalocyanine dye (hereinafter the dye used in the invention such as the heterocyclic azo dye and the phthalocyanine dye are generically referred to as "a dye for the invention"). In the invention, it is preferred that the dye contain at least one of the heterocyclic azo dye or the phthalocyanine dye, but joint use thereof with other dyes and/or pigments also is possible.

The dye used in the invention is preferably a dye having an oxidation potential nobler than 1.0 V versus SCE. The oxidation potential value (Eox) of the dye used in the invention can be easily measured by one skilled in the art. Methods therefor are described, for example, in P. Delahay, *New Instrumental Methods in Electrochemistry* (Interscience Publishers, 1954), A. J. Bard et al., *Electrochemical Methods* (John Wiley & Sons, 1980), and Akira Fujishima et al., *Denkikagaku Sokutei Ho (Electrochemical Measuring Methods)*, (Gihodo Shuppan Sha, 1984,).

Specifically, a sample to be tested is dissolved at a concentration of $1 \times 10^{-2}$ to $1 \times 10^{-6}$ mol/liter in a solvent such as dimethylformamide or acetonitrile containing a supporting electrolyte such as sodium perchlorate or tetrapropylammonium perchlorate, and the oxidation potential is measured as a value to SCE (saturated calomel electrode) by using various voltammetries (e.g., polarography using a dropping mercury electrode, cyclic voltammetry and method using a rotating disk electrode). This value sometimes deviates on the order of several tens of millivolts under the influence of the effect of liquid junction potential, liquid resistance of a sample solution, or the like. However, reproducibility of the potential can be guaranteed by using a standard sample (for example, hydroquinone).

In order to univocally specify the potential, in the invention, the value (vs SCE) measured in a N,N-dimethylformamide (dye concentration; 0.001 mol/liter) containing 0.1 mol/liter of tetrapropylammonium perchlorate as the supporting electrolyte, where SCE (saturated calomel electrode) as the reference electrode, a graphite electrode as the work electrode and a platinum electrode as the counter electrode are used, is taken as the oxidation potential of the dye.

The Eox value indicates the transferability of an electron from the sample to the electrode, and as the value is larger (the oxidation potential is nobler), the electron is less transferable from the sample to the electrode, in other words, oxidation is difficult to occur. As for the relationship with the structure of compound, the oxidation potential becomes nobler by introducing an electron-withdrawing group, and becomes baser by introducing an electron-donating group. In the invention, in order to reduce the reactivity with ozone that is an electrophilic agent, it is desirable to make the oxidation potential nobler by introducing an electron-withdrawing group into a dye skeleton.

Furthermore, in the dye for the invention, $\epsilon_1/\epsilon_2$ values are preferably 1.1 or higher, more preferably from 1.1 to 1.5 and particularly preferably from 1.2 to 1.5 in he following evaluation method of associating properties.

Evaluation Method of Associating Properties of Dye

The associating properties of dye can be evaluated as follows. A ratio of $\epsilon_1/\epsilon_2$ becomes an index of associating properties of a dye wherein $\epsilon_1$ is a molecular absorptivity coefficient of an absorption spectrum in measurement of a dye solution of 0.01 mmol/liter by use of a cell of optical path of 1 cm and $\epsilon_2$ is a molecular absorptivity coefficient of an absorption spectrum in measurement of a dye solution of 20 mmol/liter by use of a cell of optical path of 5 μm. When a dye has a value of 1.1 or higher, the dye displays excellent performance in ozone resistance and light resistance because of its associating properties.

In the above-described measurement, when a dye is water-soluble, a solvent used for the solutions of the dye is ultrapure water having a specific resistance of 18 MΩ·cm or more such as deionized water. When the dye is oil-soluble, an organic solvent that can solve the dye is used to form a uniform solution or, similarly to water-soluble dyes, a dispersion in ultrapure water or an emulsion is formed for the measurement.

First, the heterocyclic azo dyes are illustrated.

In this specification, the term "substituted" used in "a substituted alkyl group" or the like means that a hydrogen atom existing in an "alkyl group" is substituted by a particular substituent group. An expression "an alkyl group having a substituent group" also has the same meaning as the above-described substituted alkyl group. Furthermore, an expression "an alkyl group which may be substituted" means an ordinary (unsubstituted) alkyl group and a substituted alkyl group as described above. A similar expression "heterocyclic groups which may be substituted" also has the same meaning as above.

Although the heterocyclic azo dye is not particularly limited as long as at least one structure having an azo group bonded to a heterocycle exists, an azo dye having an azo group bonded to a carbon atom of the hetercycle is preferable, and an azo dye having an azo group, each end of the azo group having a heterocyclic group, is preferable.

The heterocyclic azo dye used in the invention is preferably a compound represented by formula (Bk). The compound represented by formula (Bk) is not always the above-described heterocyclic azo dye.

The dye represented by formula (Bk) will be described below. The dye represented by formula (Bk) is preferably a black dye. The dye represented by formula (Bk) has preferably at least one of the above-described characteristics, more preferably all of the above-described characteristics. The oxidation potential of the dye represented by formula (Bk) is preferably nobler than 1.1 V (vs SCE), more preferably nobler than 1.15 V (vs SCE).

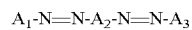    Formula (Bk):

In formula (Bk), $A_1$, $A_2$ and $A_3$ each independently represents an aromatic group which may be substituted or a heterocyclic group which may be substituted, $A_1$ and $A_3$ each is a univalent group and $A_2$ is a bivalent group.

It is particularly preferred that the azo dye represented by formula (Bk) is a dye represented by formula (Bk-a):

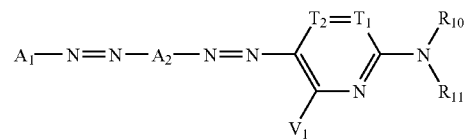

wherein $T_1$ and $T_2$ each represents =$CR_{12}$— and —$CR_{13}$=, respectively, or either one thereof represents a nitrogen atom, and the other represents =$CR_{12}$— or —$CR_{13}$=.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent group.

Further, $R_{12}$ and $R_{11}$, or $R_{10}$ and $R_{11}$ may combine with each other to form a 5- or 6-membered ring. $A_1$ and $A_2$ have the same meanings as in formula (Bk).

It is preferred that the azo dye represented by formula (Bk-a) is further a dye represented by formula (Bk-b-1) or (Bk-b-2):

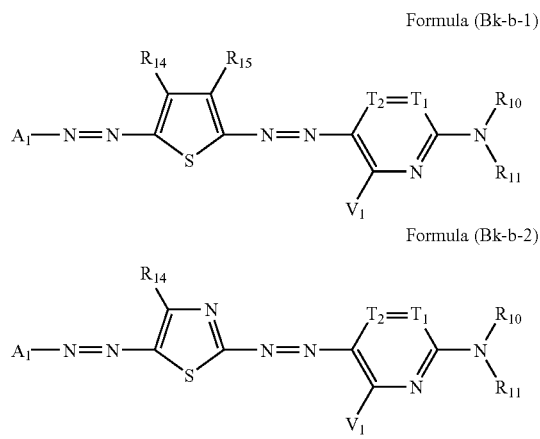

Formula (Bk-b-1)

Formula (Bk-b-2)

In the above-mentioned formulas (Bk-b-1) and (Bk-b-2), $R_{14}$ and $R_{15}$ have the same meaning as $R_{12}$ in formula (Bk-a), and $A_1$, $R_{10}$, $R_{11}$, $T_1$, $T_2$ and $V_1$ have the same meanings as in formula (Bk-a).

Terms (substituent groups) used here in the descriptions of formula (Bk), formula (Bk-a), formula (Bk-b-1) and formula (Bk-b-2) (when formula (Bk-b-1) and formula (Bk-b-2) are collectively indicated, they are described as formula (Bk-b)) will be illustrated. These terms are also commonly used in the description of formula (Bk-c) described later.

The halogen atoms include a fluorine atom, a chlorine atom and a bromine atom.

The aliphatic group means an alkyl group, a substituted alkyl group, an alkenyl group, a substituted alkenyl group, an alkynyl group, a substituted alkynyl group, an aralkyl group or a substituted aralkyl group. The aliphatic group may be branched, or may form a ring. The number of carbon atoms in the aliphatic group is preferably from 1 to 20, and more preferably from 1 to 16. The aryl moiety in the aralkyl group and the substituted aralkyl group is preferably phenyl or naphthyl, and more preferably phenyl. Examples of the aliphatic groups include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The univalent aromatic group means an aryl group or a substituted aryl group. The aryl group is preferably a phenyl group or a naphthyl group, and particularly preferably a phenyl group. The number of carbon atoms in the univalent aromatic group is preferably from 6 to 20, and more preferably from 6 to 16. Examples of the univalent aromatic groups include a phenyl group, a p-tolyl group, a p-methoxyphenyl group, an o-chlorophenyl group and an m-(3-sulfopropylamino)phenyl group. The bivalent aromatic group is a group in which each of these univalent aromatic groups is made bivalent, and examples thereof include a phenylene group, a p-tolylene group, a p-methoxyphenylene group, an o-chlorophenylene group, an m-(3-sulfopropylamino)phenylene group and a naphthylene group.

The heterocyclic groups include a heterocyclic group having a substituent group and an unsubstituted heterocyclic group. The heterocyclic ring may be condensed with an aliphatic ring, an aromatic ring or another heterocyclic ring. The heterocyclic group is preferably a 5- or 6-membered heterocyclic group. Heteroatoms of the heterocyclic rings include N, O and S. Examples of the above-mentioned substituent groups include an aliphatic group, a halogen atom, an alkylsulfonyl group, an arylsulfonyl group, an acyl group, an acylamino group, a sulfamoyl group, a carbamoyl group and an ionic hydrophilic group. Examples of the univalent heterocyclic groups include a 2-pyridyl, group, a 2-thienyl group, a 2-thiazolyl group, a 2-benzothiazolyl group, a 2-benzoxazolyl group and a 2-furyl group. The bivalent heterocyclic group is a group in which a hydrogen atom of the above-mentioned univalent heterocyclic ring is eliminated to form a bonding hand.

The carbamoyl groups include a carbamoyl group having a substituent group and an unsubstituted carbamoyl group. Examples of the above-mentioned substituent groups include an alkyl group. Examples of the above-mentioned carbamoyl group include a methylcarbamoyl group and a dimethylcarbamoyl group.

The alkoxycarbonyl groups include an alkoxycarbonyl group having a substituent group and an unsubstituted alkoxycarbonyl group. The alkoxycarbonyl group is preferably an alkoxycarbonyl group having from 2 to 20 carbon atoms. Examples of the substituent groups include an ionic hydrophilic group. Examples of the above-mentioned alkoxycarbonyl groups include a methoxycarbonyl group and an ethoxycarbonyl group.

The aryloxycarbonyl groups include an aryloxycarbonyl group having a substituent group and an unsubstituted aryloxycarbonyl group. The aryloxycarbonyl group is preferably an aryloxycarbonyl group having from 7 to 20 carbon atoms. Examples of the above-mentioned substituent groups include an ionic hydrophilic group. Examples of the above-mentioned aryloxycarbonyl group include a phenoxycarbonyl group.

The heterocyclic oxycarbonyl groups include a heterocyclic oxycarbonyl group having a substituent group and an unsubstituted heterocyclic oxycarbonyl group. The heterocyclic oxycarbonyl group is preferably a heterocyclic oxycarbonyl group having from 2 to 20 carbon atoms. Examples of the above-mentioned substituent groups include an ionic hydrophilic group. Examples of the above-mentioned heterocyclic oxycarbonyl groups include a 2-pyridyloxycarbonyl group.

The acyl groups include an acyl group having a substituent group and an unsubstituted acyl group. The acyl group is preferably an acyl group having from 1 to 20 carbon atoms. Examples of the above-mentioned substituent groups include an ionic hydrophilic group. Examples of the above-mentioned acyl groups include an acetyl group and a benzoyl group.

The alkoxy groups include an alkoxy group having a substituent group and an unsubstituted alkoxy group. The alkoxy group is preferably an alkoxy group having from 1 to 20 carbon atoms. Examples of the substituent groups include an alkoxy group, a hydroxyl group and an ionic hydrophilic group. Examples of the above-mentioned alkoxy groups include a methoxy group, an ethoxy group, an isopropoxy group, a methoxyethoxy group, a hydroxyethoxy group and a 3-carboxy-propoxy group.

The aryloxy groups include an aryloxy group having a substituent group and an unsubstituted aryloxy group. The aryloxy group is preferably an aryloxy group having from 6 to 20 carbon atoms. Examples of the above-mentioned substituent groups include an alkoxyl group and an ionic hydrophilic group, Examples of the above-mentioned aryloxy groups include a phenoxy group, a p-methoxyphenoxy group and an o-methoxyphenoxy group.

The heterocyclic oxy groups include a heterocyclic oxy group having a substituent group and an unsubstituted heterocyclic oxy group. The heterocyclic oxy group is preferably a heterocyclic oxy group having from 2 to 20 carbon atoms. Examples of the above-mentioned substituent groups include an alkyl group, an alkoxyl group and an ionic hydrophilic group. Examples of the above-mentioned heterocyclic oxy groups include a 3-pyridyloxy group and a 3-thienyloxy group.

The silyloxy group is preferably a silyloxy group substituted by an aliphatic group having from 1 to 20 carbon atoms or an aromatic group. Examples of the silyloxy groups include a trimethylsilyloxy group and a diphenylmethylsilyloxy group.

The acyloxy groups include an acyloxy group having a substituent group and an unsubstituted acyloxy group. The acyloxy group is preferably an acyloxy group having from 1 to 20 carbon atoms. Examples of the above-mentioned substituent groups include an ionic hydrophilic group. Examples of the acyloxy groups include an acetoxy group and a benzoyloxy group.

The carbamoyloxy groups include a carbamoyloxy group having a substituent group and an unsubstituted carbamoyloxy group. Examples of the above-mentioned substituent groups include an alkyl group. Examples of the carbamoyloxy groups include an N-methylcarbamoyloxy group.

The alkoxycarbonyloxy groups include an alkoxycarbonyloxy group having a substituent group and an unsubstituted alkoxycarbonyloxy group. The alkoxycarbonyloxy group is preferably an alkoxycarbonyloxy group having from 2 to 20 carbon atoms. Examples of the alkoxycarbonyloxy groups include a methoxycarbonyloxy group and an isopropoxycarbonyloxy group.

The aryloxycarbonyloxy groups include an aryloxycarbonyloxy group having a substituent group and an unsubstituted aryloxycarbonyloxy group. The aryloxy-carbonyloxy group is preferably an aryloxycarbonyloxy group having from 7 to 20 carbon atoms. Examples of the aryloxycarbonyloxy groups include a phenoxycarbonyloxy group.

The amino groups include an amino group substituted by an alkyl group, an aryl group or a heterocyclic group, wherein the alkyl group, the aryl group and the heterocyclic group may each further have a substituent group. The alkylamino group is preferably an alkylamino group having from 1 to 20 carbon atoms. Examples of the substituent groups include an ionic hydrophilic group. Examples of the alkylamino groups include a methylamino group and a diethylamino group.

The arylamino groups include an arylamino group having a substituent group and an unsubstituted arylamino group. The arylamino group is preferably an arylamino group having from 6 to 20 carbon atoms. Examples of the substituent groups include a halogen atom and an ionic hydrophilic group. Examples of the arylamino groups include an anilino group and a 2-chlorophenylamino group.

The heterocyclic amino groups include a heterocyclic amino group having a substituent group and an unsubstituted heterocyclic amino group. The heterocyclic amino group is preferably a heterocyclic amino group having from 2 to 20 carbon atoms. Examples of the substituent groups include an alkyl group, a halogen atom and an ionic hydrophilic group.

The acylamino groups include an acylamino group having a substituent group and an unsubstituted acylamino group. The acylamino group is preferably an acylamino group having from 2 to 20 carbon atoms. Examples of the substituent groups include an ionic hydrophilic group. Examples of the acylamino groups include an acetylamino group, a propionylamino group, a benzoylamino group, an N-phenylacetylamino group and a 3,5-disulfobenzoylamino group.

The ureido groups include a ureido group having a substituent group and an unsubstituted ureido group. The ureido group is preferably a ureido group having from 1 to 20 carbon atoms. Examples of the substituent groups include an alkyl group and an aryl group. Examples of the ureido groups include a 3-methylureido group, a 3,3-dimethylureido group and a 3-phenylureido group.

The sulfamoylamino groups include a sulfamoylamino group having a substituent group and an unsubstituted sulfamoylamino group. Examples of the substituent groups include an alkyl group. Examples of the sulfamoylamino groups include an N,N-dipropylsulfamoylamino group.

The alkoxycarbonylamino groups include an alkoxycarbonylamino group having a substituent group and an unsubstituted alkoxycarbonylamino group. The alkoxycarbonylamino group is preferably an alkoxycarbonylamino group having from 2 to 20 carbon atoms. Examples of the substituent groups include an ionic hydrophilic group. Examples of the alkoxycarbonylamino groups include an ethoxycarbonylamino group.

The aryloxycarbonylamino groups include an aryloxycarbonylamino group having a substituent group and an unsubstituted aryloxycarbonylamino group. The aryloxycarbonylamino group is preferably an aryloxycarbonylamino group having from 7 to 20 carbon atoms. Examples of the substituent groups include an ionic hydrophilic group. Examples of the aryloxycarbonylamino groups include a phenoxycarbonylamino group.

The alkylsulfonylamino and arylsulfonylamino groups include alkylsulfonylamino and arylsulfonylamino groups each having a substituent group and unsubstituted alkylsulfonylamino and arylsulfonylamino groups. The sulfonylamino group is preferably a sulfonylamino group having from 1 to 20 carbon atoms. Examples of the substituent groups include an ionic hydrophilic group. Examples of these sulfonylamino groups include a methylsufonylamino group, an N-phenylmethyl-sulfonylamino group, a phenylsulfonylamino group and a 3-carboxyphenylsulfonylamino group.

The heterocyclic sulfonylamino groups include a heterocyclic sulfonylamino group having a substituent group and an unsubstituted heterocyclic sulfonylamino group. The heterocyclic sulfonylamino group is preferably a heterocyclic sulfonylamino group having from 1 to 12 carbon atoms. Examples of the substituent groups include an ionic hydrophilic group. Examples of the heterocyclic sulfonylamino groups include a 2-thiophenesulfonylamino group and a 3-pyridinesulfonylamino group.

The heterocyclic sulfonyl groups include a heterocyclic sulfonyl group having a substituent group and an unsubstituted heterocyclic sulfonyl group. The heterocyclic sulfonyl group is preferably a heterocyclic sulfonyl group having from 1 to 20 carbon atoms. Examples of the substituent groups include an ionic hydrophilic group. Examples of the heterocyclic sulfonyl groups include a 2-thiophenesulfonyl group and a 3-pyridinesulfonyl group.

The heterocyclic sulfinyl groups include a heterocyclic sulfinyl group having a substituent group and an unsubstituted heterocyclic sulfinyl group. The heterocyclic sulfinyl group is preferably a heterocyclic sulfinyl group having from 1 to 20 carbon atoms. Examples of the substituent groups include an ionic hydrophilic group. Examples of the heterocyclic sulfinyl groups include a 4-pyridinesulfinyl group.

The alkylthio, arylthio and heterocyclic thio groups include alkylthio, arylthio and heterocyclic thio groups each having a substituent group and unsubstituted alkylthio, arylthio and heterocyclic thio groups. The alkylthio, arylthio and heterocyclic thio groups are preferably alkylthio, arylthio and heterocyclic thio groups each having from 1 to 20 carbon atoms, respectively. Examples of the substituent groups include an ionic hydrophilic group. Examples of the alkylthio, arylthio and heterocyclic thio groups include a methylthio group, a phenylthio group and a 2-pyridylthio group.

The alkylsulfonyl and arylsulfonyl groups include alkylsulfonyl and arylsulfonyl groups each having a substituent group and unsubstituted alkylsulfonyl and arylsulfonyl groups. Examples of the alkylsulfonyl and arylsulfonyl groups include a methylsulfonyl group and a phenylsulfonyl group, respectively.

The alkylsulfinyl and arylsulfinyl groups include alkylsulfinyl and arylsulfinyl groups each having a substituent group and unsubstituted alkylsulfinyl and arylsulfinyl groups. Examples of the alkylsulfinyl and arylsulfinyl groups include a methylsulfinyl group and a phenylsulfinyl group, respectively.

The sulfamoyl groups include a sulfamoyl group having a substituent group and an unsubstituted sulfamoyl group. Examples of the substituent groups include an alkyl group. Examples of the sulfamoyl groups include a dimethylsulfamoyl group and a di-(2-hydroxyethyl)sulfamoyl group.

Formulas (Bk), (Bk-a) and (Bk-b) will be further described below. In the following description, those already described for the respective groups and substituent groups are also applied.

In formula (Bk), $A_1$, $A_2$ and $A_3$ each independently represents an aromatic group ($A_1$ and $A_3$ each is a univalent aromatic group such as an aryl group, and $A_2$ is a bivalent aromatic group such as an arylene group) which may be substituted, or a heterocyclic group ($A_1$ and $A_3$ each is a univalent aromatic group, and $A_2$ is a bivalent heterocyclic group) which may be substituted. Examples of the aromatic rings include a benzene ring and a naphthalene ring. Heteroatoms of the heterocyclic rings include N, O and S. The heterocyclic ring may be condensed with an aliphatic ring, an aromatic ring or another heterocyclic ring.

The substituent group may be an arylazo group or a heterocyclic azo group. Accordingly, the dyes represented by formula (Bk) also include a trisazo dye and a tetrakis dye.

Further, at least two of $A_1$, $A_2$ and $A_3$ are preferably heterocyclic groups.

The heterocyclic group represented by $A_3$ is preferably an aromatic nitrogen-containing 6-membered heterocyclic group. Particularly preferred is the case where $A_3$ is an aromatic nitrogen-containing 6-membered heterocyclic group represented by formula (P), and in this case, formula (Bk) corresponds to formula (Bk-4).

Formula (P):

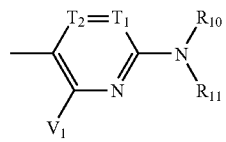

wherein $T_1$ and $T_2$ each represents $=CR_{12}-$ and $-CR_{13}=$, respectively, or either one thereof represents a nitrogen atom, and the other represents $=CR_{12}-$ or $-CR_{13}=$. However, it is more preferred that $T_1$ and $T_2$ each represents $=CR_{12}-$ and $-CR_{13}=$, respectively.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent group. Preferred examples of the substituent groups represented by $R_{10}$ and $R_{11}$ include a hydrogen atom, an aliphatic group, an aromatic group, a heterocyclic group, an acyl group, an alkylsulfonyl group and an arylsulfonyl group. More preferred are a hydrogen atom, an aromatic group, a heterocyclic group, an acyl group, an alkylsulfonyl group and an arylsulfonyl group, and most preferred are a hydrogen atom, an aryl group and a heterocyclic group. Each group may further have a substituent.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxy group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkylthio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group or a sulfo group, and each group may be further substituted.

The substituent groups represented by $V_1$ is preferably a hydrogen atom, a halogen atom, an aliphatic group, an aromatic group, a hydroxy group, an alkoxy group, an aryloxy group, an acyloxy group, a heterocyclic oxy group, an amino group (including an alkylamino group, an arylamino group and a heterocyclic amino group), an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group (including an alkylamino group, an arylamino group and a heterocyclic amino group) or an acylamino group, and most preferably a hydrogen atom, an arylamino group or an acylamino group among others. Each group may further have a substituent group.

Preferred examples of the substituent groups represented by $R_{12}$ and $R_{13}$ include a hydrogen atom, an alkyl group, an aryl group, a heterocyclic group, a halogen atom, an alkoxycarbonyl group, a carboxyl group, a carbamoyl group, a hydroxy group, an alkoxy group and a cyano group. Each group may further have a substituent group. $R_{12}$ and $R_{10}$, or $R_{10}$ and $R_{11}$ may combine with each other to form a 5- or 6-membered ring. When the substituent groups represented by $A_1$, $R_{12}$, $R_{13}$, $R_{10}$, $R_{11}$ and $V_1$ further have substituent groups, examples of the substituent groups include the substituent groups described for the above $V_1$, $R_{10}$ and $R_{11}$. In addition, it is preferred that an ionic hydrophilic group is further present as a substituent group at any position on $A_1$, $R_8$, $R_9$, $R_{10}$, $R_{11}$ and $V_1$.

The ionic hydrophilic groups as the substituent groups include a sulfo group, a carboxyl group, a phosphono group and a quaternary ammonium group. The above-mentioned ionic hydrophilic groups are preferably a carboxyl group, a phosphono group and a sulfo group, and particularly preferably a carboxyl group and a sulfo group. The carboxyl group, the phosphono group and the sulfo group each may be in a salt state, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Above all, a lithium ion is preferred.

Preferred examples of the heterocyclic rings represented by $A_2$ include a thiophene ring, a thiazole ring an imidazole ring, a benzothiazole ring and a thienothiazole ring. Each heterocyclic group may further have a substituent group. Above all, preferred are a thiophene ring, a thiazole ring, an imidazole ring, a benzothiazole ring and a thienothiazole ring represented by formulas (a) to (e), respectively. When $A_2$ is a thiophene ring represented by formula (a) and $A_3$ has a structure represented by the above-mentioned formula (P), formula (Bk) corresponds to formula (Bk-b-1). When $A_2$ is a thiazole ring represented by formula (b) and $A_3$ has a structure represented by the above-mentioned formula (P), formula (Bk) corresponds to formula (Bk-b-2).

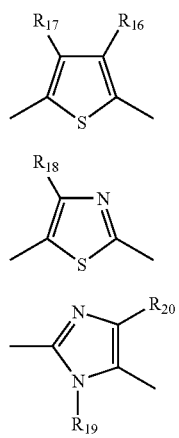

(a)

(b)

(c)

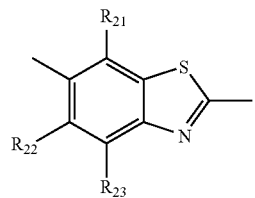

(d)

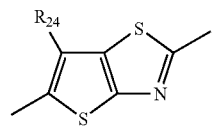

(e)

In the above-mentioned formulas (a) to (e), $R_{16}$ to $R_{24}$ represent substituent groups having the same meanings as $V_1$, $R_{12}$ and $R_{13}$ in formula (P).

Of the dyes represented by formula (Bk-b), a dye having a structure represented by formula (Bk-c-1) or (Bk-c-2) (when formula (Bk-c-1) and formula (Bk-c-2) are collectively indicated, they are described as formula (Bk-c)) is particularly preferred.

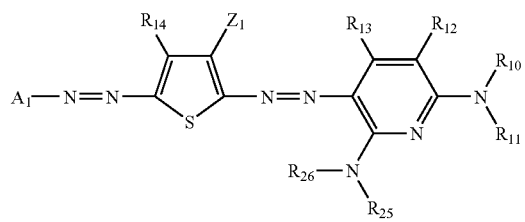

Formula (Bk-c-1)

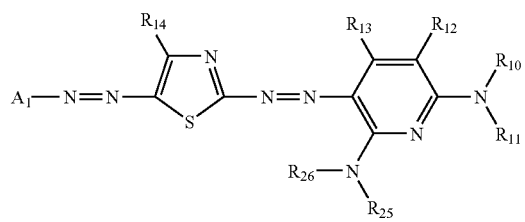

Formula (Bk-c-2)

In formulae (Bk-c-1) and (Bk-c-2), $Z_1$ represents an electron-withdrawing group having a Hammett's substituent constant σp value of 0.20 or more. $Z_1$ is preferably an electron-withdrawing group having a σp value of 0.30 or more, more preferably 0.45 or more, and particularly preferably 0.60 or more. However, it is preferred that the σp value does not exceed 1.0.

Specific examples of the electron-withdrawing groups having a Hammett's substituent constant σp value of 0.60 or more include a cyano group, a nitro group, an alkylsulfonyl group (for example, a methanesulfonyl group) and an arylsulfonyl group (for example, a benzenesulfonyl group).

The electron-withdrawing groups having a Hammett's substituent constant σp value of 0.45 or more include an acyl group (for example, acetyl), an alkyloxycarbonyl group (for example, dodecyloxycarbonyl), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl or N,N-dimethylsulfamoyl) and a halogenated alkyl group (for example, trifluoromethyl), in addition to the groups described above.

The electron-withdrawing groups having a Hammett's substituent constant σp value of 0.30 or more include an acyloxy group (for example, acetoxy), a carbamoyl group (for example, N-ethylcarbamoyl, N,N-dibutylcarbamoyl), a halogenated alkoxyl group (for example, trifluoromethyloxy), a halogenated aryloxy group (for example, pentafluorophenyloxy), a sulfonyloxy group (for example, methylsulfonyloxy), a halogenated alkylthio group (for example, difluoromethylthio), an aryl group substituted by two or more electron-withdrawing groups having a σp value of 0.15 or more (for example, 2,4-dinitrophenyl or pentachlorophenyl) and a heterocyclic ring (for example, 2-benzoxazolyl, 2-benzothiazolyl or 1-phenyl-2-benzimidazolyl), in addition to the groups described above.

Specific examples of the electron-withdrawing group having a σp value of 0.20 or more include a halogen atom, in addition to the groups described above.

As $Z_1$, preferred are an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms and a halogenated alkyl group having from 1 to 20 carbon atoms among others. Particularly preferred are a cyano group, an alkylsulfonyl group having from 1 to 20 carbon atoms and an arylsulfonyl group having from 6 to 20 carbon atoms, and most preferred is a cyano group.

The Hammett's substituent constant σp value used in this specification has the same meaning as described in (0059) to (0060) of JP-A-2003-306623.

$R_{10}$, $R_{11}$, $R_{12}$, $R_{13}$ and $R_{14}$ in formula (Bk-c) have the same meanings as in formula (Bk-b). $R_{25}$ and $R_{26}$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group. Above all, a hydrogen atom, an aromatic group, a heterocyclic group, an acyl group, an alkylsulfonyl group or an arylsulfonyl group is preferred, and a hydrogen atom, an aromatic group or a heterocyclic group is particularly preferred.

The respective groups described in formula (Bk-c) may further have substituent groups. When the respective groups further have the substituent groups, the substituent groups include the substituent groups described in formula (Bk-a), the groups exemplified as $V_1$, $R_{10}$ and $R_{11}$, and ionic hydrophilic groups.

Further, the azo dye represented by formula (Bk) is preferably an azo dye having a conjugate pi electron in an aromatic ring group not directly linked to an azo group, in order to secure storage stability in an aqueous solution or an ink. The aromatic ring group directly linked to the azo group means the whole aromatic ring group linked to the azo group. In contrast, the aromatic ring group not directly linked to the azo group means an aromatic ring group which is not directly linked to the azo group and exists as a substituent group on a chromophore constituting the azo dye. For example, when a naphthalene ring is directly linked to the azo group, the whole naphthalene ring is considered to be the aromatic ring group directly lined to the azo dye. When a biphenyl group is linked to the azo group, a phenyl group linked to the azo group is the aromatic ring group directly linked, and the other phenyl group is taken as the aromatic ring group not directly linked. The aromatic ring means an aromatic group or an aromatic heterocyclic group. The aromatic heterocyclic group means a substituent group having a heteroatom and showing aromaticity. The above-mentioned dye comes to show preferred association properties by having such an aromatic ring group as a substituent group, thereby being able to improve storage stability. Substitution positions of the aromatic ring group in formula (Bk-c) are preferably $R_{10}$, $R_{11}$, $R_{12}$, $R_{13}$, $R_{14}$, $R_{25}$ and $R_{26}$, and particularly preferably $R_{10}$, $R_{11}$, $R_{14}$, $R_{25}$ and $R_{26}$.

$A_1$ may be either the aromatic group or the heterocyclic group. However, preferred is a benzene ring, a naphthalene ring, a pyridine ring, an imidazole ring, a pyrazole ring, a thiazole ring, an isothiazole ring, a thiadiazole ring, a benzothiazole ring or a benzisothiazole ring, more preferred is a benzene ring, a naphthalene ring, a pyridine ring, a pyrazole ring, an imidazole ring, an isothiazole ring or a benzothiazole ring, and most preferred is a benzene ring or a naphthalene ring.

In a particularly preferred combination of the substituent groups as the azo dye represented by formula (Bk-a) of the invention, $R_{10}$ and $R_{11}$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, both $R_{10}$ and $R_{11}$ are not hydrogen atoms.

$V_1$ is preferably a hydrogen atom, a halogen atom, an alkyl group, a hydroxyl group, an amino group or an acylamino group, more preferably a hydrogen atom, a halogen atom, an amino group or an acylamino group, and most preferably a hydrogen atom, an amino group or an acylamino group.

$T_1$ and $T_2$ each is $=CR_{12}-$ or $-CR_{13}=$, and $R_{12}$ and $R_{13}$ each is preferably a hydrogen atom, an alkyl group, a halogen atom, a cyano group, a carbamoyl group, a carboxyl group, a hydroxyl group, an alkoxy group or an alkoxycarbonyl group, and more preferably a hydrogen atom, an alkyl group, a carboxyl group, a cyano group or a carbamoyl group.

As for a preferred combination of the substituent groups in the azo dye represented by the above-mentioned formula (Bk), a compound in which at least one of the various substituent groups is the above-mentioned preferred group is preferred, a compound in which more of the various substituent groups are the above-mentioned preferred groups is more preferred, and a compound in which all of the substituent groups are the above-mentioned preferred groups is most preferred.

In order that the azo dyes represented by formula (Bk) possess preferred hue, fastness properties, and preservation stability, it is preferred that the dyes satisfy the following physical properties, which also is effective in the control of bronzing.

Physical Properties 1; When the maximum absorption wavelength of an absorption spectrum in DMF is made $\lambda_{max}$ (DMF), 680 nm $\geq \lambda_{max}$(DMF) $\geq$ 570 nm.

Physical Properties 2; When the maximum absorption wavelength of an absorption spectrum in water is made $\lambda_{max}$ (water), $|\lambda_{max}(DMF) - \lambda_{max}(water)| \geq 30$ nm.

Physical Properties 3; When the molar absorption coefficient in DMF is made $\epsilon$ (DMF) and that in water is made $\epsilon$(water), $\epsilon$(water)/$\epsilon$(DMF) $\leq$ 0.9.

Physical Properties 4: When the absorbance in the maximum absorption wavelength of an associated body in the absorption spectrum measured in water is made Abs(associated body) and the absorbance in the maximum absorption wavelength of a monomer in the absorption spectrum measured in DMF is made Abs(monomer), Abs(monomer)/Abs (associated body)≦0.75.

Herein, the above-described physical properties obey the definition in Japanese Patent Application No. 2003-353498.

Specific examples of the azo dyes represented by the above-mentioned formula (1) are shown below, but the invention is not limited thereto. Further, in the following specific examples, a carboxyl group, a phosphono group and a sulfo group each may be in a salt state, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of these, an ammonium ion, an organic cation or a lithium ion is preferred, and a lithium ion is most preferred.

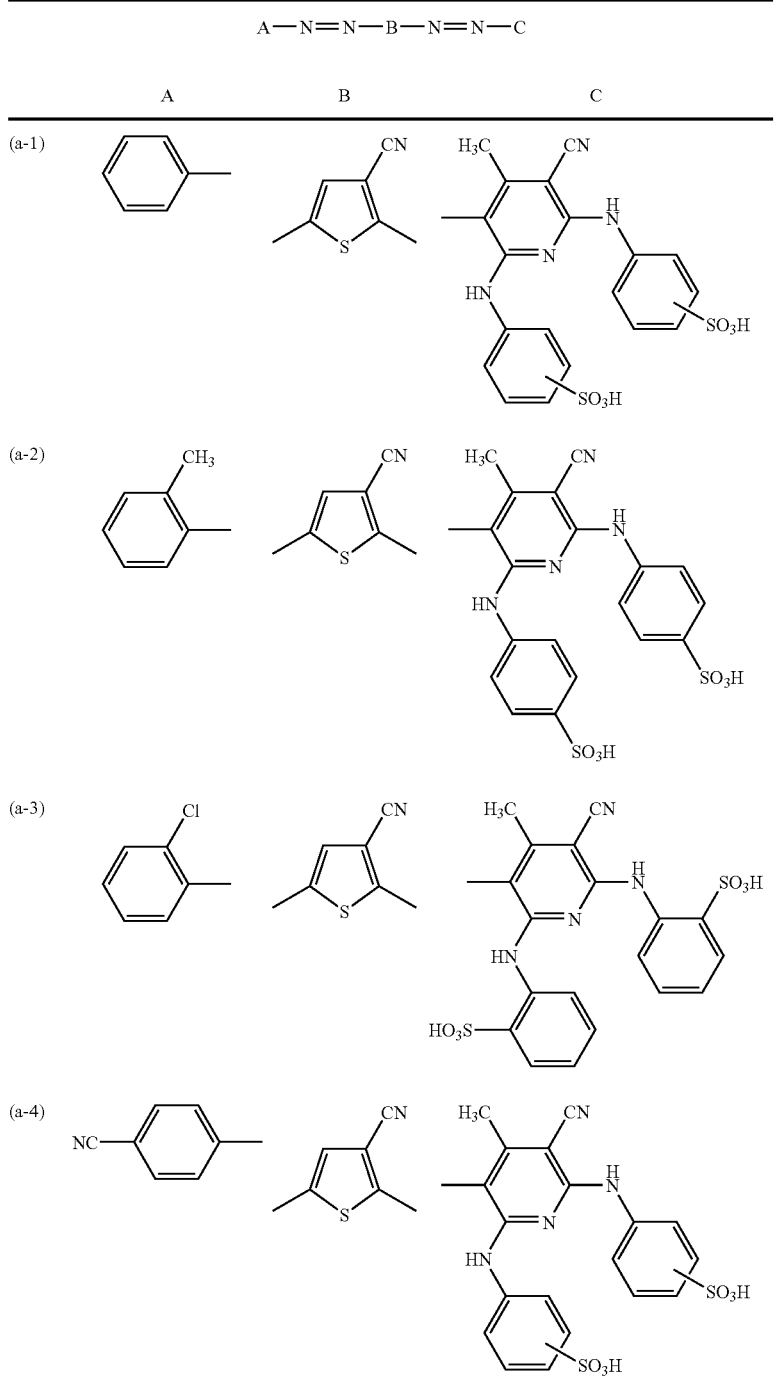

-continued
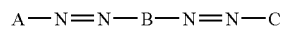
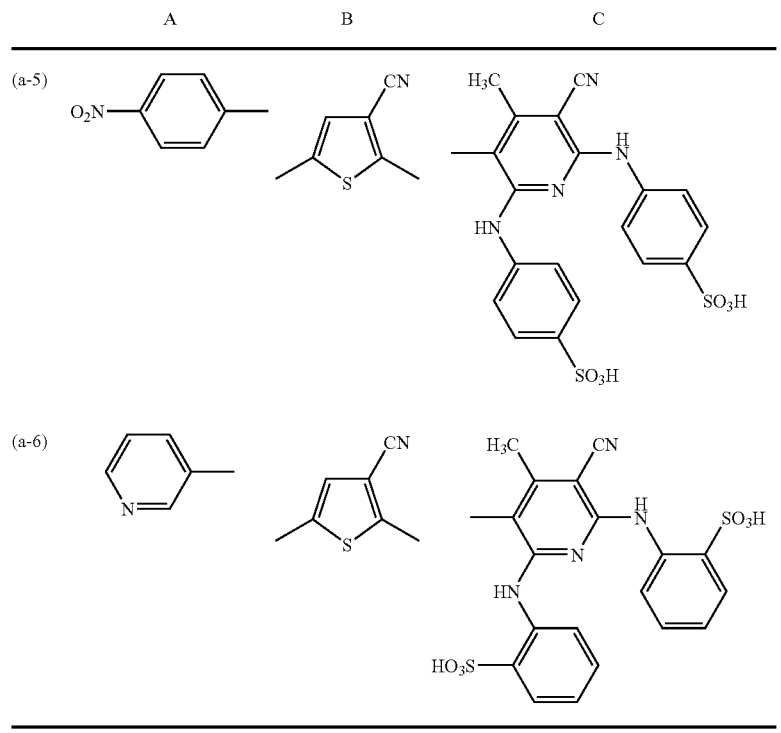
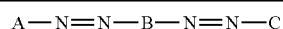
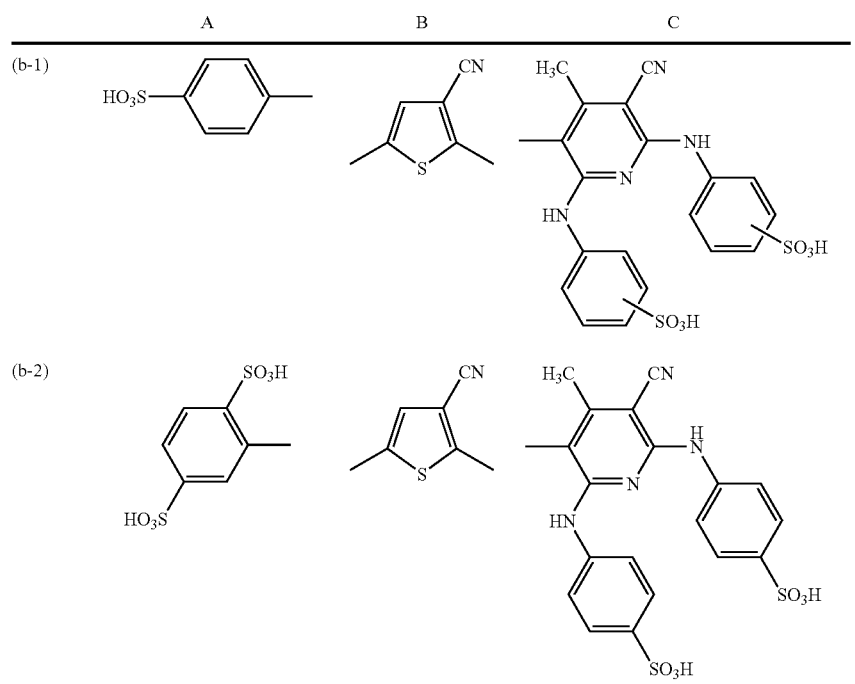

-continued
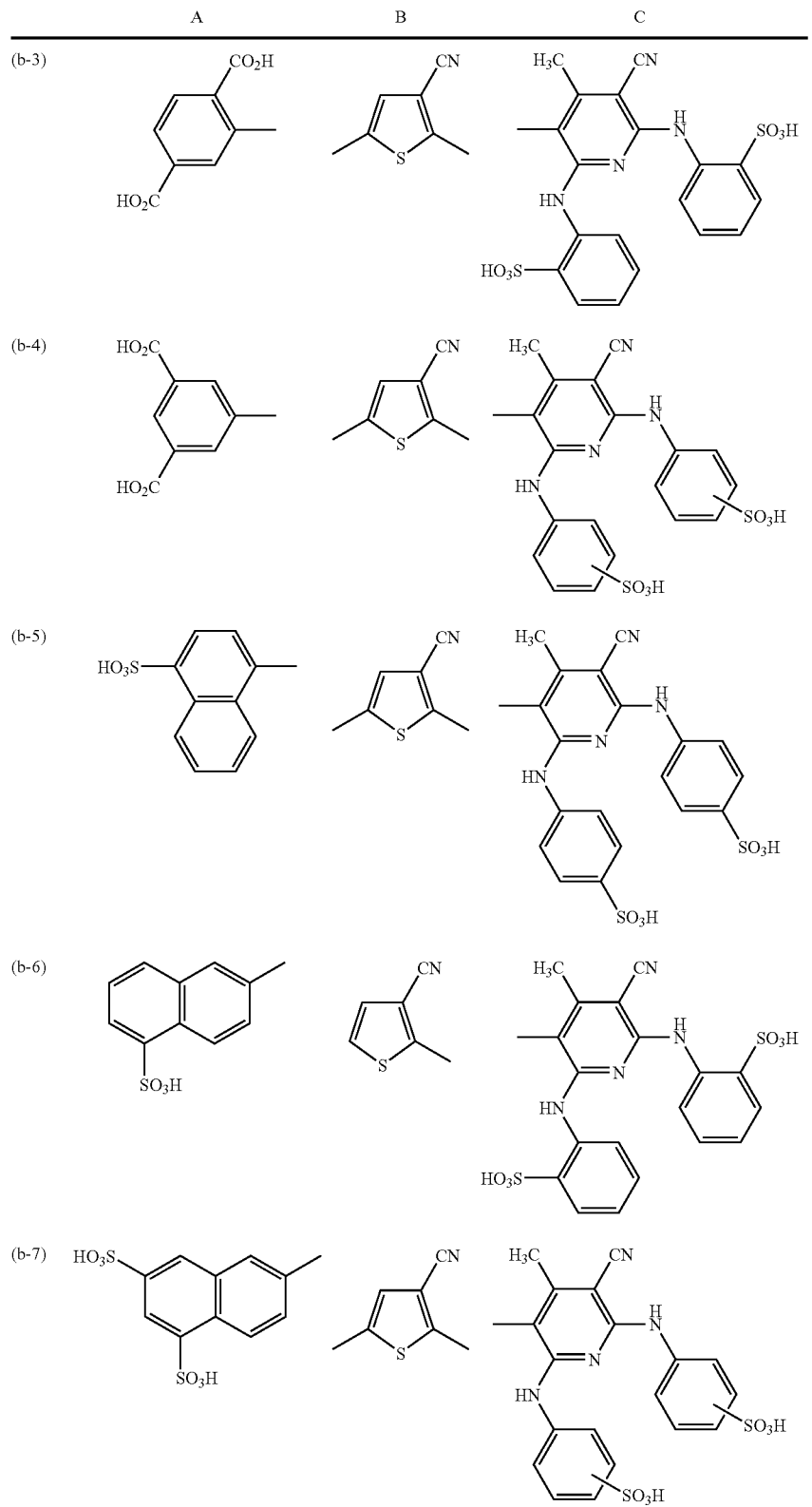

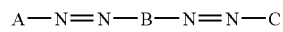
| | A | B | C |
|---|---|---|---|
| (c-1) | 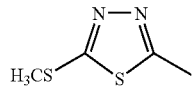 | 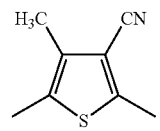 | 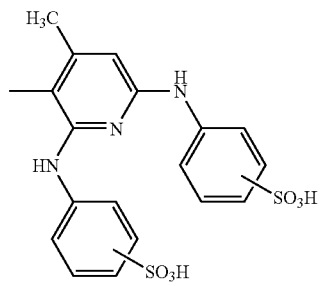 |
| (c-2) | 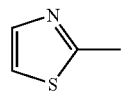 | 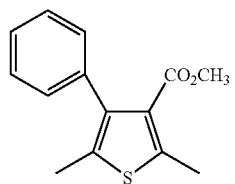 | 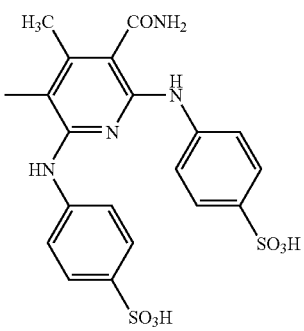 |
| (c-3) | 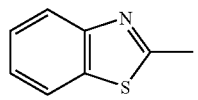 | 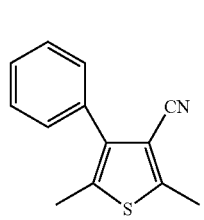 | 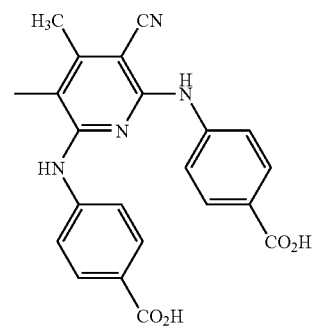 |
| (c-4) | 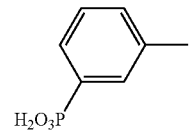 | 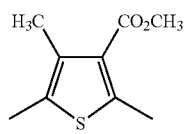 | 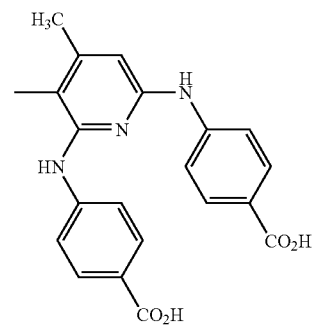 |

-continued
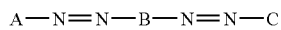
| | A | B | C |
|---|---|---|---|
| (c-5) | | | |
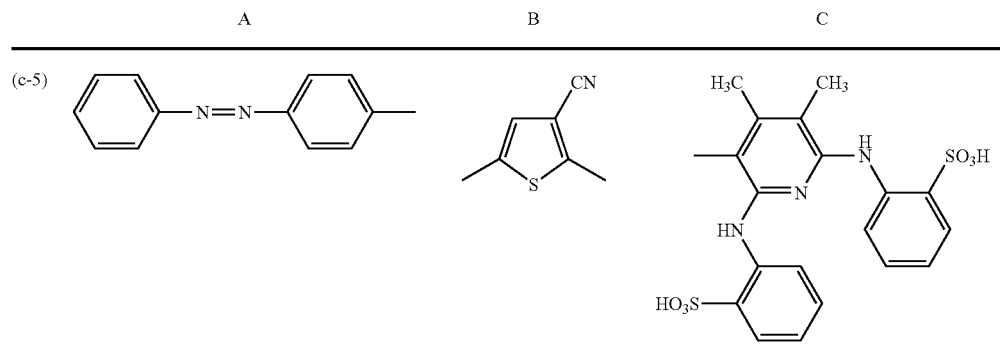
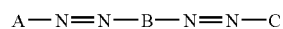
| | A | B | C |
|---|---|---|---|
| (d-1) | | | |
| (d-2) | | | |
| (d-3) | | | |
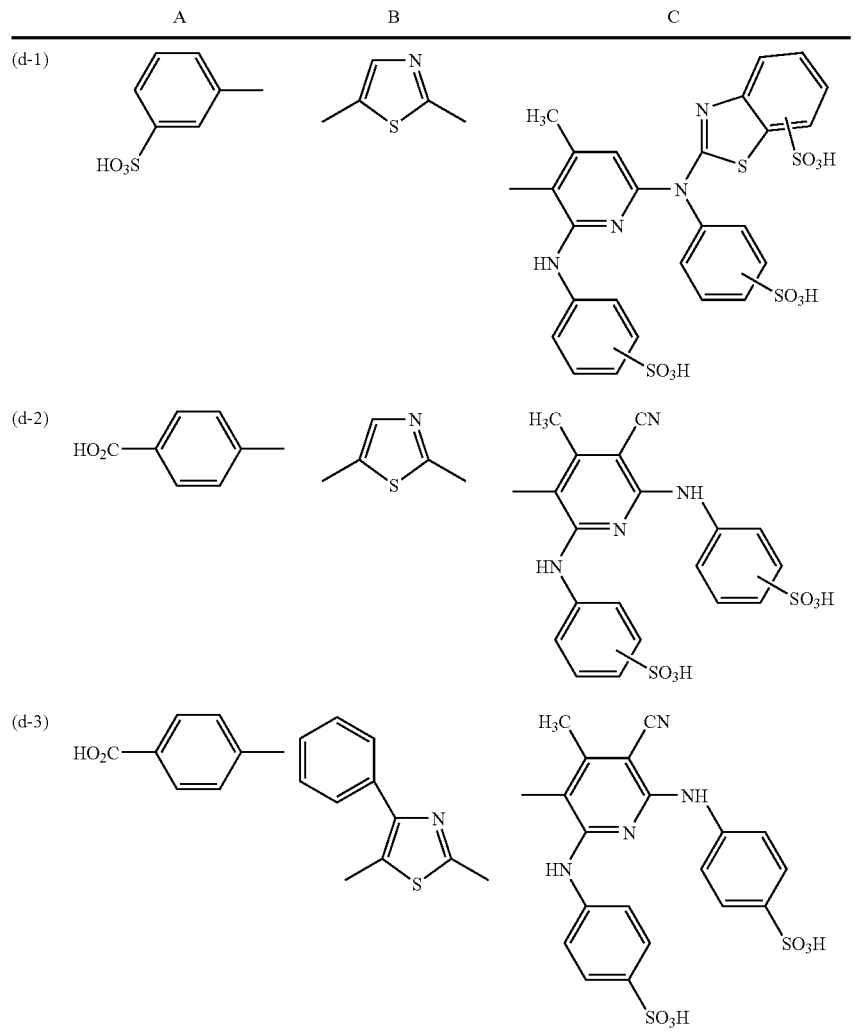

-continued
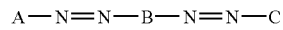
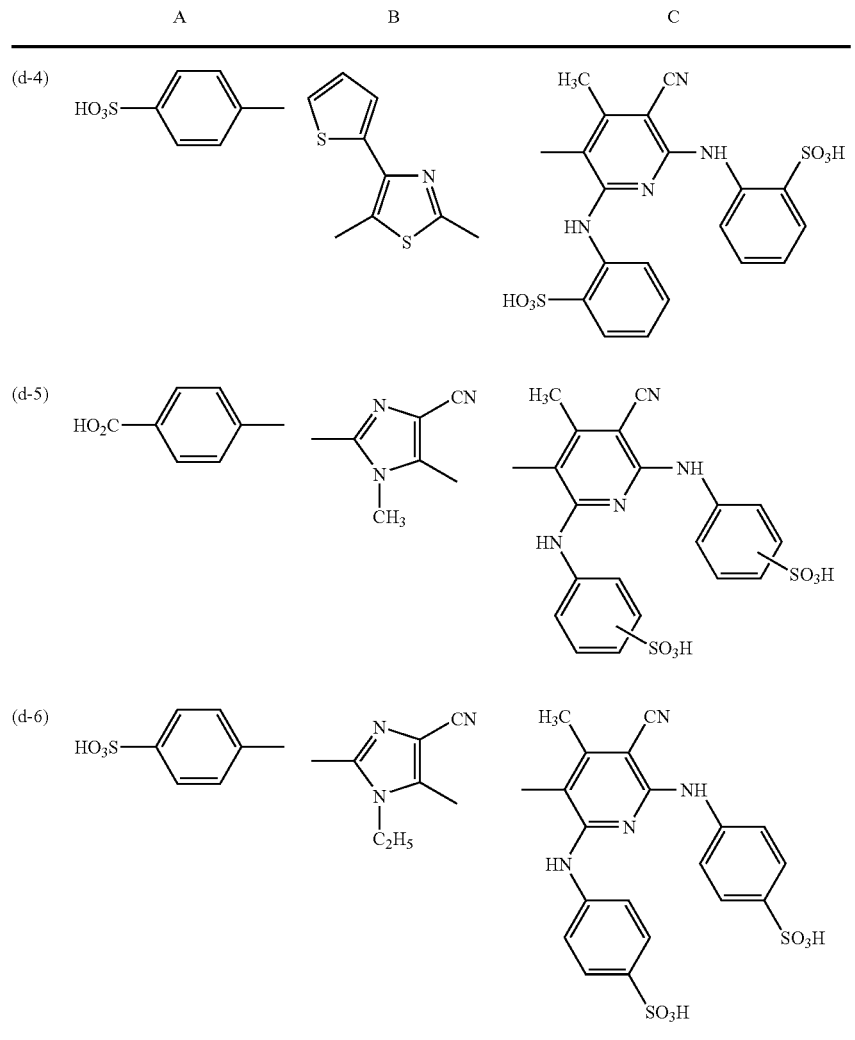
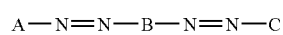
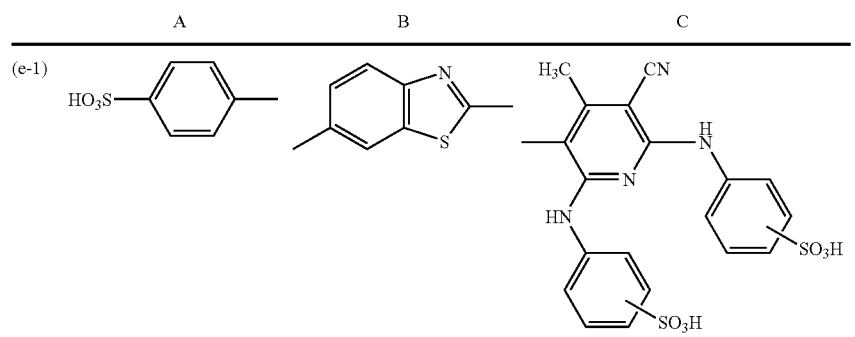

-continued
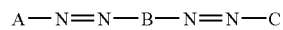
| | A | B | C |
|---|---|---|---|
| (e-2) | | | |
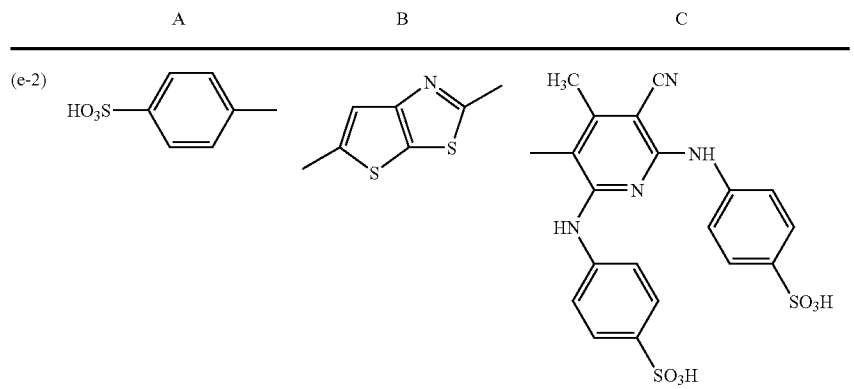
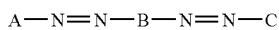
| | A | B | C |
|---|---|---|---|
| (f-1) | | | |
| (f-2) | | | |
| (f-3) | | | |
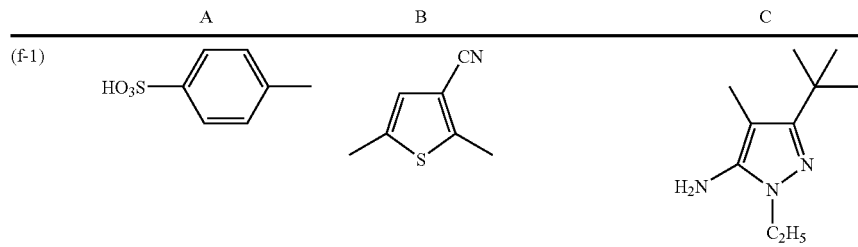
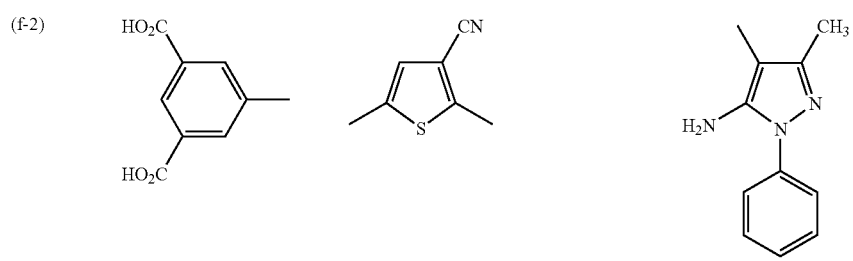
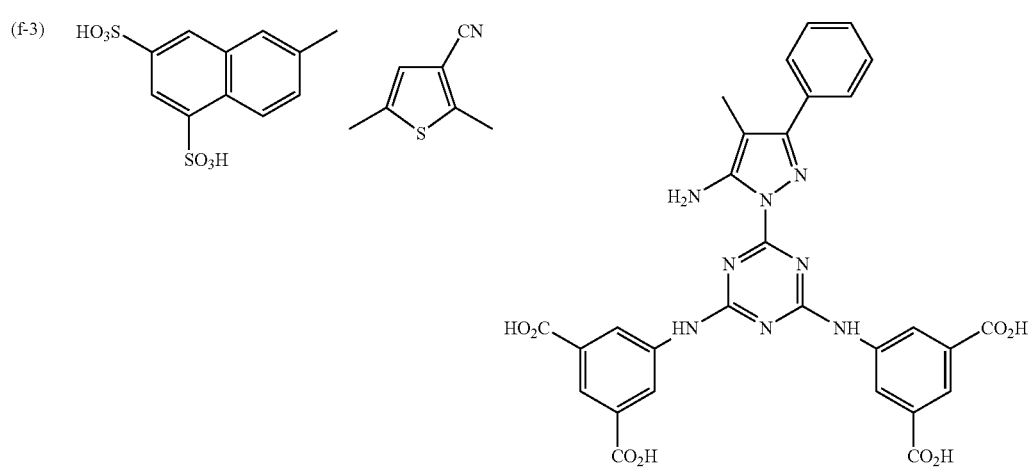

-continued
| | A | B | C |
|---|---|---|---|
| (f-4) | 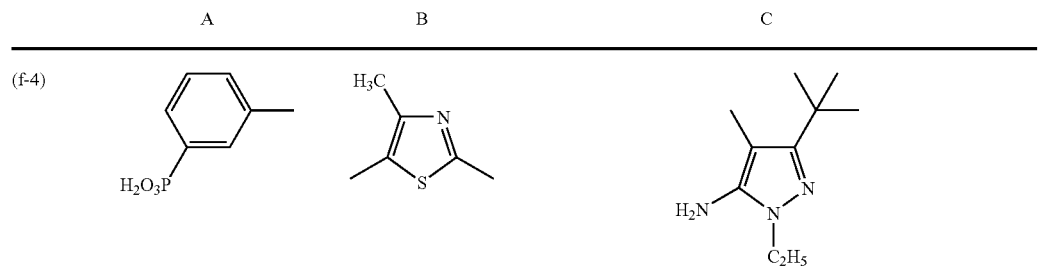 | | |
| | A | B | C |
|---|---|---|---|
| (g-1) | 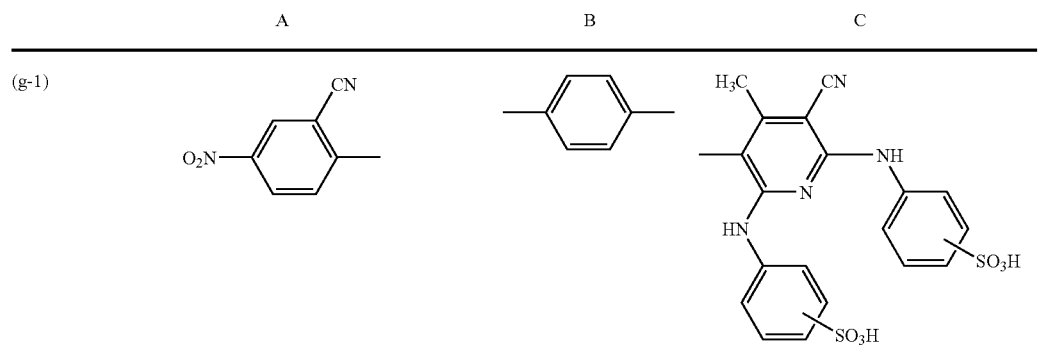 | | |
| (g-2) | 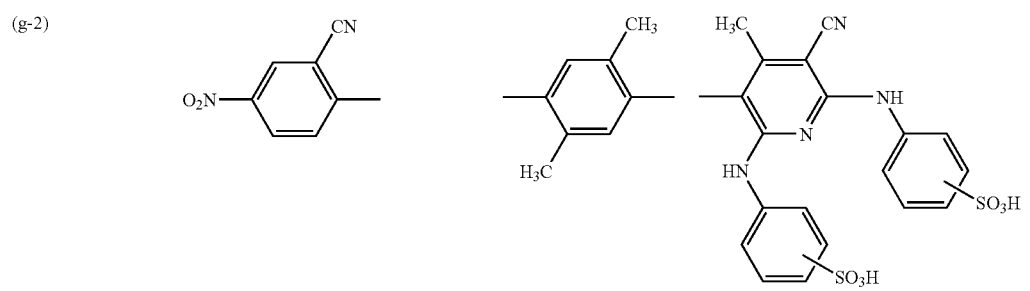 | | |
| (g-3) | 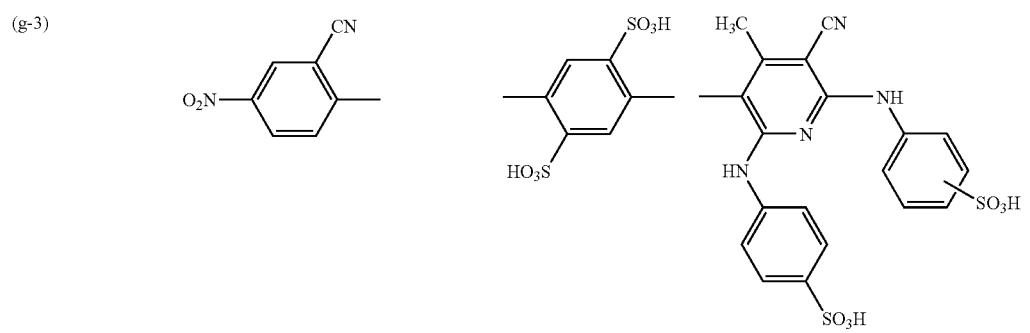 | | |
A—N=N—B—N=N—C -continued
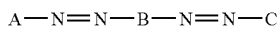
| | A | B | C |
|---|---|---|---|
| (g-4) | | | |
| (g-5) | | | |
| (g-6) | | | |
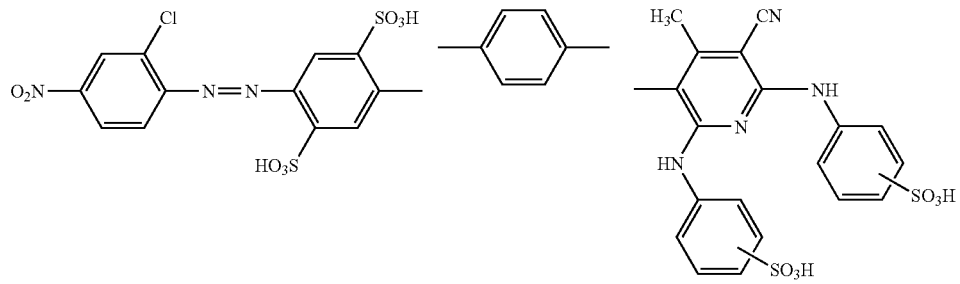
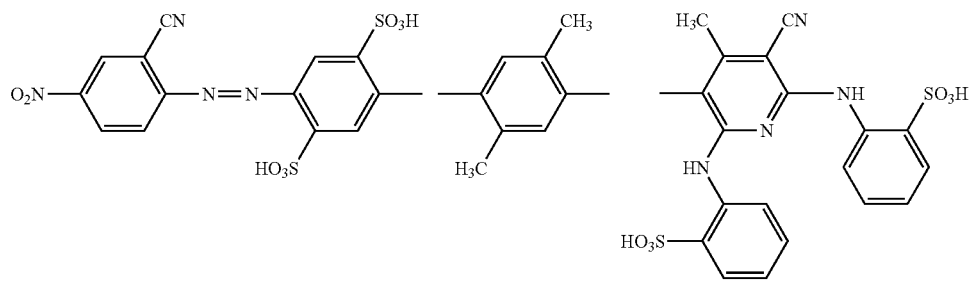
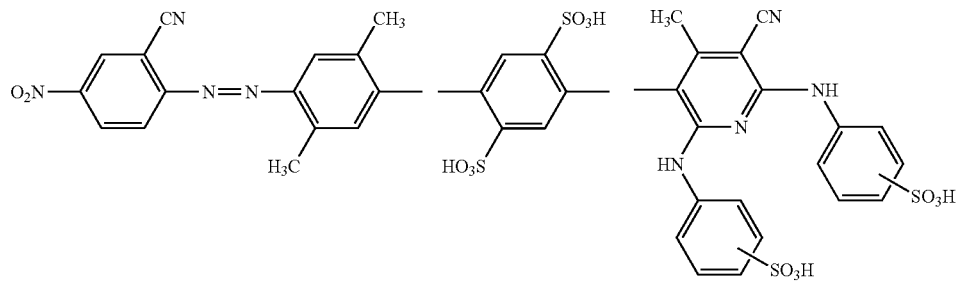
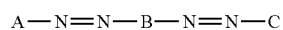
| | A | B | C |
|---|---|---|---|
| (h-1) | | | |
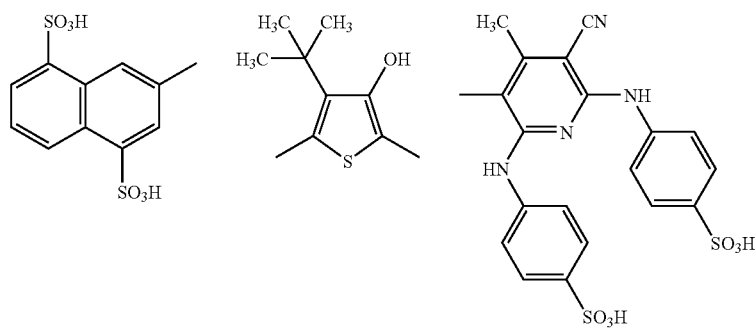

-continued
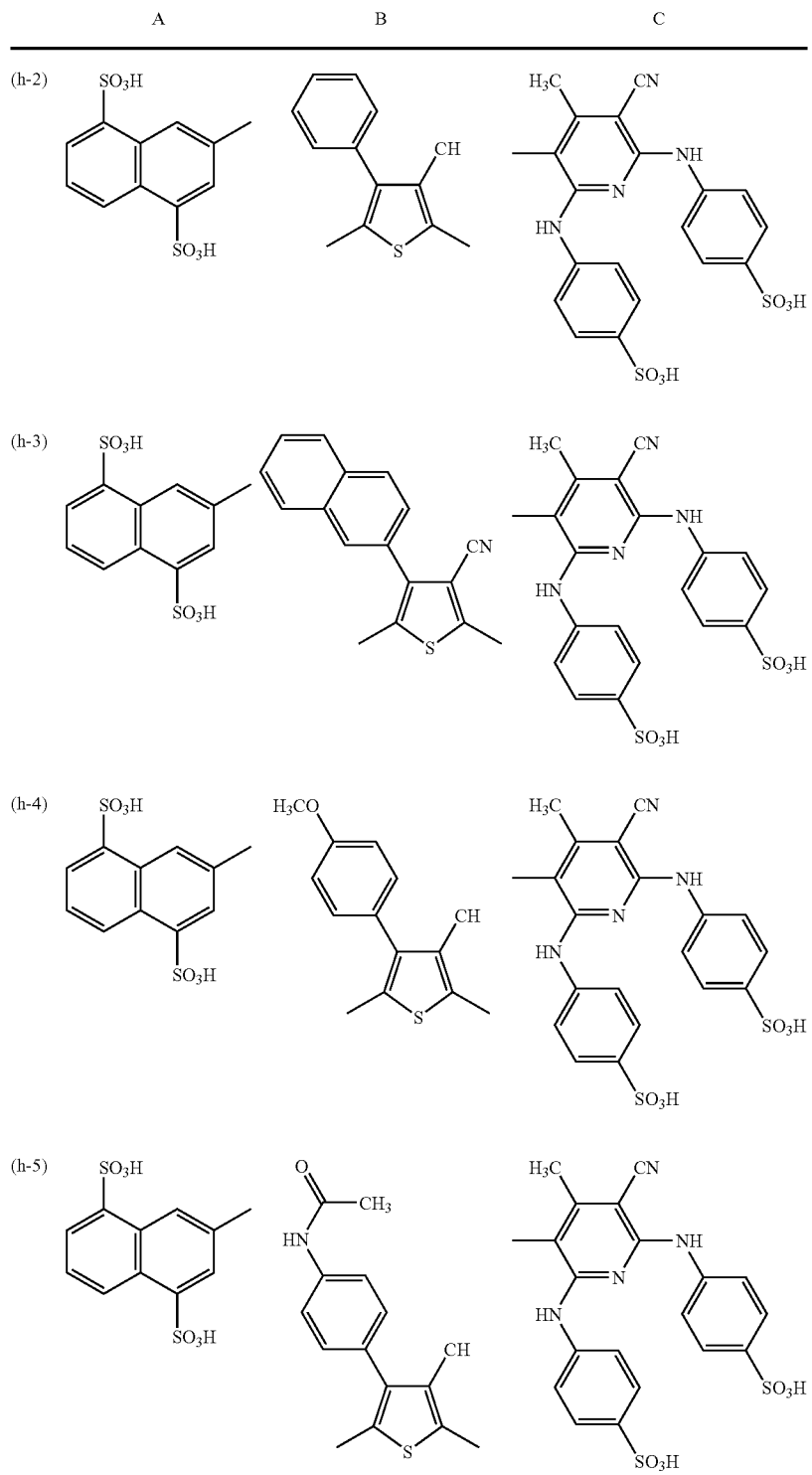

-continued
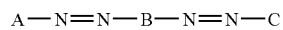
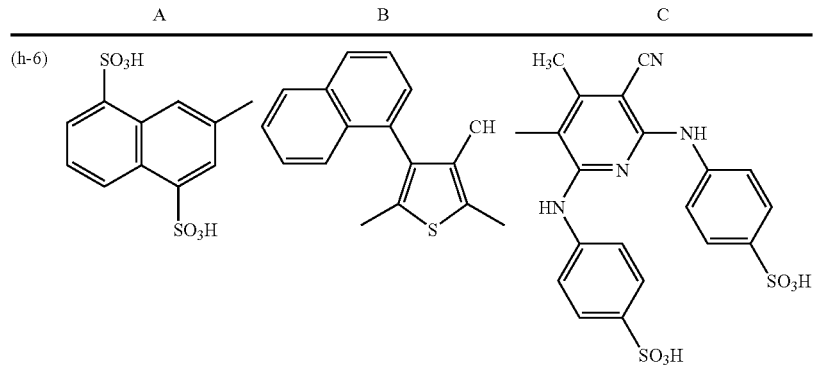
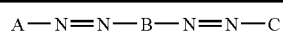
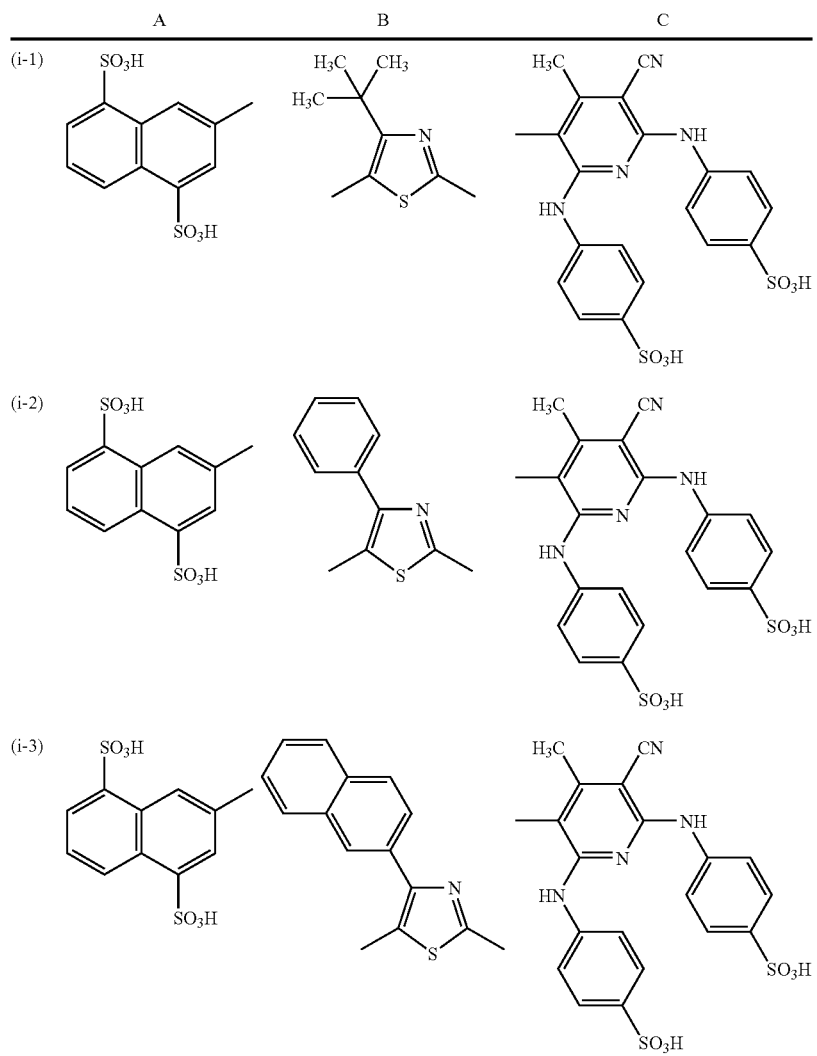

-continued
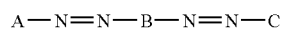
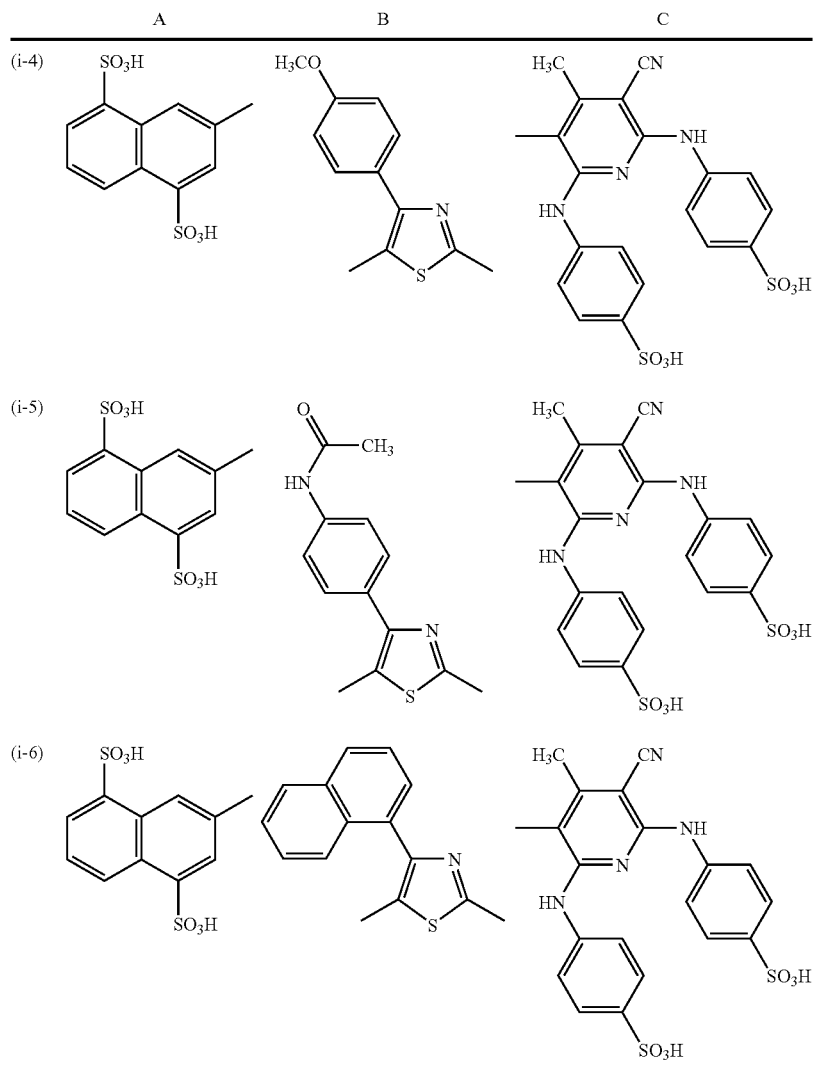
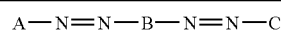
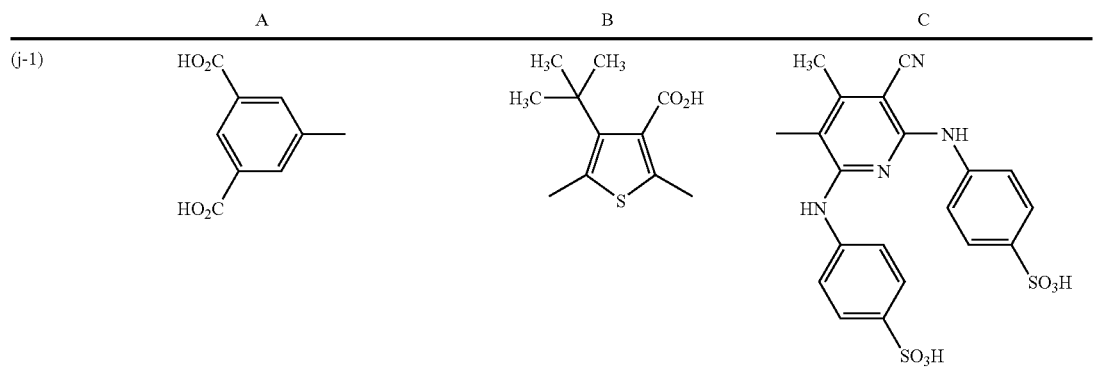

-continued
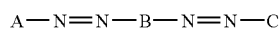
| A | B | C |
|---|---|---|
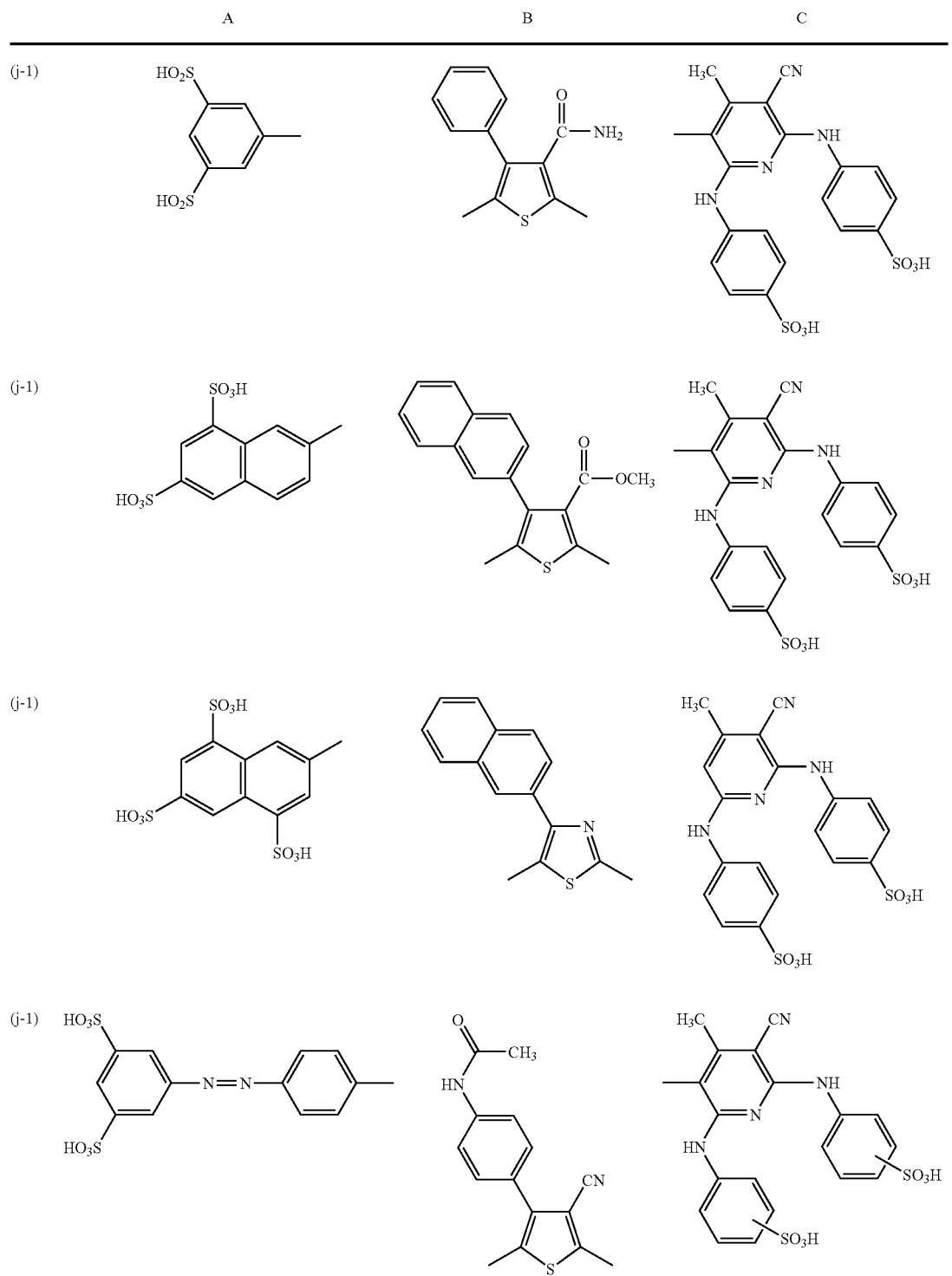

-continued
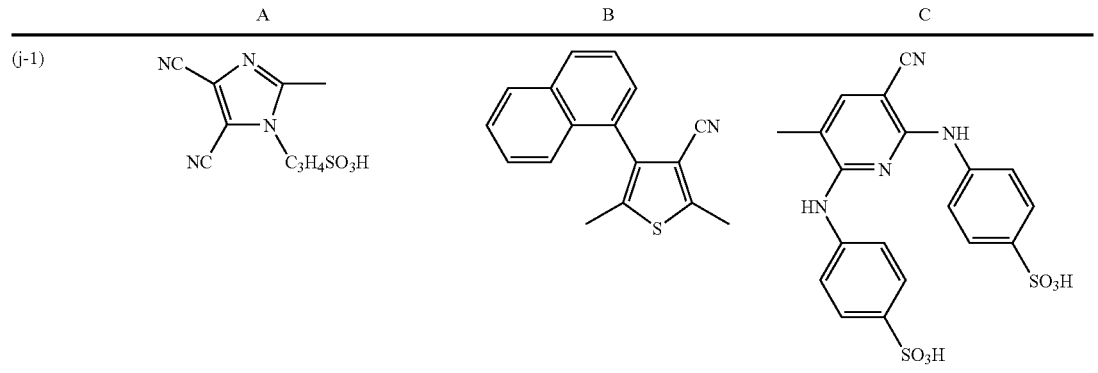
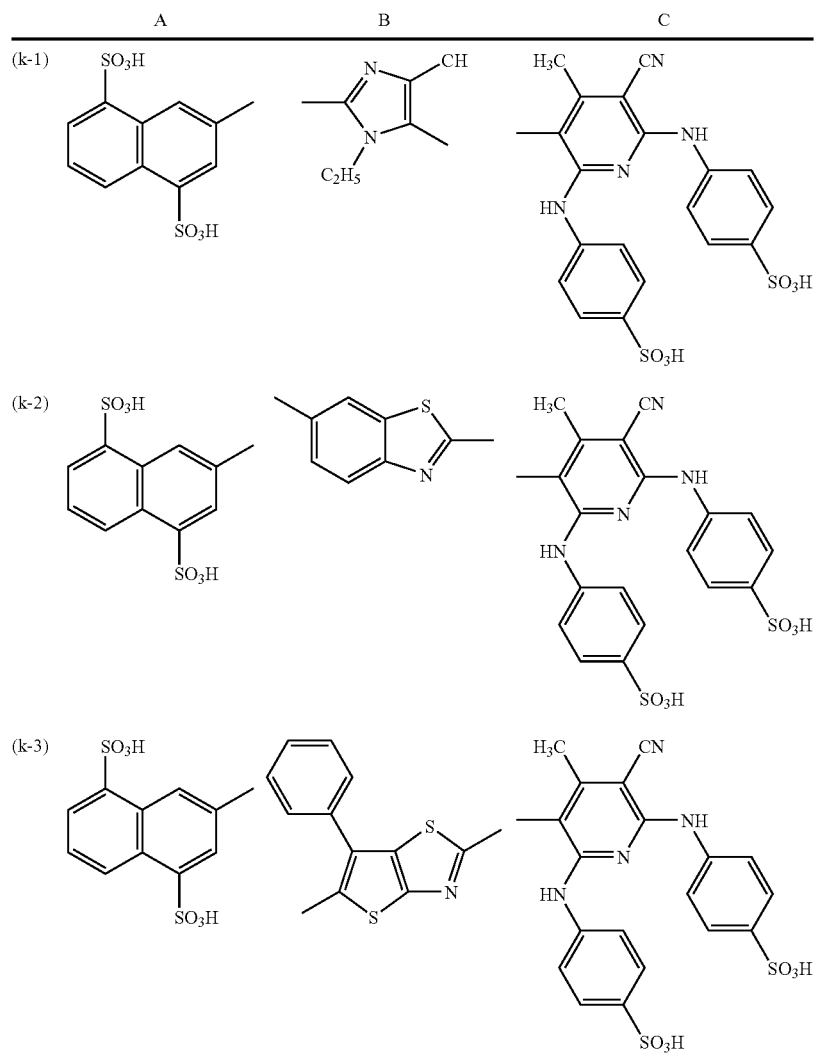

-continued
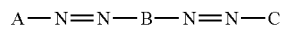
| | A | B | C |
|---|---|---|---|
| (k-4) | 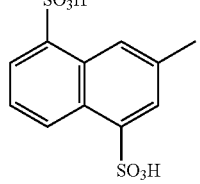 | 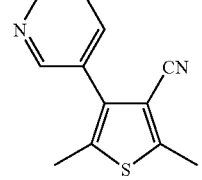 | 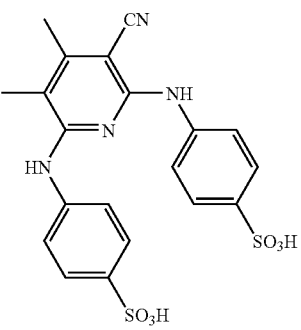 |
| (k-5) | 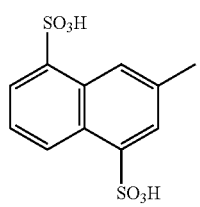 | 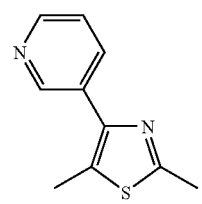 | 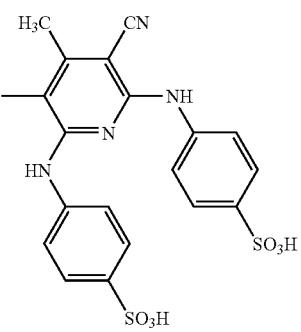 |
| (k-6) | 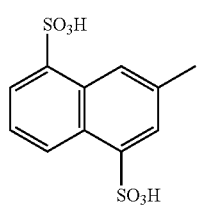 | 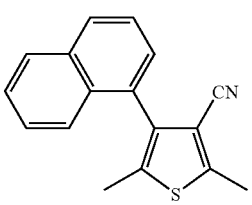 | 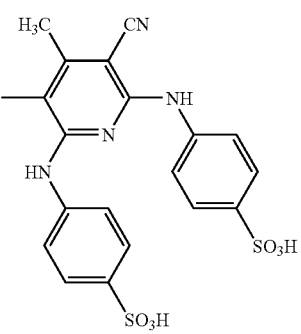 |
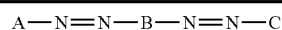
| | A | B | C |
|---|---|---|---|
| (l-1) | 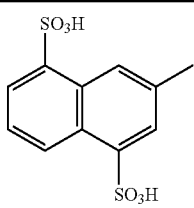 | 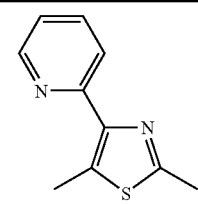 | 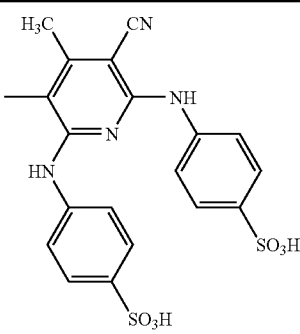 |

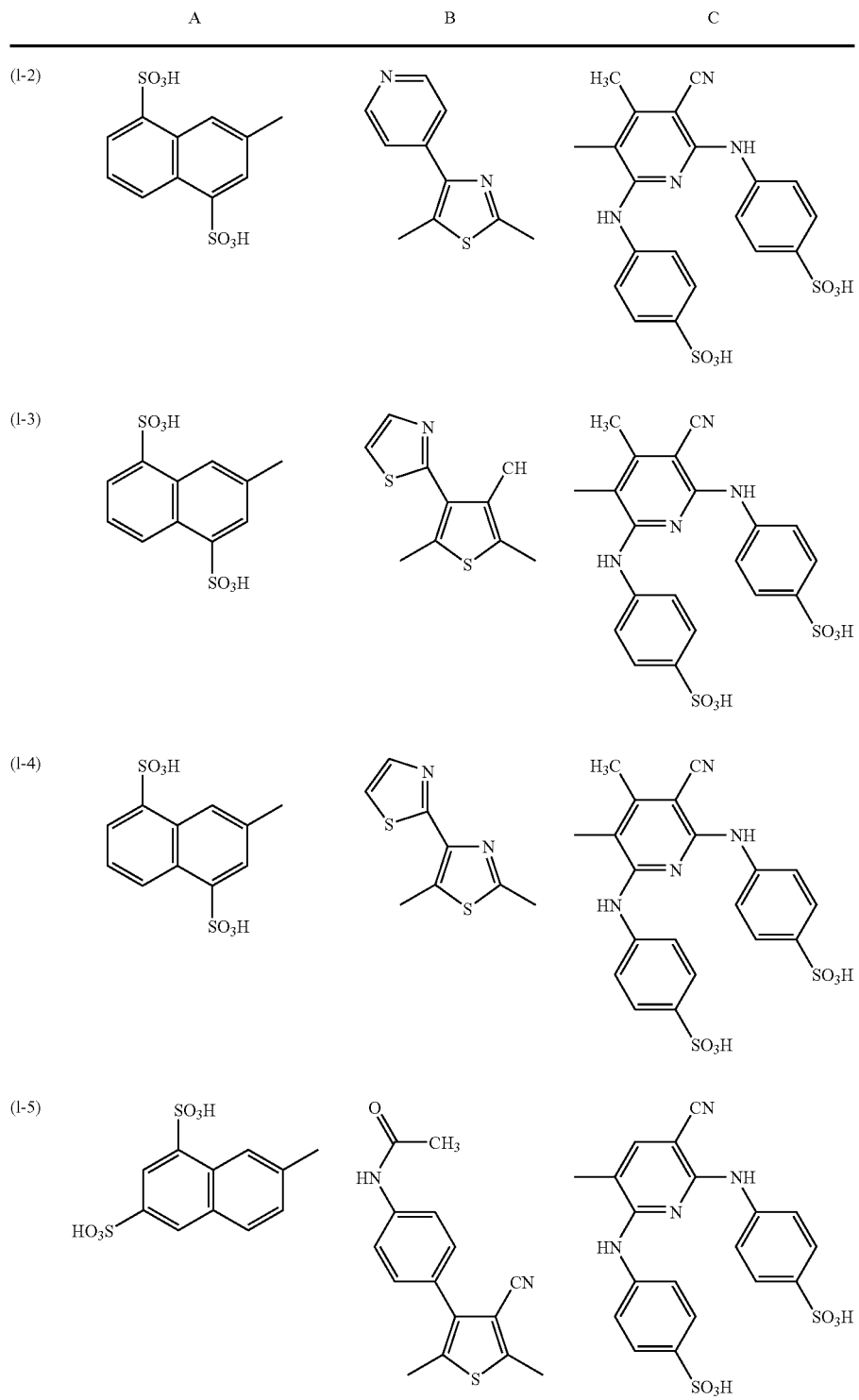

-continued

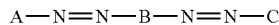

| A | B | C |
|---|---|---|
| (I-6) | | |

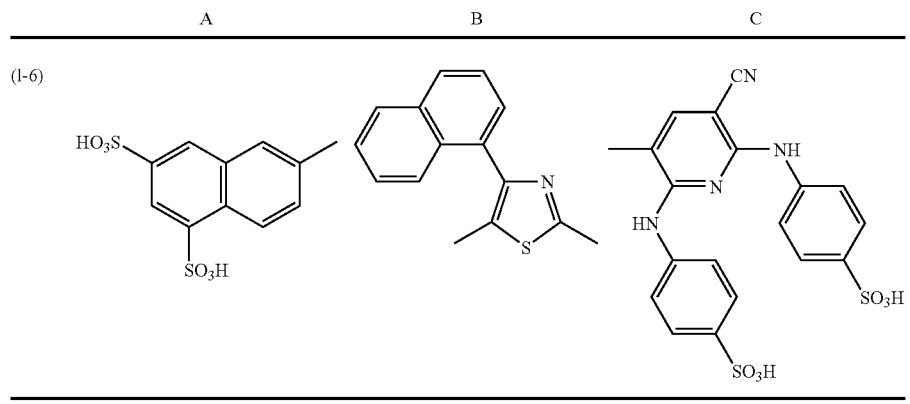

The dyes represented by the above-mentioned formulas (Bk), (Bk-a), (Bk-b) and (Bk-c) can be synthesized by a coupling reaction of a diazo component and a coupler. The dyes can be synthesized by a method described in JP-A-2003-306623 and Japanese Patent Application No. 2003-353498 as a main synthesis method.

In the invention, it also is possible to acquire a more preferred hue by joint use of the above-described dyes and other colorants. Arbitrary dyes can be used as the dyes used jointly. For example, yellow dyes include aryl or heteryl azo dyes having substituted benzenes, substituted naphthalenes, heterocycles such as pyrazolone or pyridone, and open chain type active methylene compounds as coupling components (hereinafter referred to as "coupler components"); azo methine dyes having, for example, open chain type active methylene compounds as the coupler components; methine dyes such as benzylidene dyes or monomethineoxonol dyes; and quinone dyes such as naphthoquinone dyes or anthraquinone dyes. In addition to these dyes, quinophthalone dyes, nitro and nitroso dyes, acridine dyes, acrydinone dyes, and the like are included as other yellow dyes. Particularly, dyes preferable for joint use are dyes (S) having $\lambda_{max}$ in the range of from 350 nm to 500 nm, yellow dyes as described below, particularly azo dyes having two to six azo groups in molecule can be used. In the invention, yellow pigments also can be used.

Magenta dyes include aryl or heteryl azo dyes having phenols, naphthols, anilines, heterocycles such as pyridine and pyrazine, open chain type active methylene compounds, and the like as coupler components; azomethine dyes having, for example, open chain type active methylene compounds or the like as coupler components; and anthrapyridone dyes. Particularly preferred dyes are azo dyes having heterocycles as chromophores or anthrapyridone dyes.

Cyan dyes include aryl or heteryl azo dyes having phenols, naphthols, anilines, or the like as coupler components, azomethine dyes having, for example, phenols, naphthols, heterocycles such as pyrrolotriazole, or the like as coupler components; polymethine dyes such as cyanine dyes, oxonol dyes, or merocyanine dyes; carbonium dyes such as diphenylmethane dyes, triphenylmethane dyes, and xanthene dyes; phthalocyanine dyes; anthraquinone dyes; indigo and thioindigo dyes; and the like. Particularly preferred dyes are phthalocyanine dyes.

Particularly, dyes having oxidation potentials higher than 1.0 V or associative dyes are preferred in view of the balance of fastness properties. Examples of dyes preferred to use jointly can include dyes described in Japanese Patent Application No. 2003-360370.

The content of the compounds represented by formula (Bk) in the ink is preferably from 0.2 to 20 weight percent and more preferably from 0.5 to 15 weight percent.

The known yellow dyes and magenta dyes as well as the above black dye can be used as the heterocyclic azo dye. The yellow dyes and magenta dyes of the heterocyclic azo dye meet at least one of the above-described characteristics (oxidation potential, associating properties) and further preferably meet all the characteristics. Further, the oxidation potentials of the compounds are preferably higher than 1.0 V (vs SCE), further preferably higher than 1.1 V (vs SCE), and particularly preferably higher than 1.15 V (vs SCE).

The yellow dyes as the heterocyclic azo dye includes dyes described in JP-A-2004-83903 (paragraphs (0048) to (0062)), JP-A-2003-277661 (paragraphs (0041) to (0047)), JP-A-2003-277662 (paragraphs (0042) to (0047)) and U.S. patent Publication No. 2003/0213405 (paragraph (0108)).

Specific examples of the yellow dyes are shown below, but the invention is not limited thereto. Further, in the following specific examples, ionic hydrophilic groups may be in a salt state, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of these, an alkali metal ion is preferred.

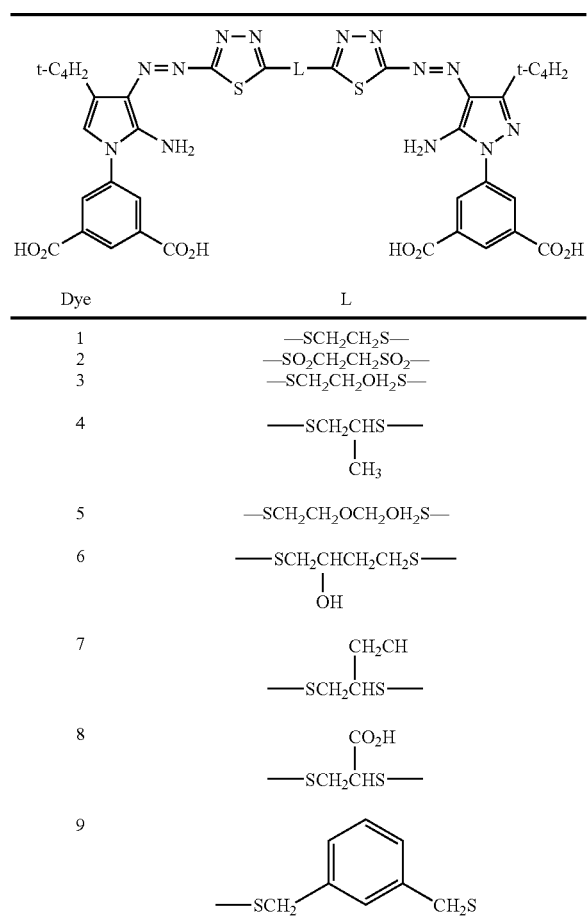

| Dye | L |
|---|---|
| 1 | —SCH₂CH₂S— |
| 2 | —SO₂CH₂CH₂SO₂— |
| 3 | —SCH₂CH₂OH₂S— |
| 4 | —SCH₂CH(CH₃)S— |
| 5 | —SCH₂CH₂OCH₂OH₂S— |
| 6 | —SCH₂CH(OH)CH₂CH₂S— |
| 7 | —SCH₂CH(CH₂CH)S— |
| 8 | —SCH₂CH(CO₂H)S— |
| 9 | —SCH₂-(m-C₆H₄)-CH₂S— |

-continued

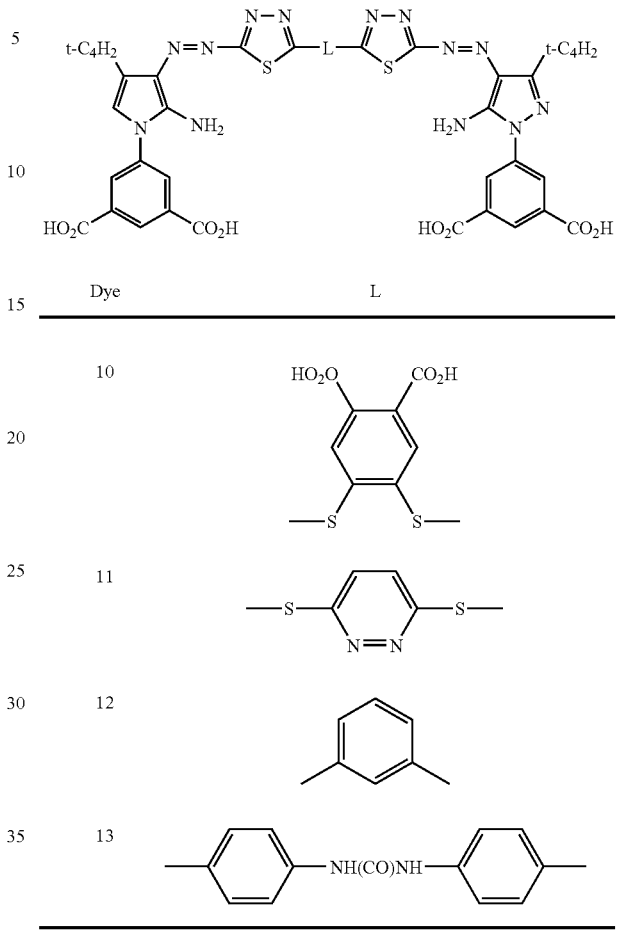

| Dye | L |
|---|---|
| 10 | 2-hydroxy-4,5-bis(thio)-benzoic acid diyl |
| 11 | 3,6-bis(thio)pyridazine-diyl |
| 12 | m-phenylene |
| 13 | bis(p-phenylene)urea |

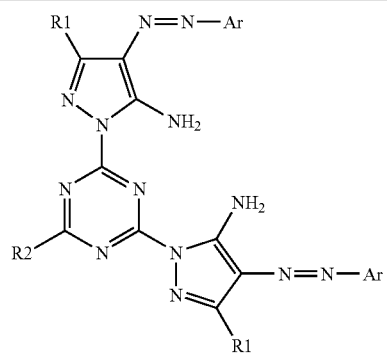

| Dye | Ar | R1 | R2 |
|---|---|---|---|
| 14 | 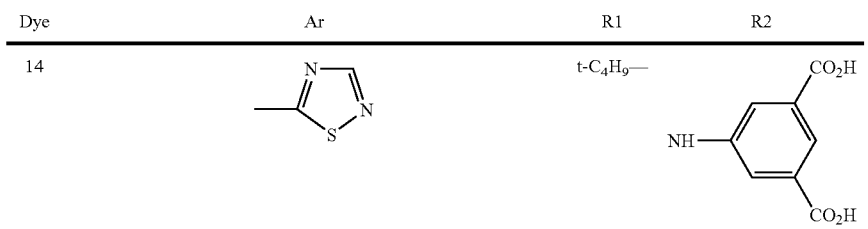 | t-C₄H₉— | 3,5-dicarboxyphenylamino |

-continued

[Structure: bis-pyrazolylazo triazine dye with R1, R2, Ar substituents]

| Dye | Ar | R1 | R2 |
|---|---|---|---|
| 15 | 5-methyl-1,3,4-thiadiazol-2-ylthio-phenyl with $CO_2H$, $CO_2H$ (3,4-disubstituted) | t-$C_4H_9$— | —OH |
| 16 | 5-methyl-1,3,4-thiadiazol-2-ylthio-phenyl with $CO_2H$, $CO_2H$ | t-$C_4H_9$— | —$SO_3H$ |
| 17 | 2-methyl-1,3,4-thiadiazol-5-yl | Ph | —$NHC_{12}H_{25}$-n |
| 18 | 5-methyl-1,3,4-thiadiazol-2-ylthio-phenyl with $CO_2H$, $CO_2H$ | t-$C_4H_9$— | —OH |
| 19 | 5-methyl-1,3,4-thiadiazol-2-ylthio-phenyl-$NHSO_2$-phenyl-($CO_2H$)$_2$ | t-$C_4H_9$— | —OH |
| 20 | 5-methyl-1,3,4-thiadiazol-2-ylthio-phenyl-$NHSO_2$-phenyl-($CO_2H$)$_2$ | t-$C_4H_9$— | —$NHC_{12}H_{25}$-n |
| 21 | 5-methyl-1,3,4-thiadiazol-2-ylthio-phenyl-$NHSO_2$-phenyl-($CO_2H$)$_2$ | t-$C_4H_9$— | —$NHC_2H_4SO_3H$ |

-continued

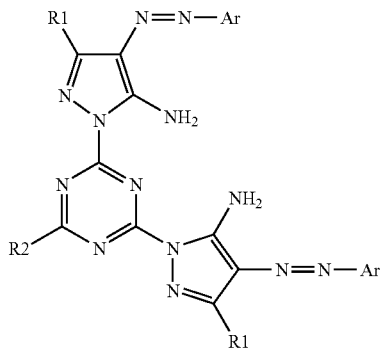

| Dye | Ar | R1 | R2 |
|---|---|---|---|
| 22 | (5-methyl-1,3,4-thiadiazol-2-ylthio)-substituted phenyl with CO₂H, CO₂H | t-C$_4$H$_9$— | —NHC$_2$H$_4$SO$_3$H |
| 23 | (5-methyl-1,3,4-thiadiazol-2-ylthio)-substituted phenyl with CO$_2$H, CO$_2$H | Ph | —SO$_3$H |

The magenta dyes as the heterocyclic azo dye includes dyes described WO 2002/83795 pages 35 to 55), WO 2002/83662 (pages 27 to 42), JP-A-2004-149560 (paragraphs (0046) to (0059)) and JP-2004-149561 (paragraphs (0047) to (0060)).

Specific examples of the magenta dyes are shown below, but the invention is not limited thereto. Further, in the following specific examples, ionic hydrophilic groups may be in a salt state, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of these, an alkali metal ion is preferred.

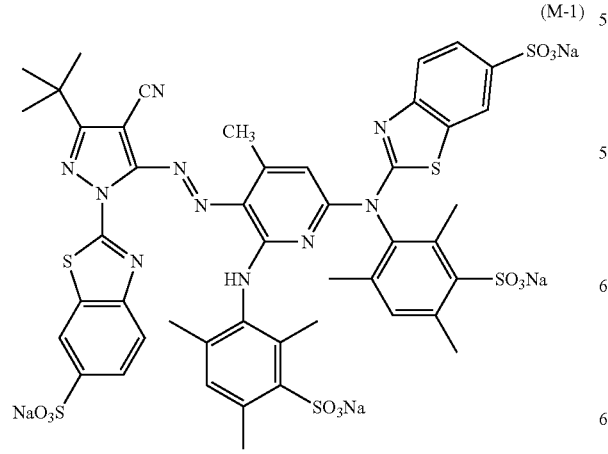

(M-1)

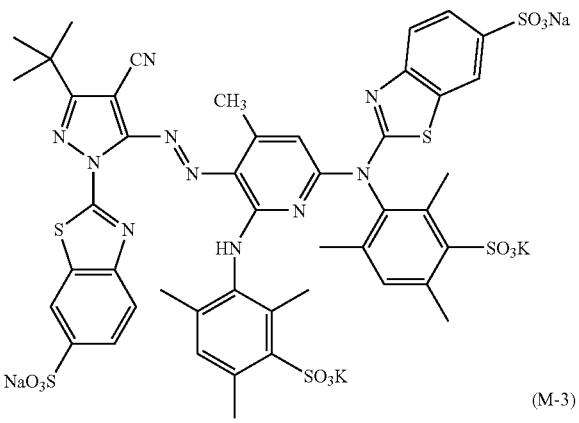

(M-2)

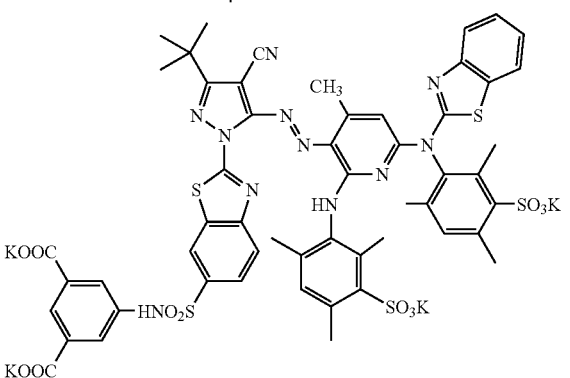

(M-3)

-continued (M-4)

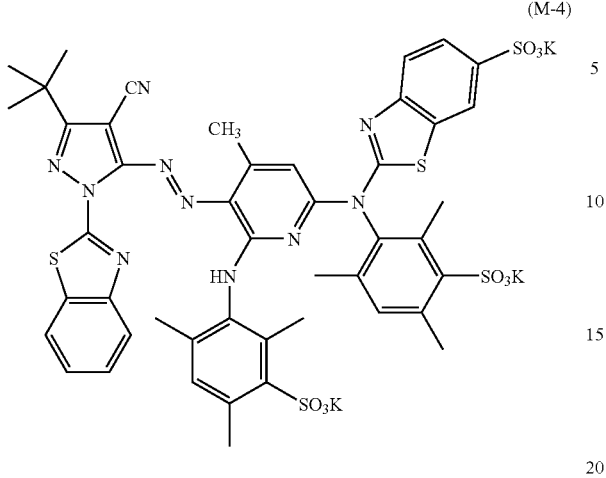

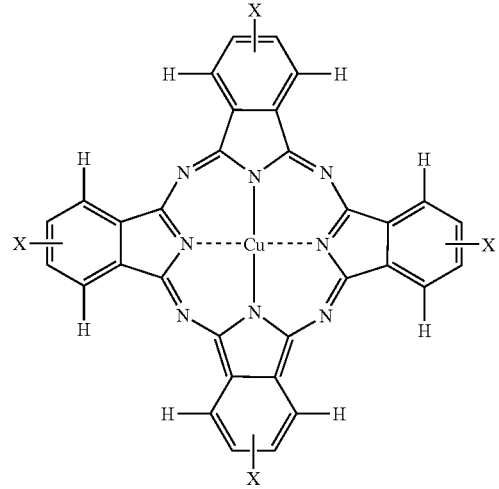
(C-1)

X = SO$_2$(CH$_2$)$_3$SO$_3$Li (3/4)
SO$_2$(CH$_2$)$_3$SO$_2$NHCH$_2$(CH$_3$)OH (1/4)

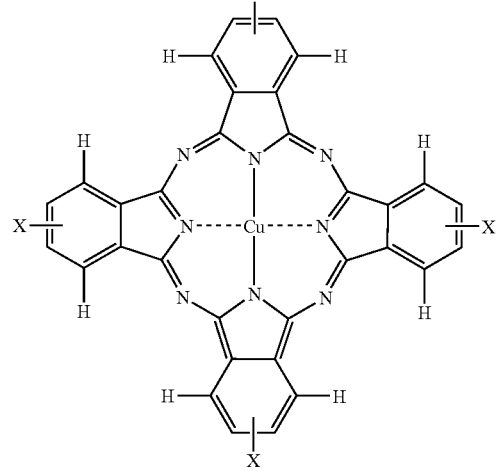
(C-2)

X = SO$_2$(CH$_2$)$_3$SO$_3$Li (2/4)
SO$_2$(CH$_2$)$_3$SO$_2$NHCH$_2$(CH$_3$)OH (2/4)

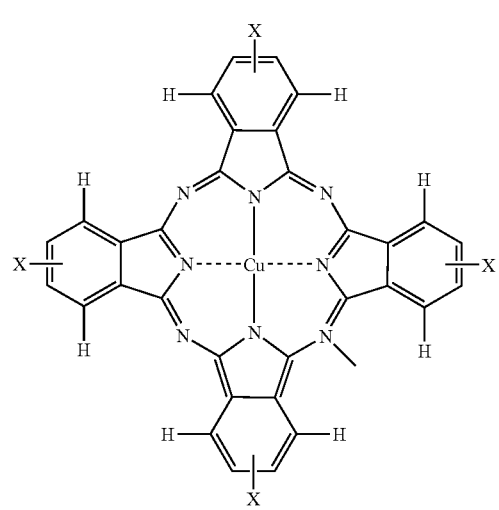
(C-3)

X = SO$_2$(CH$_2$)$_3$SO$_3$Li

The content of the heterocyclic azo dye in the ink is preferably from 0.2 to 20 weight percent and more preferably from 0.5 to 15 weight percent.

The phthalocyanine dyes used in the invention include preferably associative phthalocyanine dyes. The associative phthalocyanine dyes is preferably a dye having an associative group. The associative group means a group having a connection potion (or a function group) capable of forming a hydrogen bonding between molecules. The associative group can have at least one connection portion. Examples of the connect portion include a hydroxyl group, an amino group, an amido bonding, an oxyde bonding. The connect portion can form the hydrogen bonding between the same connect portions or different connect portions. The connect portion may form the hydrogen bonding between the associative phthalocyanine dye and other additives.

It is preferred that the phthalocyanine dye is a cyan dye. The phthalocyanine dye preferably has at least one of the above-described characteristics (oxidation potential, associating properties) and further preferably has all the characteristics.

In order to reduce the reactivity with ozone that is an electrophilic agent, it is desirable to make the oxidation potential nobler by substituting hetero atoms for some carbon atoms of a phthalocyanine skeleton (e.g. an azaphtalocyanine) or introducing an electron-withdrawing group into a phthalocyanine skeleton. The oxidation potential of the phthalocyanine dye is preferably higher than 1.0 V (vs SCE), further preferably higher than 1.1 V (vs SCE), and particularly preferably higher than 1.15 V (vs SCE).

The associative phthalocyanine dyes includes dyes described in WO 2002/60994, WO 2003/811, WO 2003/62324, JP-A-2003-213 167, JP-2004-75986, JP-2004-323605, JP-2004-3 15758, JP-2004-315807 and Japanese Patent Application No. JP2003-421124.

Specific examples of the cyan dyes are shown below, but the invention is not limited thereto. Further, in the following specific examples, ionic hydrophilic groups may be in a salt state, and examples of counter ions for forming the salts include an ammonium ion, an alkali metal ion (for example, a lithium ion, a sodium ion or a potassium ion) and an organic cation (for example, a tetramethylammonium ion, a tetramethylguanidium ion or a tetramethylphosphonium ion). Of these, an alkali metal ion is preferred.

In addition to the above-described examples, compounds as described in PCT International Publication Nos. 2002/60994, 2003/00811, 2003/62324, 2004/87815 and 2004/85541, JP-A-2003-213167, JP-A-2004-075986, JP-A-2004-323605, JP-A-2004-315758 and Japanese Patent Application No. 2003-421124 also can be preferably used. The phthalocyanine dye can be synthesized according to JP-A-2004-315729, and Japanese. Patent Application Nos. 2003-411390 and 2004-094413 in addition to the above-described patents. However, starting materials, intermediates of dyes, and synthetic routes are not limited by these patents.

Although the phthalocyanine dye can be singly used respectively, simultaneous use thereof with other dyes, particularly with other phthalocyanine dyes, also is possible.

Examples of dyes usable in the invention include the following dyes in addition to the above-described dyes. Although the ink stock solutions of the invention may contain a single dye, a combination of plural dyes also is used to control a color tone. An ink composition obtained from the respective ink stock solutions of yellow, magenta, cyan, and black of the invention may be used to obtain a simple image or a full color image. A light color ink and a dark color with respect to each color ink may be used to obtain a full color image. Ink compositions of intermediate color tone such as red, green, blue and violet may be used to obtain a full color image. An ink composition of the invention can compose an ink set to obtain a full color image. Or the ink composition can compose a part of an ink set. That is, the ink composition of the invention may combine with an arbitrary ink composition other than that of the invention in order to compose an ink set.

The ink in the invention includes other coloring agent in addition to the above-described dyes to obtain a full color image for adjusting the color tone.

Any coloring agents can be used as the coloring agents usable for the invention and the other coloring agents used in addition to the above-described dyes. Examples of coloring agents include the above-described dyes and the following dyes.

Examples of the yellow dyes include, for example, arylazo or heterylazo dyes having a phenol, a naphthol, an aniline, a pyrazolone, a pyridone or an open chain active methylene compound as a coupling component; azomethine dyes having an open chain active methylene compound as a coupling component; methine dyes such as a benzylidene dye and a monomethine oxonol dye; and quinone-based dyes such as a naphthoquinone dye and an anthraquinone dye. The other dye species include a quinophthalone dye, a nitro-nitroso dye, an acridine dye and an acridinone dye. Such a dye may be one which shows a yellow color for the first time when a chromophore is partially dissociated. In such a case, a counter cation may be an inorganic cation such as an alkali metal or ammonium, or an organic cation such as a pyridinium or quaternary ammonium salt. Further, it may be a polymer cation having such a cation as a partial structure.

Magenta dyes include, for example, arylazo or heterylazo dyes having a phenol, a naphthol or an aniline as a coupling component; azomethine dyes having a pyrazolone or a pyrrolotriazole as a coupling component; methine dyes such as an arylidene dye, a styryl dye, a merocyanine dye and an oxonol dye; carbonium dyes such as a diphenylmethane dye, a triphenylmethane dye and a xanthene dye; quinone-based dyes such as a naphthoquinone dye, an anthraquinone dye and an anthrapyridone dye; and condensed polycyclic dyes such as a dioxazine dye. Such a dye may be one which shows a magenta color for the first time when a chromophore is partially dissociated. In such a case, a counter cation may be an inorganic cation such as an alkali metal or ammonium, or an organic cation such as a pyridinium or quaternary ammonium salt. Further, it may be a polymer cation having such a cation as a partial structure.

Cyan dyes include, for example, azomethine dyes such as an indoaniline dye and an indophenol dye; polymethine dyes such as a cyanine dye, an oxonol dye and a merocyanine dye; carbonium dyes such as a diphenylmethane dye, a triphenylmethane dye and a xanthene dye; phthalocyanine dyes; anthraquinone dyes; arylazo or heterylazo dyes having a phenol, a naphthol or an aniline as a coupling component; and indigo-thioindigo dyes. Such a dye may be one which shows a cyan color for the first time when a chromophore is partially dissociated. In such a case, a counter cation may be an inorganic cation such as an alkali metal or ammonium, or an organic cation such as a pyridinium or quaternary ammonium salt. Further, it may be a polymer cation having such a cation as a partial structure.

Further, water-soluble dyes such as a direct dye, an acid dye, a food dye, a basic dye and a reactive dye can also be used simultaneously. Preferred examples thereof include C.I. Direct Red 1, 2, 4, 9, 11, 23, 26, 31, 37, 39, 62, 63, 72, 75, 76, 79, 80, 81, 83, 84, 87, 89, 92, 95, 111, 173, 184, 207, 211, 212, 214, 218, 21, 223, 224, 225, 226, 227, 232, 233, 240, 241, 242, 243, 247 and 254; C.I. Direct Violet 7, 9, 47, 48, 51, 66, 90, 93, 94, 95, 98, 100 and 101; C.I. Direct Yellow 4, 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 157, 161 and 163; C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 290 and 291; C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C.I. Acid Red 1, 8, 35, 42, 52, 57, 62, 81, 80, 82, 87, 94, 111, 114, 115, 118, 119, 127, 128, 131, 143, 144, 151, 152, 154, 158, 186, 245, 249, 254, 257, 261, 263, 266, 289, 299, 301, 305, 336, 337, 361, 396 and 397; C.I. Acid Violet 5, 34, 43, 47, 48, 90, 103 and 126; C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 215, 219, 222 and 227; C.I. Acid Blue 9, 25, 40, 41, 62, 72, 76, 78, 80, 82, 87, 92, 106, 112, 113, 120, 127:1, 129, 138, 143, 175, 181, 185, 205, 207, 220, 221, 230, 232, 247, 249, 258, 260, 264, 271, 277, 278, 279, 280, 288, 290 and 326; C.I. Acid Black 7, 24, 29, 48, 52:1 and 172; C.I. Reactive Red 3, 6, 13, 17, 19, 21, 22, 23, 24, 29, 35, 37, 40, 41, 43, 45, 49, 55, 63, 106, 107, 112, 113, 114, 126, 127, 128, 129, 130, 131, 137, 160, 161, 174 and 180; C.I. Reactive Violet 1, 3, 4, 5, 6, 7, 8, 9, 16, 17, 22, 23, 24, 26, 27, 33 and 34; C.I. Reactive Yellow 2, 3, 13, 14, 15, 17, 18, 23, 24, 25, 26, 27, 29, 35, 37, 41 and 42; C.I. Reactive Blue 2, 3, 5, 7, 8, 10, 13, 14, 15, 17, 18, 19, 21, 25, 26, 27, 28, 29, 38, 82, 89, 158, 182, 190, 203, 216, 220 and 244; C.I. Reactive Black 4, 5, 8, 14, 21, 23, 26, 31, 32 and 34; C.I. Basic Red 12, 13, 14, 15, 18, 22, 23, 24, 25, 27, 29, 35, 36, 38, 39, 45 and 46; C.I. Basic Violet 1, 2, 3, 7, 10, 15, 16, 20, 21, 25, 27, 28, 35, 37, 39, 40 and 48; C.I. Basic Yellow 1, 2, 4, 11, 13, 14, 15, 19, 21, 23, 24, 25, 28, 29, 32, 36, 39 and 40; C.I. Basic Blue 1, 3, 5, 7, 9, 22, 26, 41, 45, 46, 47, 54, 57, 60, 62, 65, 66, 69 and 71; and C.I. Basic Black 8.

Dyes described in the following documents are preferably used: JP-A-10-130557, JP-A-9-255906, JP-A-6-234944, JP-A-7-97541, EP 982371, WO 00/43450, WO 00/43452, WO 00/43453, WO 03/106572, WO 03/104332, JP-A-2003-238862, JP-A-2004-83609, JP-A-2002-302619, JP-A-2002-327131, JP-A-2002-265809, WO 01/48090, WO 04/087815, WO 02/90441, WO 03/027185, WO 04/085541, JP-A-2003-

321627, JP-A-2002-332418, JP-2002-332419, WO 02/059215, WO 02/059216, WO 04/087814, WO 04/046252, WO 04/046265, U.S. Pat. No. 6,652,637, WO 03/106572, WO 03/104332, WO 00/58407, JP-B-3558213, JP-B-3558212, JP-B-3558211, JP-A-2004-285351, WO 04/078860, JP-A-2004-323605 and WO 02/104108.

Further, in the invention, an ink can also be used in which a pigment is used in combination with the dye.

As the pigments which can be used in the invention, there can be utilized known pigments described in various documents, as well as commercially available pigments. As the documents, there are *Color Index* (compiled by The Society of Dyers and Colorists), *Kaitei Shinpan Ganryo Binran (Revised New Handbook of Pigments)*, compiled by Nippon Ganryo Gijutsu Kyokai (1989), *Saishin Ganryo Oyo Gijutsu (Newest Pigment Application Technology)*, CMC Publishing Co., Ltd. (1986), *Insatsu Ink Gijutsu (Printing Ink Technique)*, CMC Publishing Co., Ltd. (1984), and W. Herbst and K. Hunger, *Industrial Organic Pigments*, VCH Verlagsgesellschaft (1993). Specifically, organic pigments include azo pigments (such as an azo lake pigment, an insoluble azo pigment, a condensed azo pigment and a chelate azo pigment), polycyclic pigments (such as a phthalocyanine-based pigment, an anthraquinone-based pigment, a perylene-based or perynone-based pigment, an indigo-based pigment, a quinacidone-based pigment, a dioxazine-based pigment, an isoindolinone-based pigment, a quinophthalone-based pigment and a diketopyrrolopyrrole-based pigment), dyeing lake pigments (such as a lake pigment of an acid or basic dye) and azine pigments, and inorganic pigments include C.I. Pigment Yellow 34, 37, 42 and 53 which are a yellow pigment, C.I. Pigment Red 101 and 108 which are a red-type pigment, C.I. Pigment Blue 27, 29 and 17:1 which are a blue-type pigment, C.I. Pigment Black 7 and magnetite which are a black-type pigment, and C.I. Pigment White 4, 6, 18 and 21 which are a white-type pigment.

For the pigments having a color tone preferred for image formation, as the blue to cyan pigments, preferred are phthalocyanine pigments, indanthrone pigments of the anthraquinone family (for example, C.I. Pigment Blue 60) and triarylcarbonium pigments of the dyeing lake pigment family. In particular, most preferred are phthalocyanine pigments (preferred examples thereof include copper phthalocyanine such as C.I. Pigment Blue 15:1, 15:2, 15:3, 15:4 and 15:6, monochloro or low chlorinated copper phthalocyanine, aluminum phthalocyanine as described in European Patent 860475, nonmetallic phthalocyanine such as C.I. Pigment Blue 16, and phthalocyanine with a center metal which is Zn, Ni or Ti, and more preferred are C.I. Pigment Blue 15:3 and 15:4 and aluminum phthalocyanine among others).

As the red to violet pigments, there are preferably used azo pigments (preferred examples thereof include C.I. Pigment Red 3, 5, 11, 22, 38, 48:1, 48:2, 48:3, 48:4, 49:1, 52:1, 53:1, 57:1, 63:2, 144, 146 and 184, and C.1. Pigment Red 57:1, 146 and 184 are more preferred among others), quinacridone-based pigments (preferred examples thereof include C.I. Pigment Red 122, 192, 202, 207 and 209 and C.I. Pigment Violet 19 and 42, and C.I. Pigment Red 122 is more preferred among others), triarylcarbonium pigments of the dyeing lake pigment family (preferred examples thereof include a xanthene-based C.I. Pigment Red 81;1 and C.I. Pigment Violet 1, 2, 3, 27 and 39), dioxazine-based pigments (for example, C.I. Pigment Violet 23 and 37), diketopyrrolopyrrole-based pigments (for example, C.I. Pigment Red 254), perylene pigments (for example, C.I. Pigment Violet 29), anthraquinone-based pigments (for example, C.I. Pigment Violet 5:1, 31 and 33) and thioindigo-based pigments (for example, C.I. Pigment Red 38 and 88).

As the yellow pigments, there are preferably used azo pigments (preferred examples thereof include C.I. Pigment Yellow 1, 3, 74 and 98 of the monoazo pigment family, C.I. Pigment Yellow 12, 13, 14, 16, 17 and 83 of the disazo pigment family, C.I. Pigment Yellow 93, 94, 95, 128 and 155 of the general azo family, and C.I. Pigment Yellow 120, 151, 154, 156 and 180 of the benzimidazolone family, and those using no benzidine-based compounds as raw materials are more preferred among others), isoindoline isoindolinone-based pigments (preferred examples thereof include C.I. Pigment Yellow 109, 110, 137 and 139), quinophthalone pigments (preferred examples thereof include C.I. Pigment Yellow 138) and flavanthrone pigments (for example, C.I. Pigment Yellow 24).

Preferred examples of the black pigments include inorganic pigments (preferred examples thereof include carbon black and magnetite) and aniline black. In addition, orange pigments (such as C.I. Pigment Orange 13 and 16) and green pigments (such as C.I. Pigment Green 7) may be used.

The pigment which can be used in the invention may be either the above-mentioned bare pigment or surface-treated pigment. As surface treatment methods, there are conceived a method of coating a surface of the pigment with a resin or wax, a method of adhering a surfactant to the pigment, and a method of bonding a reactive substance (for example, a silane coupling agent, an epoxy compound, a polyisocyanate or a radical derived from a diazonium salt) to a surface of the pigment, which are described in the following literatures and patents;

(1) *Kinzoku Sekken no Seishitsu to Oyo (Properties and Applications of Metal Soap)* (Saiwai Shobo Co., Ltd.);
(2) *Insatsu Ink Insatsu (Printing Ink Printing)* (CMC Publishing Co., Ltd., 1984);
(3) *Saishin Ganryo Oyo Gijutsu (Newest Pigment Application Technology)* (CMC Publishing Co., Ltd., 1986);
(4) U.S. Pat. Nos. 5,554,739 and 5,571,311; and
(5) JP-A-9-151342, JP-A-10-140065, JP-A-10-292143 and JP-A-11-166145.

In particular, a self-dispersible pigment prepared by allowing a diazonium salt to act on carbon black, which is described in U.S. Pat. No. of (4), and a capsulated pigment prepared by a method described in Japanese Patents of (5) are effective, because dispersion stability can be obtained without using an excess dispersant in the ink.

In the invention, the pigment may be dispersed by further using a dispersant. Various known dispersants such as a surfactant-type low molecular dispersant and a polymer-type dispersant can be used according to the pigment used. Examples of the dispersants include those described in JP-A-3-69949 and European Patent 549,486. Further, when the dispersant is used, a pigment derivative called a synergist may also be added in order to accelerate the adsorption of dispersant to the pigment. The particle size of the pigment which can be used in the invention is preferably from 0.01 to 10 μm, and more preferably from 0.05 to 1 μm, after the dispersion. As a method of dispersing the pigment, there can be used a known dispersion technique used for the production of an ink or a toner. Examples of the dispersing machines include an agitator mill, an attritor, a colloid mill, a ball mill, a three-roll mill, a pearl mill, a super mill, an impeller, a disperser, a KD mill, a dynatron and a pressure kneader. These are described in detail in *Saishin Ganryo Oyo Gijutsu (Newest Pigment Application Technology)* (CMC Publishing Co., Ltd., 1986).

As the water-soluble dyes used in the invention, there are preferably used dyes such as magenta dyes described in JP-A-2002-371214, phthalocyanine dyes described in JP-A-2002-309118, and water-soluble phthalocyanine dyes described in P-A-2003-12952 and JP-A-2003-12956.

The ink of the invention contains the dye in the medium preferably in the aqueous medium. The aqueous medium is water or water to which a solvent such as a water-miscible organic solvent is added. The water-miscible organic solvent may be the viscosity reducing agent in the ink stock solution as described above.

The above-mentioned water-miscible organic solvent which can be used in the invention is a material having a function as a drying inhibitor, a permeation accelerator, a wetting agent or the like in the field of art, and the high boiling water-miscible organic solvent is mainly used. Such compounds include an alcohols (for example, methanol, ethanol, propanol, isopropanol, butanol, isobutanol, sec-butanol, t-butanol, pentanol, hexanol, cyclohexanol or benzyl alcohol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol), a glycol derivative (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine) and another polar solvent (for example, formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidizolidinone, acetonitrile or acetone). The above-mentioned water-miscible organic solvents can be used in combination of two or more thereof.

Of these, an alcoholic solvent is particularly preferred. Further it is preferred that the ink of the invention contains a water-miscible organic solvent having a boiling point of 150° C. or more. Examples thereof include 2-pyrrolidone selected from the above.

These water-miscible organic solvents are contained preferably in an amount of from 5% to 60% by weight, and particularly preferably in an amount of from 10% to 45% by weight, in total.

The ink of the invention may contain a surfactatit to control the liquid properties of the ink, thereby being able to improve ejection stability of the ink and to give excellent effects to improvement of water resistance of images and prevention of blurring of the ink.

The surfactants include, for example, anionic surfactants such as sodium dodecylsulfate, sodium dodecyloxysulfonate and sodium alkylbenzenesulfonate, cationic surfactants such as cetylpyridinium chloride, trimethylcetylammonium chloride and tetrabutylammonium chloride, and nonionic surfactants such as polyoxyethylene nonylphenyl ether, polyoxyethylene naphthyl ether and polyoxyethylene octylphenyl ether. Above all, nonionic surfactants are particularly preferably used.

The content of the surfactant is from 0.001% to 15% by weight, preferably from 0.005% to 10% by weight, and more preferably from 0.01% to 5% by weight, based on the ink.

When the dye is an oil-soluble dye, the ink of the invention can be prepared by dissolving the oil-soluble dye in a high boiling organic solvent, and emulsifying and dispersing it in an aqueous medium.

The boiling point of the high boiling organic solvent used in the invention is a 150° C. or more, and preferably 170° C. or more.

Examples thereof include a phthalic acid ester (for example, dibutyl phthalate, dioctyl phthalate, dicyclohexyl phthalate, di-2-ethylhexyl phthalate, decyl phthalate, bis(2,4-di-tert-amylphenyl) isophthalate or bis(1,1-diethylpropyl) phthalate), an ester of phosphoric acid or phosphone (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate or di-2-ethylhexyldiphenyl phosphate), a benzoic acid ester (for example, 2-ethylhexyl benzoate, 2,4dichlorobenzoate, dodecyl benzoate or 2-ethylhexyl p-hydroxybenzoate), an amide (for example, N,N-diethyldodecanamide or N,N-diethyllaurylamide), an alcohol (for example, isostearyl alcohol), an aliphatic ester (for example, dibutoxyethyl succinate, di-2-ethylhexyl succinate, 2-hexyldecyl tetradecanoate, tributyl citrate, diethyl azelate, isostearyl lactate or trioctyl citrate), an aniline derivative (for example, N,N-dibutyl-2-butoxy-5-tert-octylaniline), a chlorinated paraffin (for example, a paraffin having a chlorine content of 10 to 80%), a trimesic acid ester (for example, tributyl trimesate), dodecylbenzene, diisopropylnaphthalene, a phenol (for example, 2,4-di-tert-amylphenol, 4-dodecyloxyphenol, 4-dodecyloxycarbonylphenol or 4-(4-dodecyloxyphenylsulfonyl)phenol), a carboxylic acid (for example, 2-(2,4-di-tert-amylphenoxy)butyric acid or 2-ethoxyoctanedecanoic acid) and an alkylphosophoric acid (for example, di-(2-ethylhexyl)phosphoric acid or diphenylphosphoric acid).

These high boiling organic solvents may be used either alone or as a mixture of several kinds thereof (for example, tricresyl phosphate and dibutyl phthalate, trioctyl phosphate and di(2-ethylhexyl) sebacate, or dibutyl phthalate and poly (N-tert-butylacrylamide)).

Examples of the high boiling point organic solvents used in the invention other than the above-mentioned compounds, and/or synthesis methods of these high boiling point organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,694,606, 4,728,599, 4,745,049, 4,935,321 and 5,013,639, EP-A-276319, EP-A-286253, EP-A-289820, EP-A-309158, EP-A-309159, EP-A-309160, EP-A-509311, EP-A-510576, East German Patents 147,009, 157,147, 159,573 and 225,240A, British Patent 2,091,124A, JP-A-4847335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941>JP-A-64-9452, JP-A-64-9454, JP-A-64-68745, JP-A-1-101543, JP-A-1-102454, JP-A-2-792, JP-A-2-4239, JP-A-243541, JP-A-4-29237, JP-A-4-30165, JP-A-4-232946 and JP-A-4-346338.

The amount of the high boiling organic solvent used is from 0.01 to 3.0 times, and preferably from 0.01 to 1.0 time as much as that of the oil-soluble dye by weight ratio.

In the invention, the oil-soluble dye or the high boiling organic solvent is preferably emulsified and dispersed in an aqueous medium. In the emulsification and dispersion, a low boiling organic solvent can also be used from the viewpoint of emulsifiability, depending on the circumstances. The low boiling organic solvent is an organic solvent having a boiling point of about 30 to 150° C. at atmospheric pressure. Preferred examples thereof include but are not limited to an ester (for example, ethyl acetate, butyl acetate, ethyl propionate, β-ethoxyethyl acetate or methylcellosolve acetate), an alcohol (for example, isopropyl alcohol, n-butyl alcohol or secondary butyl alcohol), a ketone (for example, methyl isobutyl ketone, methyl ethyl ketone or cyclohexanone), an amide (for example, dimethylformamide or N-methylpyrrolidone) and an ether (for example, tetrahydrofuran, dioxane).

The emulsification and dispersion are carried out for dispersing an oil phase obtained by dissolving the dye in the high boiling organic solvent or in a mixed solvent thereof with the low boiling organic solvent depending on the circumstances in an aqueous phase mainly comprising water to form fine oil droplets of the oil phase. This oil phase may be used as the ink stock solution, or one in which the oil phase is dispersed in the aqueous phase may be used as the ink stock solution. In this case, ingredients such as a surfactant, a wetting agent, a dye stabilizer, an emulsification stabilizer, a preservative and a fungicide can be added to either one or both of the aqueous phase and the oil phase, as needed.

As an emulsification method, a method of adding the oil phase to the aqueous phase is popularly practiced. However, a so-called phase inversion emulsification method of adding dropwise the aqueous phase to the oil phase can also be preferably used. The above-mentioned emulsification method can be applied also when the dye is water-soluble and the ingredient is oil-soluble.

When the emulsification and dispersion are carried out, various surfactants can be used. For example, there are preferably used anionic surfactants such as a fatty acid salt, an alkylsulfate ester, an alkylbenzenesulfonate, an alkyl-naphthalenesulfonate, a dialkylsulfosuccinate, an alkylphosphate ester, a naphthalenesulfonic an acid-formalin condensate and a polyoxyethylene alkylsulfate ester, and nonionic surfactants such as a polyoxyethylene alkyl ether, a polyoxyethylene alkylaryl ether, a polyoxyethylene fatty acid ester, a sorbitan fatty acid ester, a polyoxyethylene sorbitan fatty acid ester, a polyoxyethylene alkylamine, a glycerin fatty acid ester and an oxyethylene oxypropylene block copolymer. Further, SURFYNOLS (produced by Air Products & Chemicals), which is an acetylene-based polyoxyethylene oxide surfactant, is also preferably used. Furthermore, an amine oxide-type amphoteric surfactant such as N,N-dimethyl-N-alkylamine oxide is also preferred. In addition, surfactants described in JP-A-59-157636 (pages (37) to (38)) and *Research Disclosure*, No. 308119 (1989) can also be used.

Further, for the purpose of stabilizing the dispersion immediately after the emulsification, a water-soluble polymer may be added in combination with the surfactant. As the water-soluble polymer, there is preferably used polyvinyl alcohol, polyvinylpyrrolidone, polyethylene oxide, polyacrylic acid, polyacrylamide or a copolymer thereof Furthermore, a natural water-soluble polymer such as a polysaccharides, casein or gelatin is also preferably used. In addition, in order to stabilize the dye dispersion, a polymer which does not substantially dissolve in an aqueous medium, such as a vinyl polymer, a polyurethane, a polyester, a polyamide, a polyurea or a polycarbonate obtained by the polymerization of an acrylic acid ester, a methacrylic acid ester, a vinyl ester, an acrylamide, a methacrylamide, an olefin, a styrene, a vinyl ether or an acrylonitrile, can also be used in combination with the surfactant. It is preferred that these polymers each contains $—SO_3^-$ or $—COO^-$. When such a polymer which does not substantially dissolve in the aqueous medium is used in combination with the surfactant, the polymer is preferably used in an amount of 20% by weight or less, and more preferably in an amount of 10% by weight or less, based on the high boiling organic solvent.

When the oil-soluble dye and the high boiling organic solvent are dispersed by the emulsification and dispersion to prepare the aqueous ink, particularly important is the control of the particle size. In order to enhance the color purity or density of images at the time when it is formed by the inkjet recording, it is essential to reduce the average particle size. The average particle size is preferably 1 μm or less, and more preferably from 5 to 100 nm, by volume average particle size The volume average particle size and particle size distribution of the above-mentioned dispersed particles can be easily measured by a known method such as a method described in *Jikken Kagaku Koza* (*Lecture of Experimental Chemistry*), 4th ed., pages 417 to 418, as well as a static light scattering method, a dynamic light scattering method and a centrifugal precipitation method. For example, the ink is diluted with distilled water so as to yield a particle concentration of 0.1% to 1% by weight, and then, the particle size can be easily measured by a commercially available volume average particle size measuring apparatus (for example, Microtrac UPA manufactured by Nikkiso K.K.). Further, the dynamic light scattering method utilizing the laser Doppler effect is particularly preferred because it is possible to measure the particle size to a small size.

The volume average particle size is the average particle size weighted with the particle volume, and obtained by multiplying the diameters of individual particles with the volumes thereof, and dividing the sum total of the products by the total volume of the particles in a collection of the particles. The volume average particle size is described in Soichi Muroi, *Kobunshi Latex no Kagaku* (*Chemistry of Polymer Latex*), page 119, Kobunshikankokai Co., Ltd.

Further, it has become clear that the presence of coarse particles plays a very major role in printing performance. That is to say, it has been revealed that the coarse particles clog nozzles of a head, or form stains, even when the coarse particles do not clog the nozzles, which causes the failure of ink ejection or the distortion of ink ejection, thereby seriously affecting the printing performance. In order to prevent this trouble, it is important to reduce the number of particles having a particle size of 5 μm or more to 10 or less, and the number of particles having a particle size of 1 μm or more to 1,000 or less, in μl of the ink prepared.

As a method for removing these coarse particles, there can be used a known method such as centrifugal separation or microfiltration. Such a separation process may be performed immediately after the emulsification and dispersion or immediately before loading of the ink in an ink cartridge after various ingredients such as a wetting agent and a surfactant have been added to the emulsified dispersion.

A mechanical emulsification apparatus can be used as an effective means for reducing the average particle size and eliminating coarse particles.

As the emulsification apparatus, there can be used a known apparatus such as a simple stirrer, an impeller stirring system, an in-line stirring system, a mill system such as a colloid mill or an ultrasonic system. However, the use of a high-pressure homogenizer is particularly preferred.

A detailed mechanism of the high-pressure homogenizer is described in U.S. Pat. No. 4,533,254 and JP-A-647264. Examples of the commercially available apparatus include Gaulin Homogenizer (manufactured by A. P. V Gaulin Inc.), Microfluidizer (manufactured by Microfluidex Inc.) and Altimizer (produced by Sugino Machine Ltd.).

Further, a high-pressure homogenizer with a mechanism for finely pulverizing particles in an ultrahigh pressure jet stream as recently described in U.S. Pat. No. 5,720,551 is particularly effective for the emulsification and dispersion of the invention. Examples of the emulsification apparatus using this ultrahigh pressure jet stream include DeBEE2000 (manufactured by BEE International Ltd.).

In performing the emulsification with the high-pressure emulsification-dispersion apparatus, the pressure is 50 MPa or more, preferably 60 MPa or more, and more preferably 180 MPa or more.

For example, a method of using two or more emulsification apparatus in combination by performing the emulsification in a stirring emulsifier, and then passing the resulting emulsion through a high-pressure homogenizer is particularly preferred. Further, a method of once performing the emulsification and dispersion with such an emulsifying apparatus, and then adding ingredients such as a wetting agent and a surfactant, followed by passing again the resulting emulsion through a high-pressure homogenizer before loading of the ink in an ink cartridge is also preferred.

When the low boiling organic solvent is contained in addition to the high boiling organic solvent, the low boiling point solvent is preferably removed from the viewpoints of stability of the emulsified product and safety and health. As methods for removing the low boiling solvent, there can be used various known methods depending on the kind of solvent. That is to say, examples thereof include evaporation, vacuum evaporation and ultrafiltration. The removing process of the low boiling organic solvent is preferably performed as soon as possible immediately after the emulsification.

Methods for preparing the ink for inkjet recording are described in detail in JP-A-5-148436, JP-A-5-295312, JP-A-7-97541, JP-A-7-82515 and JP-A-7-118584, and they can also be utilized in the preparation of the ink of the invention The ink of the invention can contain functional ingredients for imparting various functions to the ink. The functional ingredients include, for example, various solvents described above, a drying inhibitor for preventing clogging due to drying of the ink in ejection nozzles, a permeation accelerator for attaining better permeation of the ink into paper, an ultraviolet absorbent, an antioxidant, a viscosity adjusting agent, a surface tension adjusting agent, a dispersant, a dispersion stabilizer, a fungicide, a rust inhibitor, an antifoaming agent and a pH adjusting agent, and these can be appropriately selected to use in an appropriate amount in the invention. These functional ingredients also include one kind of compound which can exhibit one or two or more functions. Accordingly, for a treatment of the functional ingredients having overlapping functions in the following compounding ratios of the functional ingredients, the compound shall be independently counted in each functional ingredient.

The drying inhibitor used in the invention is preferably a water-soluble organic solvent having a vapor pressure lower than that of water. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol and trimethylolpropane; lower alkyl ethers of polyhydric alcohols such as ethylene glycol monomethyl(or monoethyl)ether, diethylene glycol monomethyl(or monoethyl)ether and triethylene glycol monoethyl(or monobutyl)ether; heterocycles such as 2-pyrrolidone, N-methyl-2-pyrrolidone, 1,3-dimethyl-2-imidazolidinone and N-ethylmorpholine; sulfur-containing compounds such as sulfolane, dimethylsulfoxide and 3-sulfolene; multifunctional compounds such as diacetone alcohol and diethanolamine; and urea derivatives. Of these, polyhydric alcohols such as glycerol and diethylene glycol are more preferred. The above-mentioned drying inhibitors may be used either alone or as a combination of two or more thereof. The drying inhibitors are each preferably contained in an amount of 10% to 50% by weight in the ink.

Examples of the permeation accelerators used in the invention include alcohols such as ethanol, isopropanol, butanol, di(tri)ethylene glycol monobutyl ether and 1,2-hexanediol, sodium laurylsulfate, sodium oleate and nonionic surfactants. These have a sufficiently high effect when contained in an amount of 10% to 30% by weight in the ink and preferably used in an amount within the range causing no blurring of printed letters or no print through.

As the ultraviolet absorbents used for improving keeping quality of images in the invention, there can also be used benzotriazole-based compounds described in JP-A-58-185677, JP-A-61-190537, JP-A-2-782, JP-A-5-197075 and JP-A-9-34057, benzophenone-based compounds described in JP-A-46-2784, JP-A-5-194483 and U.S. Pat. No. 3,214,463, cinnamic acid-based compounds described in JP-B-48-30492, JP-B-56-21141 and JP-A-10-88106, triazine-based compounds described in JP-A-4-298503, JP-A-8-53427, JP-A-8-239368, JP-A-10-182621 and JP-T-8-501291 (the term "JP-T" as used herein means a "published Japanese translation of a PCT patent application"), compounds described in *Research Disclosure No.* 24239, and compounds which absorb ultraviolet light and emit fluorescent light, so-called fluorescent brightening agents, represented by stilbene-based compounds and benzoxazole-based compounds.

As the antioxidants used for improving keeping quality of images in the invention, various organic or metal complex discoloration inhibitors can be used. Examples of the organic discoloration inhibitors include a hydroquinone, an alkoxyphenol, a dialkoxyphenol, a phenol, an aniline, an amine, an indane, a chroman, an alkoxyaniline and a heterocyclic compound. The metal complexes include a nickel complex and a zinc complex. More specifically, there can be used compounds described in patents cited in *Research Disclosure*, No. 17643, Items VII-I to VII-J, *Research Disclosure*, No. 15162, *Research Disclosure*, No. 18716, page 650, left column, *Research Disclosure*, No. 36544, page 527, *Research Disclosure*, No. 307105, page 872 and *Research Disclosure*, No. 15162, and compounds included in formulas of representative compounds and specific examples thereof described in JP-A-62-215272, pages 127 to 137.

Examples of the rust inhibitors used in the invention include an acidic sulfite, sodium thiosulfate, ammonium thioglycolate, diisopropylammonium nitrite, pentaerythritol tetranitrate, dicyclohexylammonium nitrite and benzotriazole. The rust inhibitor is preferably used in an amount of 0.02% to 5.00% by weight in the ink.

The pH adjusting agent used in the invention can be suitably used for adjusting the pH and imparting dispersion stability. The pH of the ink is preferably adjusted to 7 to 11 at 25° C. When the pH is less than 7, the solubility of the dye decreases to be liable to cause clogging of nozzles, whereas when it exceeds 11, the water resistance is liable to deteriorate. The pH adjusting agents include an organic base and an inorganic base as basic compounds, and an organic acid and an inorganic acid as acidic compounds.

As the basic compounds, it is also possible to use inorganic compounds such as sodium hydroxide, lithium hydroxide, potassium hydroxide, lithium carbonate, sodium carbonate, potassium carbonate, sodium hydrogencarbonate, potassium hydrogencarbonate, sodium acetate, potassium acetate, lithium acetate, sodium phosphate, sodium monohydrogenphosphate and lithium phosphate, organic bases such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine, and alkali metal salts of organic acids such as lithium benzoate, sodium benzoate, potassium benzoate, lithium phthalate, sodium phthalate and potassium phthalate.

As the acidic compounds, there can also be used inorganic compounds such as hydrochloric acid, sulfuric acid, phosphoric acid, boric acid, sodium hydrogensulfate, potassium hydrogensulfate, potassium dihydrogenphosphate and sodium dihydrogenphosphate, and organic compounds such as acetic acid, tartaric acid, benzoic acid, trifluoroacetic acid, methanesulfonic acid, ethanesulfonic acid, benzenesulfonic acid, p-toluenesulfonic acid, saccharic acid, phthalic acid, picolinic acid and quinolinic acid.

The conductivity of the ink of the invention is within the range of 0.01 to 10 S/m, and preferably within the range of 0.05 to 5 S/m.

The conductivity can be measured by the electrode method using commercially available saturated potassium chloride.

The conductivity is controllable mainly by the ion concentration in an aqueous solution. When the salt concentration is high, desalting can be performed by using a ultrafiltration membrane or the like. Further, when salts or the like are added to adjust the conductivity, various organic salts or inorganic salts can be added for adjustment.

The inorganic salts which can be used include inorganic compounds such as a potassium halide, a sodium halide, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate and sodium dihydrogenphosphate, and organic compounds such as sodium acetate, potassium acetate, potassium tartrate, sodium tartrate, sodium benzoate, potassium benzoate, sodium p-toluenesulfonate, potassium saccharate, potassium phthalate and sodium picolinate.

Further, the conductivity can also be adjusted by selecting ingredients of an aqueous medium described later.

The viscosity of the ink of the invention is preferably from 1 to 30 mPa·s, more preferably from 2 to 15 mPa·s, and particularly preferably from 2 to 10 mPa·s, at 25° C. When the viscosity exceeds 30 mPa·s, the fixing rate of recorded images decreases and the ejection performance also deteriorates. When it is less than 1 mPa·s, the blurring of recorded images occurs to deteriorate the grade.

The viscosity can be arbitrarily adjusted by the amount of the ink solvent added. Examples of the ink solvents include glycerol, diethylene glycol, triethanolamine, 2-pyrrolidone, diethylene glycol monobutyl ether and triethylene glycol monobutyl ether.

Further, the viscosity adjusting agent may also be used. The viscosity adjusting agents include, for example, water-soluble polymers such as celluloses and polyvinyl alcohol, and nonionic surfactants. The viscosity adjusting agents are described in more detail in *Nendo Chosei Gijutsu* (*Viscosity Adjusting Technology*), Chapter 9 (Gijutsu Joho Kyokai, 1999), and *Chemicals for Inkjet Printers* ('98 Enlarged Edition)—*Zairyo no Kaihatsu Doko-Tenbo Chosa* (*Survey on Tendency Prospect of Development of Materials*)—, pages 162 to 174 (CMC Publishing Co., Ltd., 1997).

Although a method for measuring the viscosity of a liquid is described in detail in JIS Z8803, the viscosity can be simply measured with a commercially available viscometer For example, a B type viscometer or E type viscometer manufactured by Tokimec Inc. is used as a rotary viscometer. In the invention, the viscosity has been measured at 25° C. with a vibrating VM-100A-L type viscometer manufactured by Yamaichi Electronics Co., Ltd. The unit of the viscosity is the pascal second (Pa·s). However, the millipascal second (mPa·s) is generally used.

The surface tension of the ink used in the invention is preferably from 20 to 50 mN/m, and more preferably from 20 to 40 mN/m, at 25° C., for both the dynamic surface tension and the static surface tension. When the surface tension exceeds 50 mN/m, ejection stability is deteriorated, and blurring in color mixing and smeared print edges occur to significantly deteriorate print quality. On the other hand, when the surface tension of the ink is less than 20 mN/m, the ink adheres to a surface of equipment when ejected, resulting in poor printing in some cases.

In order to adjust the surface tension, the above-mentioned various surfactants of the cationic, anionic, nonionic and betaine families can be added. Further, the surfactants can be used as a combination of two or more thereof.

As methods for measuring the static surface tension, there have been known a capillary rise method, a dropping method and a hanging ring method. However, in the invention, a perpendicular plate method is used as the measuring method of the static surface tension.

When a thin glass or platinum plate is vertically hung with part thereof immersed in a liquid, the surface tension of the liquid acts downward along a length at which the liquid is in contact with the plate. The surface tension can be measured by bringing this tension into balance with an upward force.

Further, as methods for measuring the dynamic surface tension, there have been known, for example, a vibration jet method, a meniscus dropping method and a maximum bubble pressure method as described in *Shin-Jikken Kagaku Koza* (*Lecture of New Experimental Chemistry*), Vol. 18, *Interface and Colloid*, pages 69 to 90 (Maruzen Co., Ltd., 1977), and further a liquid membrane breaking method as described in JP-A-3-2064. However, in the invention, a bubble pressure differential pressure method is used as the measuring method of the dynamic surface tension. A measurement principle thereof and the measuring method will be described below.

When air bubbles are formed in a solution homogenized by stirring, a new gas-liquid interface is formed, and surfactant molecules in the solution gather on a surface of water at a constant speed. When the bubble rate (the formation rate of bubbles) is varied, the slower formation rate results in gathering of the more surfactant molecules on a surface of the bubble. Accordingly, the maximum bubble pressure immediately before the bursting of the bubble decreases, so that the maximum bubble pressure (surface tension) to the bubble rate can be detected. Preferred examples of the measuring methods of the dynamic surface tension include a method of forming bubbles in a solution by using two probes, large and small, measuring the differential pressure between the two probes in the maximum bubble pressure state, and calculating the dynamic surface tension.

The amount of non-volatile ingredients contained in the ink of the invention is preferably from 10% to 70% by weight based on the total amount of the ink from the viewpoints of ejection stability of the ink, print image quality, various fastness of images and decreases in blurring of images and stickiness of a print surface after printing, and more preferably from 20% to 60% by weight from the viewpoints of ejection stability of the ink and a decrease in blurring of images after printing.

The non-volatile ingredient as used herein means a liquid, a solid ingredient or a high-molecular weight ingredient having a boiling point of 150° C. or more under 1 atm. The non-volatile ingredients contained in the ink for inkjet recording are the dye and the high boiling solvent, and a polymer latex, the surfactant, the dye stabilizer, the fungicide, a buffer and the like added as needed. Many of these non-volatile ingredients excepting the dye stabilizer deteriorate dispersion stability of the ink. Further, they exist on inkjet image receiving paper after printing, so that they have the properties of inhibiting stabilization due to association of the dye on the image receiving paper and deteriorating various fastness of an image area and blurring of images under high humidity conditions.

In the invention, it is also possible to contain a high-molecular weight compound. The high-molecular weight compound as used herein means all polymer compounds having a number average molecular weight of 5,000 or more which are contained in the ink. These polymer compounds include water-soluble polymer compounds substantially soluble in an aqueous medium, water-dispersible polymer compounds such as a polymer latex and a polymer emulsion, and further alcohol-soluble polymer compounds soluble in a polyhydric alcohol used as an auxiliary solvent. However, all are included in the high-molecular weight compounds used in the invention, as long as they are substantially homogeneously soluble or dispersible in the ink solution.

Specific examples of the water-soluble polymer compounds include water soluble polymers such as polyvinyl alcohol, silanol-modified polyvinyl alcohol, carboxymethyl cellulose, hydroxyethyl cellulose, polyvinylpyrrolidone, a polyalkylene oxide such as polyethylene oxide or polypropylene oxide and a polyalkylene oxide derivative, natural water-soluble polymers such as a polysaccharide, starch, cationized starch, casein and gelatin, aqueous acrylic resins such as polyacrylic acid, polyacrylamide and copolymers thereof, aqueous alkyd resins, and water-soluble polymer compounds having a $—SO_3^-$ or $—COO^-$ group in their molecule and substantially soluble in an aqueous medium.

Further, the polymer latexes include a styrene-butadiene latex, a styrene-acrylic latex and a polyurethane latex. Furthermore, the polymer emulsions include an acrylic emulsion.

These water-soluble polymer compounds can be used either alone or as a combination of two or more thereof.

As already described, the water-soluble polymer compound is used as the viscosity adjusting agent for adjusting the viscosity of the ink to a viscosity region in which ejection characteristics are good. However, when it is added in large amounts, the viscosity of the ink increases to deteriorate ejection stability of the ink solution. As a result, when the ink has aged, nozzles become liable to clog by precipitates.

The amount of the polymer compound added as the viscosity adjusting agent is from 0 to 5% by weight, preferably 0 to 3% by weight, and more preferably from 0 to 1% by weight, based on the total amount of the ink, although it depends on the molecular weight of the compound added (the higher molecular weight requires the smaller amount of the compound added).

Further, in the invention, the above-mentioned various surfactants of the cationic, anionic, nonionic and betaine families can be used as the dispersant and the dispersion stabilizer, and fluorine-based and silicone-based compounds and chelating agents represented by EDTA can also be used as the antifoaming agent, as needed.

Reflective media which are print media suitably used in the invention will be further described below. The reflective media include recording paper and recording film. A support used in the recording paper or recording film is made, for example, from chemical pulp such as LBKP or NBKP, mechanical pulp such as GP, PGW, RMP, TMP, CTMP, CMP or CGP, or waste paper pulp such as DIP, and known additives such as a pigment, a binder, a sizing agent, a fixing agent, a cationic agent and a paper strength enhancing agent are mixed therewith, as needed. Then, the support is produced from the resulting mixture by using various machines such as a Fourdrinier paper machine and a cylinder paper machine. Further, in addition to these supports, a support made from either synthetic paper or a plastic film sheet is available. The thickness of the support is desirably from 10 to 250 μm, and the basis weight thereof is desirably from 10 to 250 $g/m^2$.

An ink-receiving layer and a backcoat layer may be directly provided on the support to produce an image-receiving material for the ink of the invention and the ink set, or after providing a size press or an anchor coat layer using starch, polyvinyl alcohol or the like, an ink-receiving layer and a backcoat layer may be provided to produce an image-receiving material. Further, the support may be planarized with a calendering device such as machine calender, a TG calender and a soft calender.

As the support, there is preferably used paper both surfaces of which are laminated with a polyolefin (for example, polyethylene, polystyrene, polybutene or a copolymer thereof) or polyethylene terephthalate, or a plastic film. A white pigment (for example, titanium oxide or zinc oxide) or a tinting dye (for example, cobalt blue, ultramarine or neodymium oxide) is preferably added to the polyolefin.

The ink-receiving layer provided on the support contains a porous material or an aqueous binder. Further, the ink-receiving layer preferably contains a pigment, which is preferably a white pigment. The white pigments include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as a styrenic pigment, an acrylic pigment, a urea resin and a melamine resin. Particularly preferred are porous inorganic white pigments, and synthetic amorphous silica having a large pore area is particularly suitable. As the synthetic amorphous silica, there is available either silicic anhydride obtained by a dry production method (gas phase method) or silicic hydrate obtained by a wet production method.

As the recording paper in which the above-mentioned pigment is contained in the image-receiving layer, there can be used, specifically, recording paper described in JP-A-10-81064, JP-A-10-119423, JP-A-10-157277, JP-A-10-217601, JP-A-11-34235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

The aqueous binders contained in the ink-receiving layer include water-soluble polymers such as polyvinyl alcohol, silanol-modified polyvinyl alcohol, starch, cationized starch, casein, gelatin, carboxymethyl cellulose, hydroxyethyl cellulose, polyvinylpyrrolidone, a polyalkylene oxide and a polyalkylene oxide derivative, and water-dispersible polymers such as a styrene-butadiene latex and an acrylic emulsion. These aqueous binders may be used either alone or as a combination of two or more thereof. In the invention, of these, polyvinyl alcohol and silanol-modified polyvinyl alcohol are particularly preferred in terms of adhesion to the pigment and peeling resistance of the ink-receiving layer.

The ink-receiving layer may contain a mordant, a water-proofing agent, a light fastness improver, a gas fastness improver, a surfactant, a hardening agent and other additives in addition to the pigment and the aqueous binder.

The mordant added to the ink-receiving layer is preferably immobilized, and for such a purpose, a polymer mordant is preferably used.

The polymer mordants are described in JP-A-48-28325, JP-A-54-74430, JP-A-54, -124726, JP-A-55-22766, JP-A-55-142339, JP-A-60-233850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236 and U.S. Pat. Nos. 2,484,430, 2,548,564, 3,148,061, 3,309,690, 4,115,124, 4,124,386, 4,193,800, 4,273,853, 4,282,305 and 4,450,224. The image-receiving materials containing the polymer mordants described in JP-A-1-161236, pages 212 to 215 are particularly preferred. When the polymer mordants described in JP-A-1-161236 are used, images having excellent image quality can be obtained, and the light fastness of the images is improved.

The water-proofing agent is effective for giving water resistant to images. As these water-proofing agents, cationic resins are particularly preferred. Such cationic resins include polyamidepolyamine epichlorohydrin, polyethyleneimine, polyaminesulfone, polydimethyldiallylammonium chloride polymer and cation polyacrylamide. The content of these cationic resins is preferably from 1 to 15% by weight, and more preferably from 3 to 10% by weight, based on the total solid content of the ink-receiving layer.

The light fastness improvers and the gas fastness improvers include a phenol compound, a hindered phenol compound, a thioether compound, a thiourea compound, a thiocyanic acid compound, an amine compound, a hindered amine compound, a TEMPO compound, a hydrazine compound, a hydrazide compound, an amidine compound, a vinyl group-containing compound, an ester compound, an amide compound, an ether compound, an alcohol compound, a sulfinic acid compound, a saccharide, a water-soluble reducing compound, an organic acid, an inorganic acid, a hydroxyl group-containing organic acid, a benzotriazole compound, a benzophenone compound, a triazine compound, a heterocyclic compound, a water-soluble metal salt, an organic metal compound and a metal complex, Specific examples of these compounds include compounds descried in JP-A-10-182621, JP-A-2001-260519, JP-A-2000-260519, JP-B-4-34953, JP-B-4-34513, JP-B-4-34512, JP-A-11-170686, JP-A-60-67258 and JP-A-11-321090.

The surfactant functions as a coating aid, a releasability improver, a slipperiness improver or an antistatic agent. The surfactants are described in JP-A-62-173463 and JP-A-62-183457.

Instead of the surfactant, an organic fluoro compound may be used. The organic fluoro compound is preferably hydrophobic. Examples of the organic fluoro compounds include fluorochemical surfactants, oily fluorine compounds (for example, fluorine oil) and solid fluorine compound resins (for example, an ethylene tetrafluoride resin). The organic fluoro compounds are described in JP-B-57-9053 (columns 8 to 17), JP-A-61-20994 and JP-A-62-135826.

As the hardening agents, there can be used materials described in JP-A-1-161236 (page 222), JP-A-9-263036, JP-A-10-119423 and JP-A-2001-310547.

Other additives added to the ink-receiving layer include a pigment dispersant, a thickener, an antifoaming agent, a dye, a fluorescent brightening agent, an preservative, a pH adjusting agent and a matte agent. The ink-receiving layer may be composed of either one layer or two layers.

The recording paper or recording film may also have a backcoat layer, and ingredients which can be added to this layer include a white pigment, an aqueous binder and other ingredients.

The white pigments contained in the backcoat layer include white inorganic pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate and magnesium hydroxide, and organic pigments such as a styrenic plastic pigment, an acrylic plastic pigment, polyethylene, microcapsules, a urea resin and a melamine resin.

The aqueous binders contained in the backcoat layer include water-soluble polymers such as a styrene/maleate copolymer, a styrene/acrylate copolymer, polyvinyl alcohol, silanol-modified polyvinyl alcohol, starch, cationized starch, casein, gelatin, carboxymethyl cellulose, hydroxyethyl cellulose and polyvinylpyrrolidone, and water-dispersible polymers such as a styrene-butadiene latex and an acrylic emulsion. Other ingredients contained in the backcoat layer include an antifoaming agent, a foam inhibitor, a dye, a fluorescent brightening agent, an preservative and a water-proofing agent.

A fine polymer particle dispersion may be added to a constituent layer (including the back layer) of the inkjet recording paper or recording film. The fine polymer particle dispersion is used for the purpose of improving film properties, for example, stabilizing dimension, or preventing curling, adhesion or film cracking. The fine polymer particle dispersions are described in JP-A-62-245258, JP-A-62-1316648 and JP-A-62-110066. When the fine polymer particle dispersion having a low glass transition temperature (40° C. or less) is added to a layer containing the mordant, layer cracking or curling can be prevented. The curling can also be prevented by adding the fine polymer particle dispersion having a high glass transition temperature to the back layer.

The ink of the invention can also be used for the uses other than the inkjet recording, such as a material for display images, an image-forming material for interior decoration and an image-forming material for outdoor decoration.

The materials for display images include various materials such as posters, wall paper, ornamental articles (such as a decorative figurine and a doll), handbills for commercial advertisement, wrapping paper, wrapping materials, paper bags, vinyl bags, package materials, billboards, images drawn on or attached to side faces of transportation facilities (such as an automobile, a bus and an electric car) and clothes with logos. When the ink of the invention is used as the material for forming a display image, the image includes not only an image in a narrow sense, but also all patterns formed by the ink, which can be acknowledged by a human, such as abstract design and letters, and geometrical patterns.

The materials for interior decoration include various materials such as wallpaper, ornamental articles (such as a decorative figurine and a doll), luminaire members, furniture members and design members of floors or ceilings. When the ink of the invention is used as the material for forming an image, the image includes not only an image in a narrow sense, but also all patterns formed by the ink, which can be acknowledged by a human, such as abstract design and letters, and geometrical patterns.

The materials for outdoor decoration include various materials such as wall materials, roofing materials, billboards, gardening materials, outdoor ornamental articles (such as a decorative figurine and a doll) and outdoor luminaire members. When the ink of the invention is used as the material for forming an image, the image includes not only an image in a narrow sense, but also all patterns formed by the ink, which can be acknowledged by a human, such as abstract design and letters, and geometrical patterns.

In the uses as described above, media on which the pattern is formed include various materials such as paper, fiber, cloth (including non-woven fabric), plastics, metal and ceramics. As a dyeing form, the dye can be fixed by mordanting or printing, or in the form of a reactive dye into which a reactive group is introduced. Of these, it is preferred that dyeing is performed in the mordanting form.

In the production of the ink stock solution or the ink, ultrasonic vibration can also be applied in the process of dissolving additives such as the dye.

According to the ultrasonic vibration, ultrasonic energy equivalent to or more than energy which the ink receives at a recording head is previously applied in the production process of the ink to remove bubbles, in order to prevent the ink from producing bubbles by pressure applied at the recording head.

The ultrasonic vibration is generated by an ultrasonic wave having usually a frequency of 20 KHz or more, preferably a frequency of 40 KHz or more, and more preferably a frequency of 50 KHz or more. Further, the energy applied to the solution by the ultrasonic vibration is usually $2\times10^7$ J/m$^3$ or more, preferably $5\times10^7$ J/m$^3$ or more, and more preferably $1\times10^8$ J/m$^3$ or more. Furthermore, the ultrasonic vibration is applied usually for about 10 minutes to about 1 hour.

The effect can be achieved whenever the sonic vibration is applied, as long as it is done after the dye has been added to the medium. Even when the ultrasonic vibration is applied after the ink completed has once been stored, it exhibits the effect. However, it is preferred that the ultrasonic vibration is applied in dissolving and/or dispersing the dye in the medium, because the effect of removing bubbles is greater, and the ultrasonic vibration enhances dissolution and/or dispersion of the dye in the medium.

That is to say, the above-mentioned process of applying at least the ultrasonic vibration may be performed in either case, during or after the process of dissolving and/or dispersing the dye in the medium. In other words, the above-mentioned process of applying at least the ultrasonic vibration can be arbitrarily performed once or more, until the ink becomes a product after the preparation of the ink.

As a mode for carrying out the invention, the process of dissolving and/or dispersing the dye in the medium preferably comprises the step of dissolving the above-mentioned dye in a part of the whole medium and the step of mixing the remaining medium with the resulting solution, and it is preferred that the ultrasonic vibration is applied in at least either of the above-mentioned steps. It is more preferred that the ultrasonic vibration is applied at least in the step of dissolving the dye in a part of the whole medium.

The above-mentioned step of mixing the remaining medium may be either single or plural.

Furthermore, in the production of the ink according to the invention, deaeration by heating or deaeration under reduced pressure is preferably used in combination, because the effect of removing bubbles in the ink is enhanced. The deaeration by heating or the deaeration under reduced pressure is preferably performed simultaneously with the step of mixing the remaining medium or after that step. In the process of applying the ultrasonic vibration, apparatus for generating the ultrasonic vibration include known apparatus such as an ultrasonic disperser.

When the ink stock solution or ink of the invention is prepared, the step of removing dust, solid matter, by filtration, which is further conducted after the solution preparation, is important. A filter is used in this operation, and the filter used in this case is preferably a filter having an effective pore size of 1 μm or less, preferably from 0.05 to 0.3 μm, particularly preferably from 0.25 to 0.3 μm. As materials for the filter, there can be used various materials. In particular, in the case of the ink containing the water-soluble dye, a filter prepared for an aqueous solvent is preferably used. Above all, a filter made of a polymer material, which is hard to generate dust, is preferably used. As a filtration method, the solution may be forced to pass through a filter by supplying the solution. Further, either pressure filtration or filtration under reduced pressure is utilizable.

After the filtration, the air is taken in the solution in many cases. Bubbles due to this air also often contribute to image distortion in inkjet recording. It is therefore preferred that the above-mentioned defoaming process is additionally provided. As defoaming methods, there are available various methods such as till standing of the solution after the filtration, ultrasonic defoaming using a commercially available device and defoaming under reduced pressure. In the case of the ultrasonic defoaming, a defoaming operation is performed preferably for 30 seconds to 2 hours, and more preferably for about 5 minutes to about 1 hour.

In order to prevent contamination with dust in the operations, it is preferred that these operations are performed utilizing a space such as a clean room or a clean bench. In the invention, particularly, these operations are preferably performed in the space of class 100 or less as the degree of cleanness. The term "the degree of cleanness" as used herein indicates a value measured with a dust counter.

The volume of the ink drop ejected onto a recording material in the invention is from 0.1 pl to 100 pl. The volume of the ejected ink drop is preferably within the range of 0.5 pl to 50 pl, and particularly preferably within the range of 2 pl to 50 pl.

In the invention, there is no limitation on the inkjet recording system, as long as image recording is performed with an inkjet printer using the ink or ink set of the invention. The ink of the invention is used in known systems such as a charge control system in which the ink is ejected by electrostatic induction force, a drop-on-demand system (pressure pulse system) utilizing oscillation pressure of piezoelectric elements, an acoustic inkjet system in which electric signals are converted to acoustic beams, with which the ink is irradiated to eject the ink by the use of radiation pressure, and a thermal inkjet system (bubble jet system) in which the ink is heated to form bubbles, and pressure generated is utilized.

The inkjet recording systems include a system of ejecting an ink low in concentration, which is called photo ink, as many drops small in volume, a system of improving image quality using a plurality of inks substantially identical in hues and different in concentration, and a system of using a transparent and colorless ink. The volume of the ejected ink drop is controlled mainly with a print head.

For example, in the case of the thermal inkjet system, it is possible to control the volume of the ejected ink drop by the structure of the print head. That is to say, the ink drop having a desired size can be ejected by changing the size of an ink chamber, a heating unit or a nozzle. Even in the case of the thermal inkjet system, it is also possible to realize ejection of the plural ink drops different in size by providing a plurality of beads having heating units or nozzles different in size.

In the case of the drop-on-demand system using piezoelectric elements, the volume of the ejected ink drop can also be changed by the structure of the print head similarly to the thermal inkjet system. However, the plural ink drops different in size can be ejected using the print head of the same structure by controlling the waveform of driving signals for driving the piezoelectric elements, as described later.

In the invention, the ejection frequency at the time when the ink drop is ejected onto the recording material is 1 KHz or more.

In order to record a high-quality image like a photograph, the image high in sharpness is reproduced with small ink drops. It is therefore required that the ink drop ejection density is 600 dpi (dots pre inch) or more.

On the other hand, when the ink drops are ejected with heads each having a plurality of nozzles, there is a restriction that the number of heads concurrently drivable is from tens to about 200 for a type in which recording paper and the beads move in directions crossing at right angles to make recording, and hundreds even for a type in which the heads called line beads are fixed. The reason for this is that a number of heads can not be driven at the same time, because there is a restriction in driving electric power and heat generation in the heads has an influence on an image.

Here, it is possible to increase the recording speed by increasing the driving frequency.

In the case of the thermal inkjet system, the ink drop ejection frequency can be controlled by controlling the frequency of head driving signals for heating the heads.

In the case of the piezoelectric system, it can be controlled by controlling the frequency of signals for driving the piezoelectric elements.

Driving of the piezoelectric head will be described below. For an image signal to be printed, the ejected ink drop size, the ink drop ejection speed and the ink drop ejection frequency are determined with a printer control unit to form a signal for driving the print head. The driving signal is supplied to the print head. The ejected ink drop size, the ink drop ejection speed and the ink drop ejection frequency are controlled by the signal for driving the piezoelectric element. Here, the ejected ink drop size and the ink drop ejection speed are determined by the shape and amplitude of the driving waveform, and the frequency is determined by the cycle period of the signal.

When the ink drop ejection frequency is set to 10 KHz, the head is driven every 100 microseconds, and recording of one line is terminated for 400 microseconds. Printing can be made at a speed of 1 sheet per 1.2 seconds by setting the moving speed of recording paper so as to move by 1/600 inch, namely about 42 micron meters, per 400 microseconds.

As the structure of the printing apparatus or the printer used in the invention, for example, a mode as disclosed in JP-A-11-170527 is suitable Further, as for an ink cartridge, one disclosed in JP-A-5-229133 is suitable. As for suction and the structure of a cap covering the print head in that case, those described in JP-A-7-276671 are suitable. Further, it is suitable that a filter for removing bubbles as disclosed in JP-A-9-277552 is provided in the vicinity of the head.

Furthermore, water repellent treatment as described in JP-A-2002-292878 is suitably conducted on a surface of the nozzle. The printer may be either a printer connected to a computer or an apparatus specialized to printing of photographs.

In the inkjet recording process applied to the invention, the average ink drop ejection speed at the time when the ink is ejected onto the recording material is 2 m/sec or more, and more preferably 5 m/sec or more.

The control of the ink drop ejection speed is performed by controlling the shape and amplitude of the waveform for driving the head.

Further, the plural ink drops different in size can be ejected using the same print head by using properly the plurality of driving waveforms.

EXAMPLES

The invention will be illustrated with reference to the following examples, but the invention should not be construed as being limited thereto. Dyes used in the following examples are shown below.

Example 1

(Preparation of Ink Stock Solution)

To 150 g of a black dye of compound A having the following structure (oxidation potential: 1.31 V (vs SCE)), 800 g of ultrapure water (18 MΩ or more) was added, followed by stirring for 1 hour with heating at 60 to 65° C. After the dye had been completely dissolved, the solution was cooled to room temperature, and 1.0 g of a preservative, PROXEL XL2 (Avecia Corp.), was added thereto. After stirring for 10 minutes, sodium bicarbonate was added to adjust the pH to 8.0. Then, 50 g of triethylene glycol was added as a viscosity reducing agent, followed by stirring for 10 minutes. Thereafter, filtration under reduced pressure was performed through a microfilter having an average pore size of 0.2 μm to prepare ink stock solution A for inkjet recording.

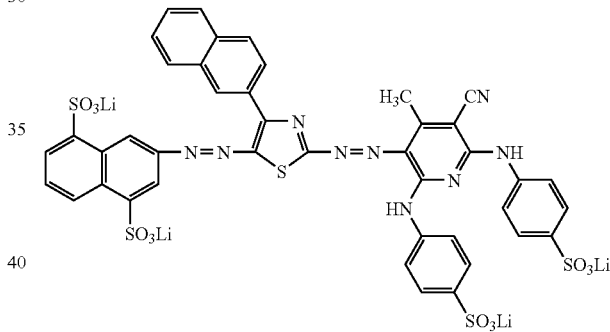

Compound A

Examples 2 to 6

Ink stock solutions B to F for inkjet recording were prepared in the same manner as with Example 1 with the exception that respective water-soluble organic solvents shown in Table 1 were used as a viscosity reducing agent in place of triethylene glycol.

Example 7

Ink stock solution C for inkjet recording was prepared in the same manner as with Example 1 with the exception that the amount of ultrapure water was changed from 800 g to 825 g, and that the amount of triethylene glycol added was changed from 50 g to 25 g.

Example 8

To 150 g of a black dye of compound A, 800 g of ultrapure water and 50 g of triethylene glycol as a viscosity reducing agent were added, followed by stirring for 1 hour with heating at 60 to 65° C. After the dye had been completely dissolved, the solution was cooled to room temperature, and 1.0 g of a preservatives PROXEL XL2, was added thereto. After stirring for 10 minutes, sodium bicarbonate was added to adjust the pH to 8.0. Then, filtration under reduced pressure was performed through a microfilter having an average pore size of 0.2 μm to prepare ink stock solution H for inkjet recording.

Comparative Example 1

Ink stock solution I for inkjet recording was prepared in the same manner as with Example 1 with the exception that ultrapure water was used in place of the viscosity reducing agent.

The viscosity of the resulting ink stock solutions was measured as follows, and the filterability of the ink stock solutions was evaluated by the following test. The results thereof are shown in Table 1.

(Measurement of Viscosity)

For 4 cc of each ink stock solution, the viscosity was measured by using a vibration viscometer, VM-1G, manufactured by Yamaichi Electronics Co., Ltd., under the conditions of 23° C. and 50%.

(Filtration Test of Ink Stock Solution)

Fifteen grams of each of ink stock solutions A to I was filtered through a disk filter having a diameter of 24 mm and a pore size of 0.2 μm (manufactured by AVANTEC) under a pressure of 0.2 MPa, and the time required for filtration was measured.

Example 9

(Preparation of Ink Stock Solution J)

To 150 g of compound B, 800 g of ultrapure water was added and heated with stirring at 60 to 65° C. for 1 hr. After the dye was completely dissolved, the resulting solution was chilled to room temperature and 0.1 g of a preservative PROXEL XL12 (Abesia Co.) was added thereto. After stirring for 10 min, potassium dicarbonate was added to adjust pH to 8.3. Subsequently, after 50 g of triethylene glycol was added as a viscosity depressant and stirred for 10 min, the resulting solution was subjected to filtration under reduced pressure through a microfilter having an average pore size of 0.2 μm, thus to prepare ink stock solution J for inkjet recording.

Examples 10 to 20

Ink stock solutions K to U for inkjet recording were prepared by treating similarly to Example 9 except that dyes and viscosity depressants shown in Table 2 were used in place of compound B and triethylene glycol, respectively.

The amount of ultrapure water was controlled so that the total amount of the ultrapure water and the viscosity depressants became 850 g.

Comparative Example 2

Ink stock solution V for inkjet recording was prepared similarly to example 9 except that ultrapure water was used in place of the viscosity depressant.

TABLE 1

|  | Ink Stock Solution | Viscosity Reducing Agent | Amount Added | Viscosity (mPa·s) | Filtration Time (sec) |
|---|---|---|---|---|---|
| Example 1 | A | Triethylene glycol | 5 wt % | 4.8 | 22 |
| Example 2 | B | Ethanol | 5 wt % | 7.0 | 26 |
| Example 3 | C | Triethylene glycol monobutyl ether | 5 wt % | 3.4 | 18 |
| Example 4 | D | 1,2-Hexanediol | 5 wt % | 3.4 | 19 |
| Example 5 | E | 1,5-pentanediol | 5 wt % | 4.1 | 21 |
| Example 6 | F | 2-pyrrolidone | 5 wt % | 4.1 | 20 |
| Example 7 | G | Triethylene glycol | 2.5 wt % | 7.2 | 27 |
| Example 8 | H | Triethylene glycol | 5 wt % | 4.5 | 19 |
| Comparative Example 1 | I | Not used | — | 34.7 | 312 |

The viscosity of the resulting ion stock solutions was measured similarly. Results are shown in Table 2.

TABLE 2

|  | Ink Stock Solution | Dye | Viscosity Reducing Agent | Amount of Viscosity Reducing Agent | Viscosity (mPa·s) |
|---|---|---|---|---|---|
| Example 9 | J | Compound B (Black) | Triethylene glycol | 5 weight % | 5.0 |
| Example 10 | K | Compound B | Ethanol | 5 weight % | 7.1 |
| Example 11 | L | Compound B | Triethylene glycol monobutyl ether | 5 weight % | 3.5 |
| Example 12 | M | Compound B | 1,6-Hexanediol | 5 weight % | 3.5 |
| Example 13 | N | Compound B | 1,6-Hexanediol | 2 weight % | 3.5 |
| Example 14 | O | Compound B | Urea | 10 weight % | 8.9 |
| Example 15 | P | Compound C-2 (Cyan) | Triethylene glycol monobutyl ether | 2 weight % | 4.2 |
| Example 16 | Q | Compound C-2 | 1,7-Heptanediol | 2 weight % | 4.4 |
| Example 17 | R | Compound M-2 (Magenta) | Triethylene glycol monobutyl ether | 2 weight % | 1.9 |
| Example 18 | S | Compound M-2 | 1,8-Octanediol | 2 weight % | 2.0 |

TABLE 2-continued

| | Ink Stock Solution | Dye | Viscosity Reducing Agent | Amount of Viscosity Reducing Agent | Viscosity (mPa·s) |
|---|---|---|---|---|---|
| Example 19 | T | Compound Y-1 (Yellow) | Triethylene glycol | 2 weight % | 4.5 |
| Example 20 | U | Compound Y-1 | 1,6-Hexanediol | 2 weight % | 4.3 |
| Comparative Example 2 | V | Compound B | none | — | 36.5 |

The structure of the above-described compound B is shown.

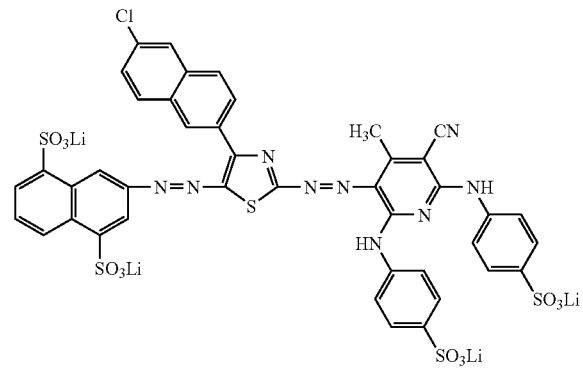

Compound B

From Table 1 and 2, it is apparent that the ink stock solutions for inkjet recording of the invention are effectively reduced in viscosity by the viscosity reducing agents. This shows that the ink stock solutions of the invention are excellent in filterability and handleability. Further, these viscosity reducing agents are generally used as a penetrating agent or a wetting agent for the ink stock solution for inkjet recording. Accordingly, even when they are used in the ink stock solution for inkjet recording of the invention, it is possible to prepare the ink stock solution for inkjet recording without problems at all.

Reference Example (Preparation of Reference Black Ink)
Ultrapure water was added to the following components to make to 100 g, and thereafter the mixture was stirred for one hour while heating at from 60 to 65° C. After dyes were completely dissolved, the resulting solution was chilled to room temperature, and the resulting solution was subjected to vacuum filtration using a microfilter having an average pore size of 0.2 μm to prepare a black ink for inkjet recording. The black ink had a viscosity of 4.3 mPa·s measured in the above-described way.

(Formulation of Reference Black Ink)

| | |
|---|---|
| Dye (Compound B) | 5.0 g |
| Dye (Compound Y) | 1.5 g |
| Triethylene glycol monobutyl ether | 8.0 g |
| Glycerin | 10.0 g |
| Triethylene glycol | 2.3 g |
| 1,2-hexanediol | 3.2 g |

-continued

| | |
|---|---|
| SURFYNOL 465 (surfactant) (manufactured by Air Product Japan Inc.) | 1.0 g |
| Trietanolamine | 0.1 g |
| Urea | 5.0 g |

Example 21

(Preparation of Black Ink of the Invention)
A black ink for inkjet recording was prepared by treating similarly to Reference Example except that the ink stock solution M was used. The black ink had a viscosity of 4.3 mPa·s measured in the above-described way.

The structure of the above-described compound Y is shown.

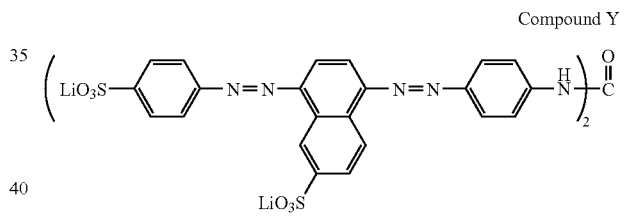

Compound Y (Preparation of Printing Sample)
Each of the black inks of Reference Example and Example 21 was filled in a black ink cartridge of an inkjet printer PM-G800, manufactured by SEIKO EPSON CORPORATION. An inkjet photo paper (gloss paper), manufactured by SEIKO EPSON CORPORATION, was used and an image was printed thereon using the inkjet printer PM-G800, and the following printing property was evaluated.

(Printing Property)
The cartridge was set in the inkjet printer, and after checking discharge of the ink from all of nozzles, A4-size 50 sheets were output and the printing property was evaluated according to the following criteria. This evaluations after filling the black ink in the ink cartridge and after leaving the ink cartridge for 10 days at 60° C. were performed. For reference, the black ink for PM-G680 was used.

A: No disorder of prints is observed from the start to completion of the printing.
B: Output with disorder of prints occurs.
C: Disorder of prints is observed from the start to completion of the printing.

(Result)
The black ink using the black ink stock solution of the invention as well as the black inks of Reference Example and PM-980G have good printing properties both of after filling the black ink in the ink cartridge and after leaving the ink cartridge for 10 days, and have a evaluated result of "A".

From these results, it is possible to provide an ink composition for inkjet recording by using an ink stock solution of the invention without problems.

The present application claims foreign priotiy based on Japanese Patent Application No. JP2004-82033, filed Mar. 22 of 2004, the contents of which is incorporated herein by reference.

What is claimed is:

1. An ink stock solution comprising a dye and a viscosity reducing agent, wherein the ink stock solution has a solid concentration of the dye of 7% or more by weight, and
    wherein the dye is represented by Formula (Bk):

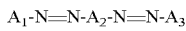  Formula (Bk)

wherein $A_1$, $A_2$ and $A_3$ each independently represents an aromatic group which may be substituted or a heterocyclic group which may be substituted, $A_1$ and $A_3$ each is a univalent group, and $A_2$ is a bivalent group; and
    wherein the content of the viscosity reducing agent is 0.1 to 20% by weight.

2. The ink stock solution according to claim 1, wherein the dye has an oxidation potential nobler than 1.0 V versus SCE.

3. The ink stock solution according to claim 1, which is a black ink stock solution, wherein the dye comprising at least one dye having a λmax of 500 nm to 700 nm and a half-value width of 100 nm or more in an absorption spectrum of a dilute solution normalized to an absorbance of 1.0 at the λmax.

4. The ink stock solution according to claim 1, which has a solid concentration of the dye of 10% or more by weight.

5. The ink stock solution according to claim 1, wherein the viscosity reducing agent comprises a water-soluble organic solvent.

6. The ink stock solution according to claim 5, wherein the water-soluble organic solvent is one of an alcohol and an amide compound.

7. The ink stock solution according to claim 1, which comprises a preservative.

8. The ink stock solution according to claim 1, which comprises a pH adjusting agent.

9. The ink stock solution according to claim 1, which is for inkjet recording.

10. A method for producing an ink stock solution according to claim 1, which comprises:
    adding a dye to water to provide a dye solution;
    adding a viscosity reducing agent to the dye solution so as to control a viscosity of the dye solution.

11. A method for producing an ink stock solution according to claim 1, which comprises dissolving a dye, a water and a viscosity reducing agent all together.

12. An ink composition comprising an ink stock solution according to claim 1, wherein the ink composition has a viscosity of 1 to 30 mPa·s.

13. The ink composition according to claim 12, which is for inkjet recording.

14. A method for producing an ink composition, wherein the ink composition has a viscosity of 1 to 30 mPa·s, which comprises adjusting a dye concentration of an ink stock solution, wherein the ink stock solution comprises a dye and a viscosity reducing agent, and has a solid concentration of the dye of 7% or more by weight, and
    wherein the dye is represented by Formula (Bk):

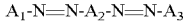  Formula (Bk)

wherein $A_1$, $A_2$ and $A_3$ each independently represents an aromatic group which may be substituted or a heterocyclic group which may be substituted, $A_1$ and $A_3$ each is a univalent group, and $A_2$ is a bivalent group; and
    wherein the content of the viscosity reducing agent is 0.1 to 20% by weight.

15. An ink composition comprising an ink stock solution according to claim 1, wherein the dye represented by Formula (Bk) has at least one heterocyclic ring.

16. An ink composition comprising an ink stock solution according to claim 1, wherein the ink stock solution has a content of the viscosity reducing agent of 0.2 to 6% by weight.

* * * * *